(12) United States Patent
Matsuura et al.

(10) Patent No.: US 8,582,958 B2
(45) Date of Patent: Nov. 12, 2013

(54) REPRODUCER, INTEGRATED CIRCUIT, REPRODUCTION METHOD, APPLICATION PROGRAM, RECORDING MEDIUM, RECORDER, AND RECORDING METHOD

(75) Inventors: Yasuyuki Matsuura, Hiroshima (JP); Yuta Kiyosawa, Osaka (JP); Tomohiro Matsumoto, Osaka (JP); Taiji Sasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 139 days.

(21) Appl. No.: 13/256,307

(22) PCT Filed: Mar. 16, 2010

(86) PCT No.: PCT/JP2010/001877
§ 371 (c)(1),
(2), (4) Date: Sep. 13, 2011

(87) PCT Pub. No.: WO2010/106795
PCT Pub. Date: Sep. 23, 2010

(65) Prior Publication Data
US 2012/0002949 A1  Jan. 5, 2012

(30) Foreign Application Priority Data
Mar. 16, 2009 (JP) .................. 2009-062314

(51) Int. Cl.
*H04N 5/92* (2006.01)
(52) U.S. Cl.
USPC ........... 386/326; 386/332; 386/334; 386/336; 386/353

(58) Field of Classification Search
USPC ........................... 386/248–262, 334
See application file for complete search history.

(56) References Cited

U.S. PATENT DOCUMENTS

| 8,401,369 | B2 * | 3/2013 | Tanaka et al. ............... 386/248 |
| 2007/0189718 | A1 * | 8/2007 | Kobayashi et al. ............ 386/95 |
| 2009/0204572 | A1 | 8/2009 | Takashima et al. | |
| 2010/0034516 | A1 | 2/2010 | Tanaka et al. | |
| 2010/0046925 | A1 * | 2/2010 | Kusunoki et al. ............... 386/96 |
| 2011/0035423 | A1 | 2/2011 | Kobayashi et al. | |

FOREIGN PATENT DOCUMENTS

| JP | 2007-251958 | 9/2007 |
| WO | 2008/149501 | 12/2008 |

OTHER PUBLICATIONS

International Search Report issued May 18, 2010 in International (PCT) Application No. PCT/JP2010/001877.

* cited by examiner

*Primary Examiner* — Daquan Zhao
*Assistant Examiner* — Stephen Smith
(74) *Attorney, Agent, or Firm* — Wenderoth, Lind & Ponack, L.L.P.

(57) ABSTRACT

Provided is a playback device which is capable of correctly determining a construction status of a virtual package. An access is attempted to a state signaling file recorded in a local storage using a fixed address on a virtual file system assigned by merge management information (step S13). The virtual package construction status is determined according to failure or success of the attempted access.

12 Claims, 35 Drawing Sheets

FIG. 5

AV clip

- Video stream (PID=0x1011 Primary video stream)
- Audio stream (PID=0x1100)
- Audio stream (PID=0x1101)
- Presentation graphics stream (PID=0x1200)
- Presentation graphics stream (PID=0x1201)
- Interactive graphics stream (PID=0x1400)
- Video stream (PID=0x1B00 Secondary video stream)
- Video stream (PID=0x1B01 Secondary video stream)

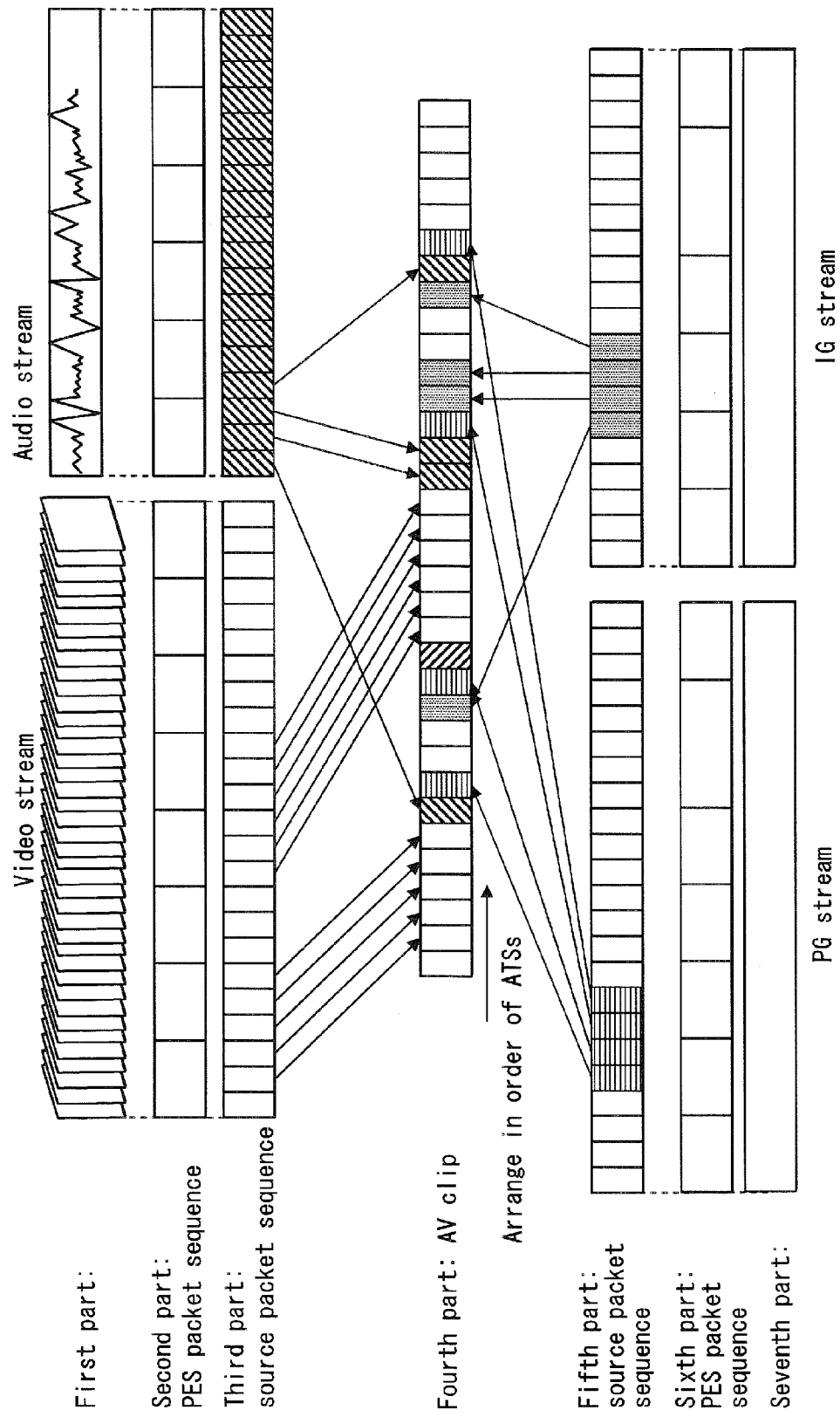

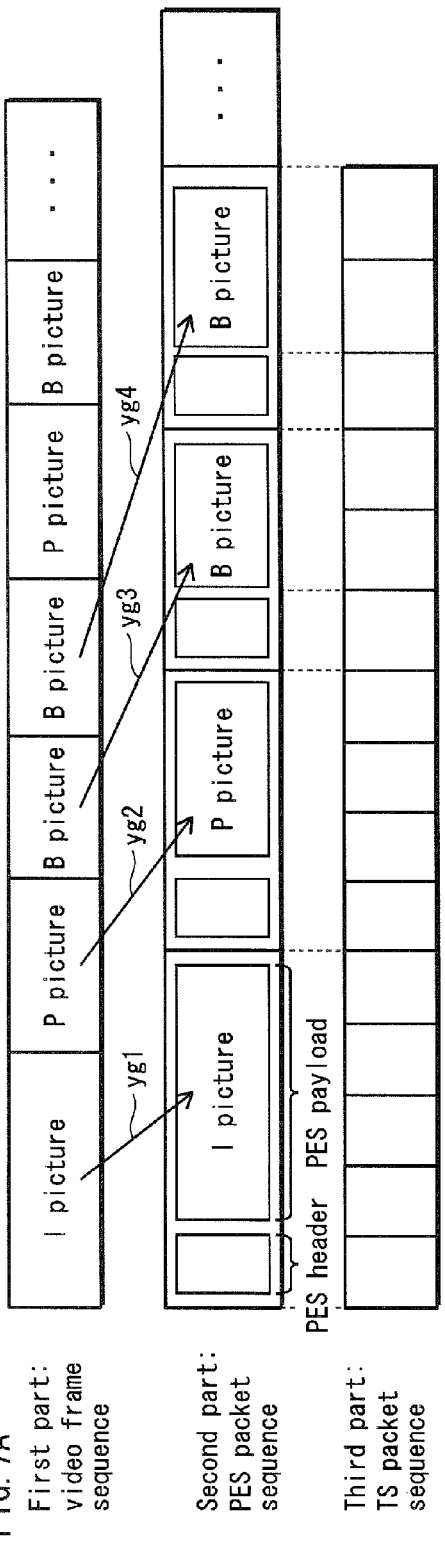
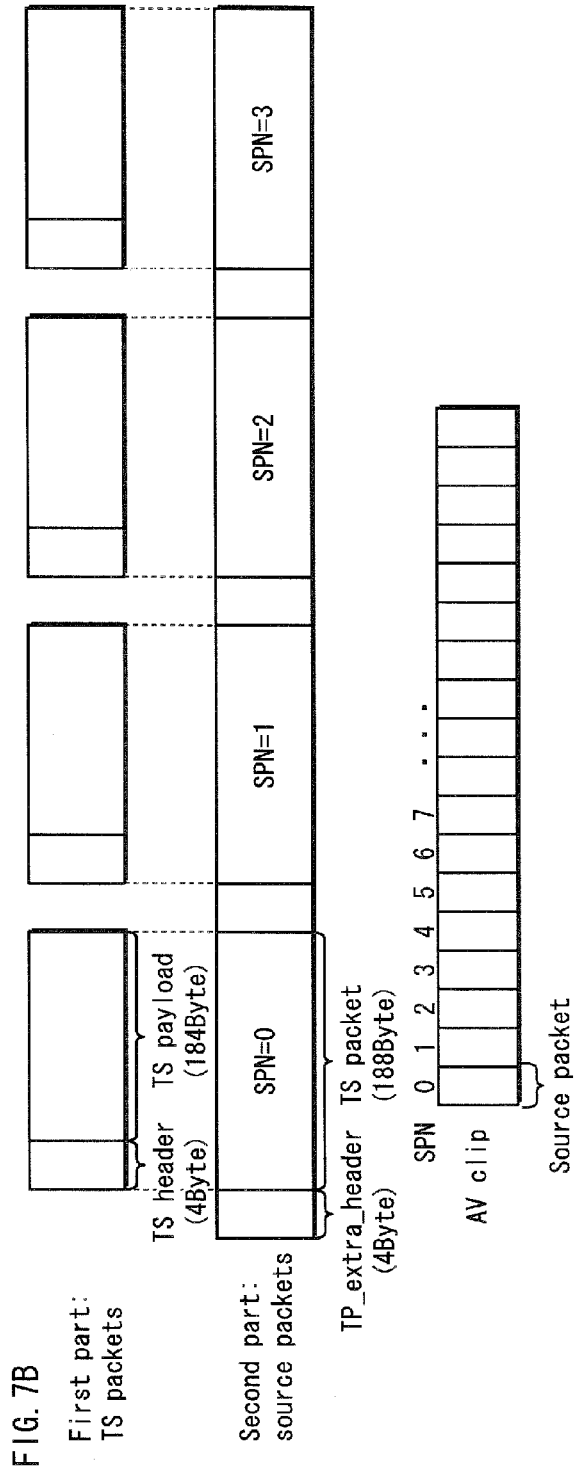

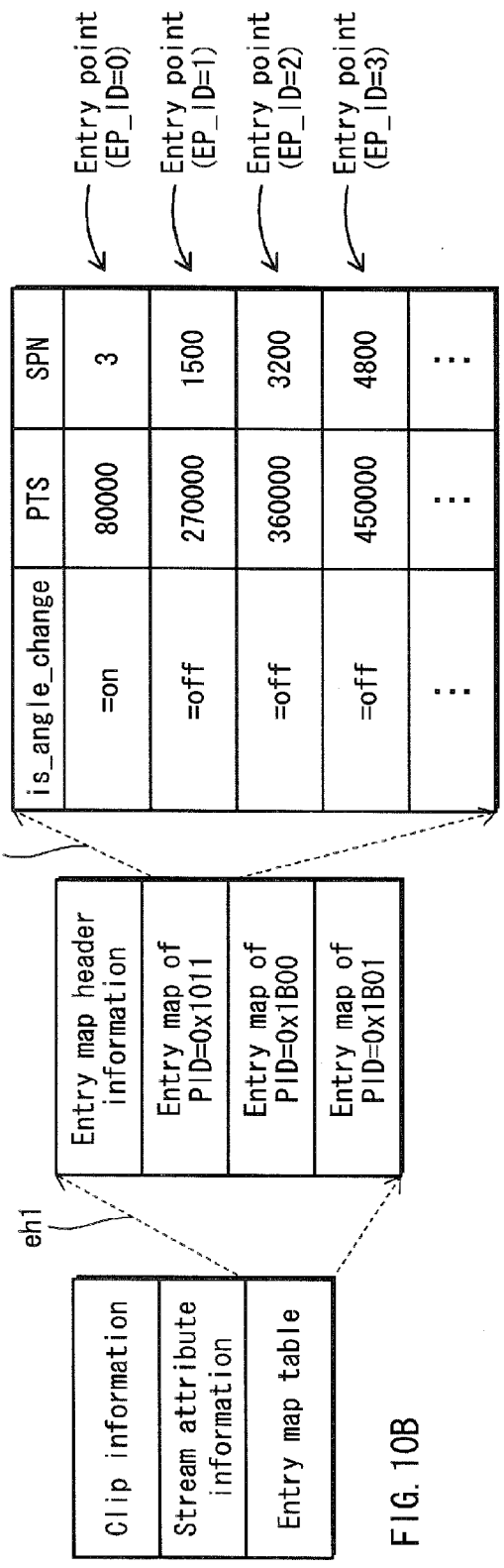
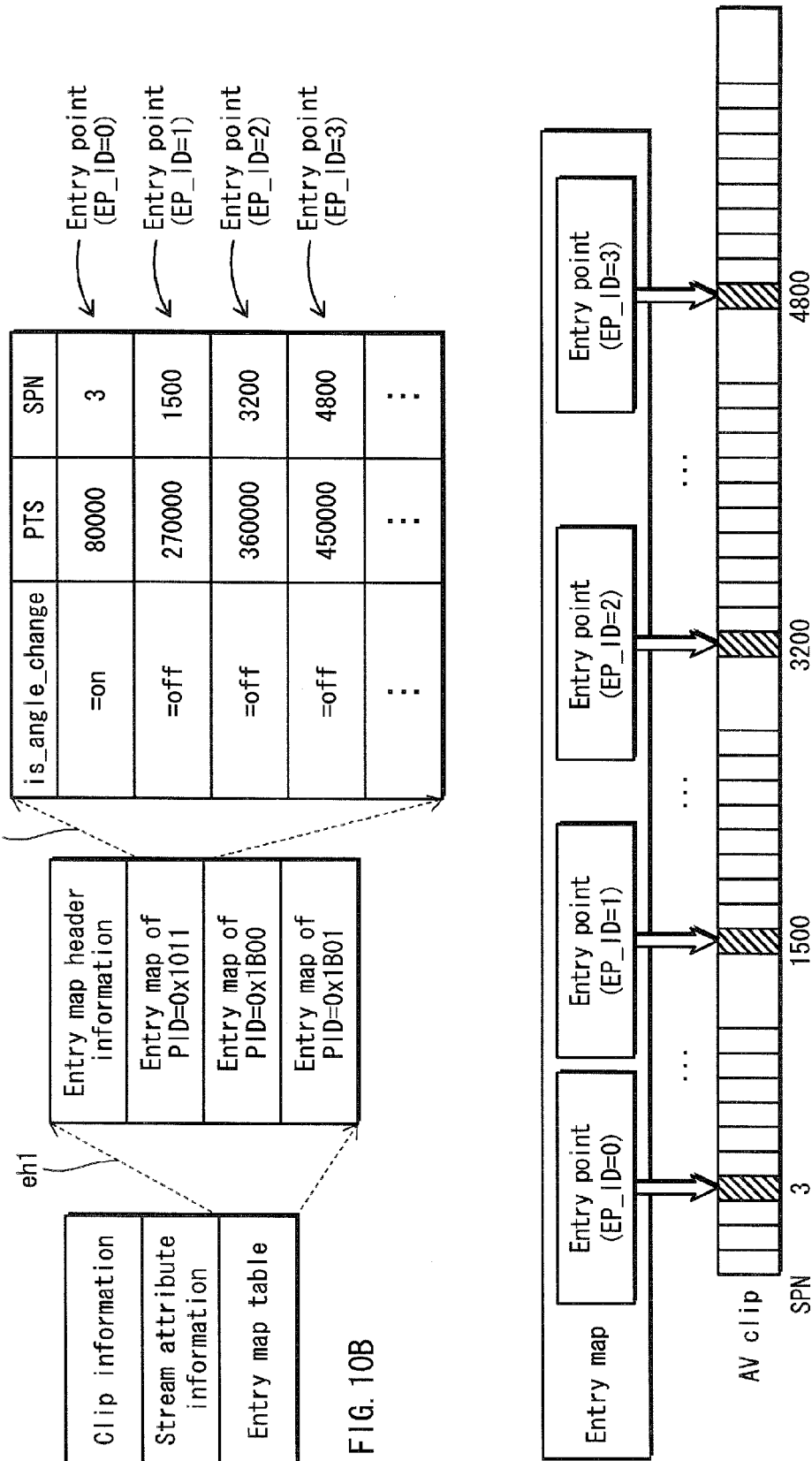
FIG. 10A
FIG. 10B

FIG. 15

| 0 | Language Code |
| --- | --- |
| 1 | Audio stream number |
| 2 | Subtitle stream number |
| 3 | Angle number |
| 4 | Title number |
| 5 | Chapter number |
| 6 | Program number |
| 7 | Cell number |
| 8 | Key name |
| 9 | Navigation timer |
| 10 | Current playback time |

| 11 | Player audio mixing mode for Karaoke |
| --- | --- |
| 12 | Country code for parental management |
| 13 | Parental level |
| 14 | Player configuration for Video |
| 15 | Player configuration for Audio |
| 16 | Language code for AST |
| 17 | Language code ext. for AST |
| 18 | Language code for STST |
| 19 | Language coded ext. for STST |
| 20 | Player region code |
| 21 | Secondary Video Stream number |

| 22 | Secondary Audio Stream number |
| --- | --- |
| 23 | Player status |
| 24 | reserved |
| 25 | reserved |
| 26 | reserved |
| 27 | reserved |
| 28 | reserved |
| 29 | reserved |
| 30 | reserved |
| 31 | reserved |
| 32 | reserved |

FIG. 19

| | |
|---|---|
| OrgID of associated ROM disc | 7fffabcd |
| DiscID of associated ROM disc | 0123456789abcdef0123456789abcdef |
| Identifier of update kit | Update01 |
| Name of update kit | "It rained today, too" Update kit 2008.01.01 |
| Version number | 1.00.01 |
| Detailed contents of data included in update kit | • Japanese text subtitle<br>• Bonus game<br>• Trailer of new movie coming out in February of 2008<br>-Title-ZZZ, Title-YYY, Title-ZZZ |
| Video image | BBB.JPG |
| Representative text (Japanese) | Update kit (2008/01/01) of "Kyo-mo ame datta [it rained today, too]" |
| Representative text (English) | The update kit (2008/01/01) of "It rained today, too" |

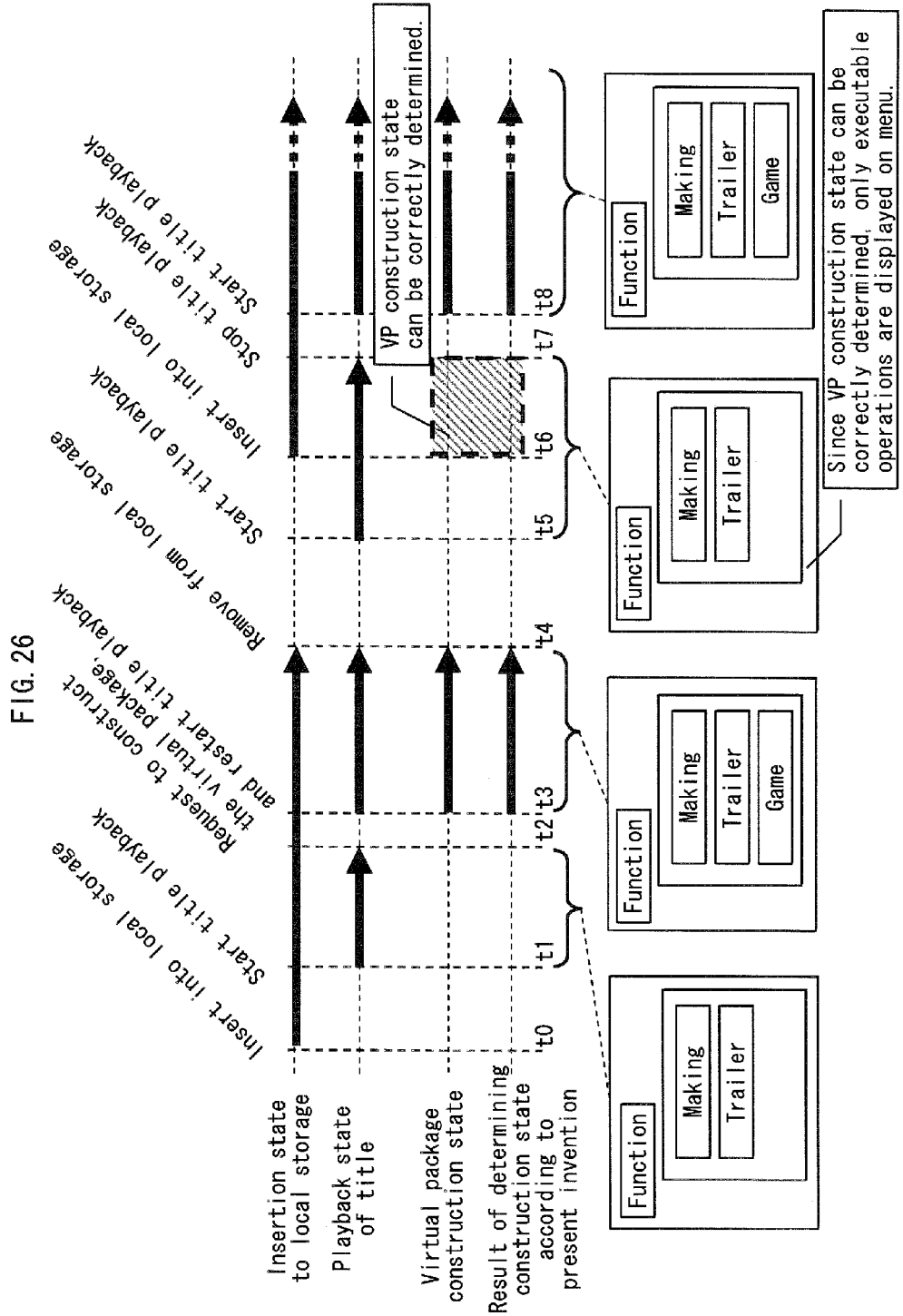

Menu on which only "Making" and "Trailer" are displayed.

Menu on which options "Trailer New" and "Game" are displayed.

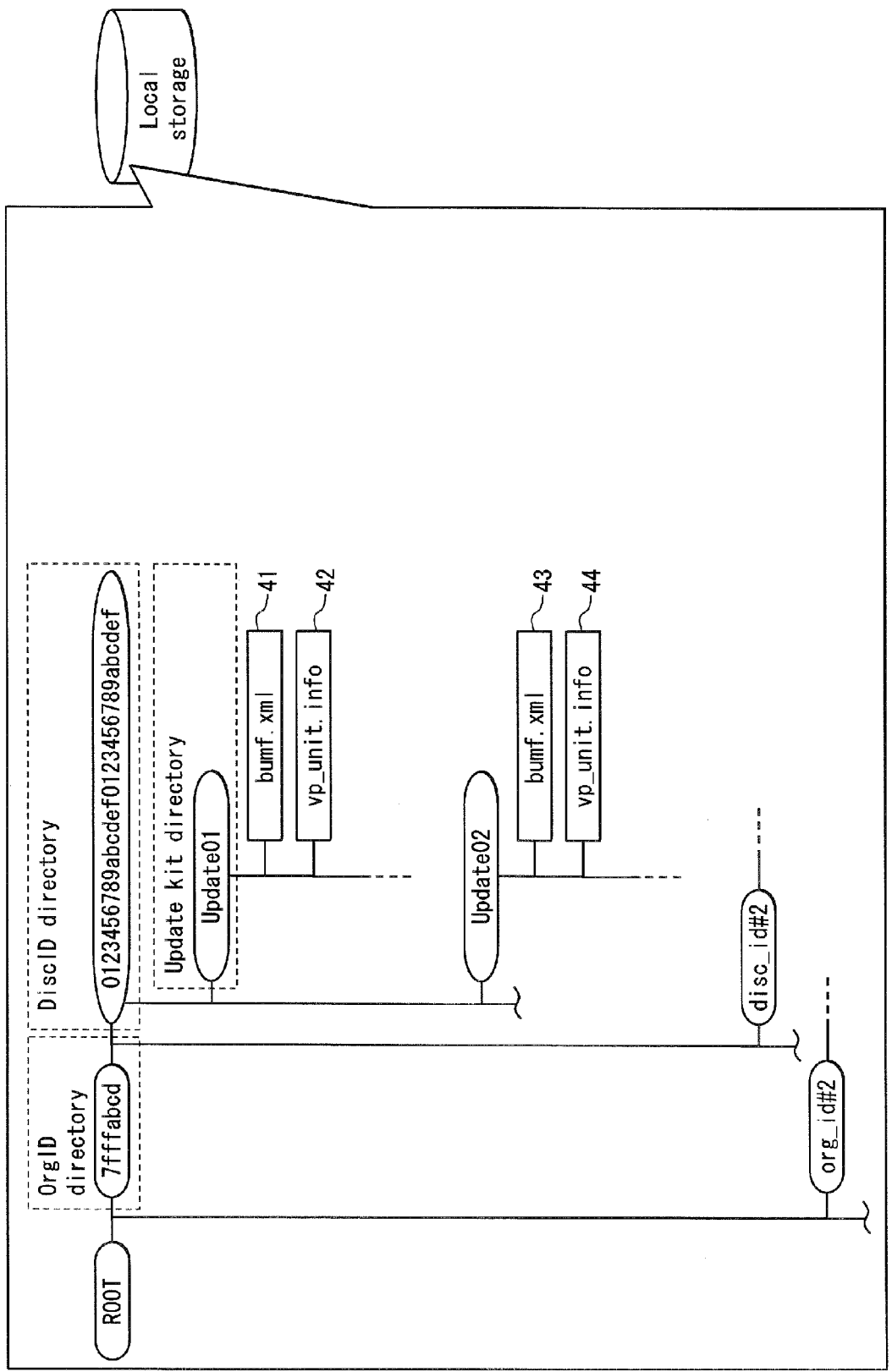

| Representative video image | AAA. JPG |
| --- | --- |
| Representative text information (Japanese) | Kyo-mo ame datta [it rained today, too] |
| Representative text information (English) | It rained today, too. |

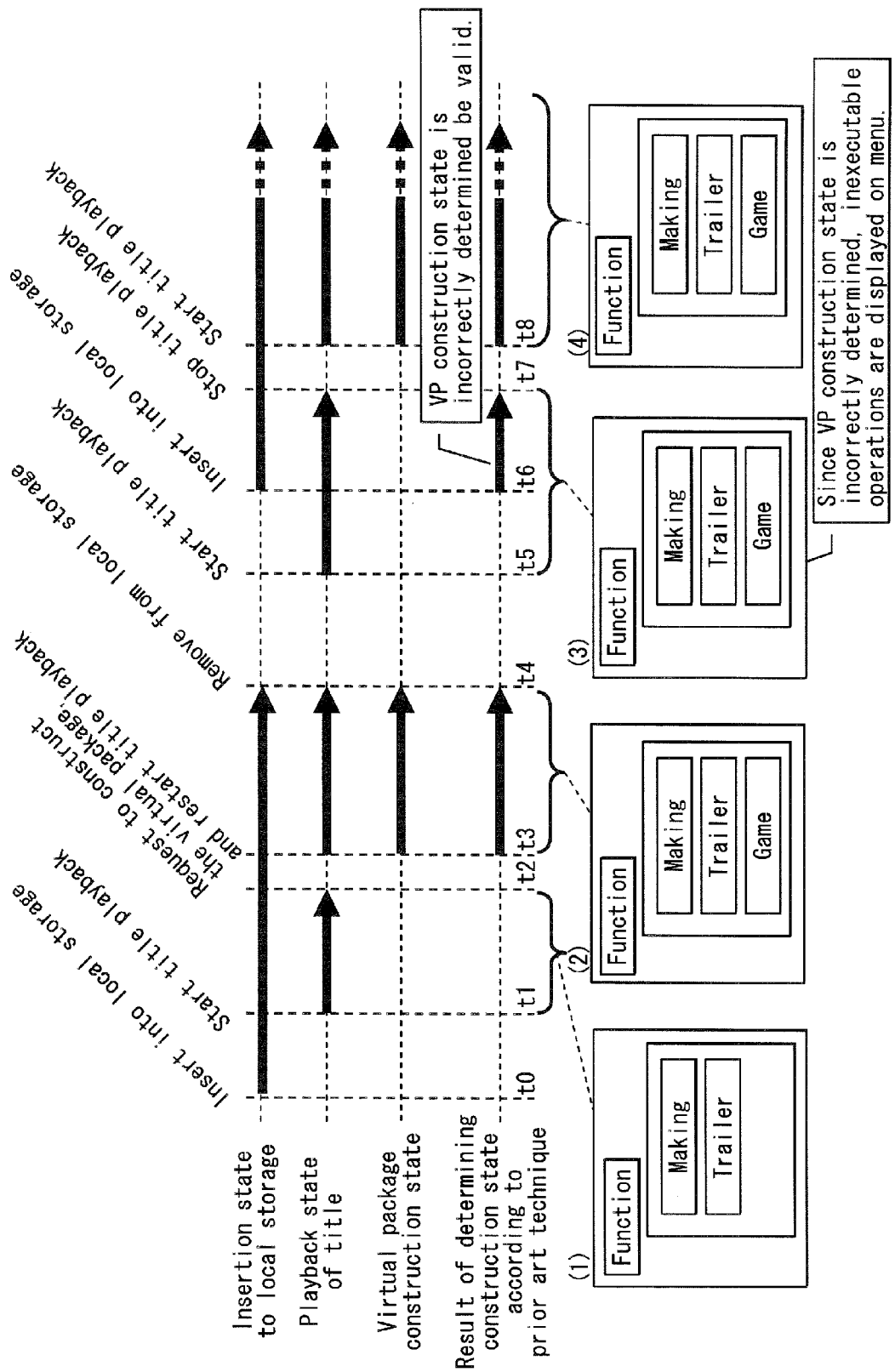

REPRODUCER, INTEGRATED CIRCUIT, REPRODUCTION METHOD, APPLICATION PROGRAM, RECORDING MEDIUM, RECORDER, AND RECORDING METHOD

TECHNICAL FIELD

The present invention relates to virtual file system techniques for utilizing a content stored on a recording medium, such as a BD-ROM, in combination with a content downloaded via a network.

BACKGROUND ART

BD (Blu-ray) technologies use a virtual file system (VFS) whereby a file acquired from a network and the like is stored in a local storage which is a different storage medium than a recording medium (referred to below as the "ROM disc"), such as a BD-ROM disc, a BD-R, and a BD-RE, and treated in a way as if it were recorded on the ROM disc.

In such a virtual file system, by mapping on the ROM disc one or more files stored in the local storage, files stored on the ROM disc and the files stored in the local storage are handled as data stored in a single virtual disc. The mapping makes use of a merge management information file which is a correspondence table between file paths in the virtual file system and file paths in the local storage. The single virtual disc recognized through the virtual file system is called a "virtual package".

As one of conventional techniques regarding the virtual file system, Patent Literature 1 is known, for example.

CITATION LIST

[Patent Literature]
[Patent Literature 1] Japanese patent application publication No. 2007-251958

It is often the case that a removable medium, such as an SD memory card, is employed as a local storage. When the removable medium is employed as a target local storage of constructing a virtual package, once the local storage is connected or disconnected, the virtual package needs to be reconstructed in the virtual file system. However, reconstructing the virtual package during playback of image data and execution of an application program (which are refererred to below as title playback) involves a risk of destabilizing a condition of the device by, for example, changing a file structure of a file being currently accessed. It is therefore ensured in the virtual file system that the virtual package is constructed in a switching period after an interruption of the title playback and before a playback start of the next title. This brings about a situation (i.e. prepared state) where a file stored in the local storage cannot be read as the virtual package although the local storage is connected to the playback device.

However, it should be noted that, in a case also where the local storage is reconnected after a BD-J application stored on a ROM disc has been executed, the BD-J application is able to directly access the file using a file path in the local storage. Accordingly, in such a case, the BD-J application might not be able to correctly determine whether the virtual package is in the prepared state or a valid state, resulting in a trouble.

For example, as shown in FIG. 35, suppose a situation where processing is performed to display a bonus selection menu in an application that acquires a bonus game file from a network or the like and adds the acquired file as the virtual package.

Firstly, at a time point t0 in FIG. 35, the local storage is connected to a playback device. Then, in conjunction with the playback start of a title stored on the ROM disc at a time point t1, a BD-J application associated with the title is executed. This BD-J application has functions of detecting whether the bonus game file has been stored using the file path in the local storage, and when the bonus game file has not been stored, downloading the bonus game file and requesting for construction of the virtual package using the downloaded file. At the time point t1, the bonus game file is not stored in the local storage, and the virtual file system is not constructed. Accordingly, the BD-J application tentatively displays a menu (1) which does not contain a "Game" button for calling the bonus game as an option on the bonus selection menu. Subsequently, the BD-J application downloads the bonus game file from the network and the like and stores the downloaded file to the local storage. Then, at a time point t2, the BD-J application requests a virtual file control unit of the playback device to construct the virtual package. The virtual file control unit serves to control the virtual file system. In response to the request, the virtual file control unit has completed creating the virtual package at a time point t3 when the title playback is started again. From the time period t3, since the construction of the virtual package has been completed, a menu (2) which contains the "Game" button for calling the bonus game is displayed.

Thus, the virtual package has been constructed using the above procedures. From there, when the local storage is removed from the playback device at a time point t4, the title being played back is force quit. With the force-quit of the title playback, the BD-J application is also force quit, and the construction of the virtual package is cancelled. Subsequently at a time point t5, once the title playback is started again with the local storage still removed from the playback device, the BD-J application associated with the title being played back is executed again. Here, the BD-J application is executed while the construction of the virtual package has not been completed. In this situation, when the previously disconnected local storage is reconnected to the playback device (at a time point t6), the BD-J application can still access the previously downloaded file merely by directly designating the file path in the local storage even though the virtual package is not constructed. This causes the BD-J application to incorrectly determine that the bonus game file has been downloaded and that the virtual package has been constructed. As a result, the BD-J application inadvertently displays a menu (3) which contains the "Game" button for calling the bonus game in accordance with the incorrect determination.

However, in fact, even when the local storage is reconnected, the virtual file control unit does not reconstruct the virtual package until a time point t8 when the title being played back is stopped and the playback is switched to the next title. Accordingly, at the time point t6, the virtual package is in the prepared state, and therefore any file stored in the local storage cannot be accessed as the virtual package, and the bonus game cannot be executed. That is to say, from the time point t6 to the time point t7, inconsistency is created between the menu (3) being displayed and in execution of the bonus game even when the user selects the "Game" button on the displayed menu. If such an inconsistent situation often occurs where the user is not be able to actually execute a part of functions presented as executable to the user, there is a risk that the user raises questions about a quality of the playback device whose operations are under control of such an application.

In view of the above problems, an objective of the present invention is to provide a playback device, an integrated circuit, a playback method, and an application program, as well as a recording medium, a recording device, and a recording method for recording such an application program, all of which allow correct determination about whether the virtual package constructed by a file stored on the ROM disc and a file stored in the local storage is in the prepared state or in the valid state.

SUMMARY OF THE INVENTION

In order to achieve the above objective, one aspect of the present invention provides a playback device comprising: a read unit operable to read an application program from a read-only recording medium; a program execution unit operable to execute the application program read by the read unit; a connection unit to which a local storage is removably connected; and a virtual file control unit operable to construct a virtual package by combining a file structure of the local storage with a file structure of the read-only recording medium, wherein the local storage stores therein a state signaling file, a file path of the state signaling file on the virtual package does not correspond to any file recorded on the read-only recording medium, and the program execution unit determines, while the local storage is connected, whether the virtual package is in a prepared state or in a valid state by attempting to access the state signaling file via the virtual package.

Advantageous Effects of Invention

The playback device of the present invention attempts to access the state signaling file stored in the local storage using the file path on the virtual package which does not correspond to any file on the read-only recording medium. Accordingly, the playback device is able to correctly determine a construction state of the virtual package, even in the situation where simply the local storage is connected to the playback device while the virtual package has not been constructed.

This prevents malfunction of the application program in a period conventionally accompanied by the incorrect determination, such as the period after the reconnection of the local storage during execution of the application program and before the stop of the application program.

BRIEF DESCRIPTION OF DRAWINGS

FIG. 5 shows a structure of an AV clip.

FIG. 6 schematically shows a method for multiplexing streams in the AV clip.

FIG. 7A shows further details on a method for storing a video stream and an audio stream in a PES packet sequence, and FIG. 7B shows structures of a TS packet and a source packet in the AV clip.

FIGS. 10A and 10B show an entry map table in the clip information file.

FIG. 15 is a list of system parameters within a register set 10.

FIG. 19 shows an example of a state signaling file.

FIG. 26 chronologically shows a connection state of a medium to a local storage 3, a playback state of a title, an actual virtual package construction state, and a result of determining the construction state by the BD-J application.

FIG. 28 shows a storage area of an SD memory card storing therein a plurality of update kits for adding contents to a single BD-ROM.

FIG. 35 shows a conventional technique.

DESCRIPTION OF EMBODIMENTS

The following describes a recording medium and a playback device pertaining to preferred embodiments of the present invention with reference to the drawings.

(First Embodiment)

Figure 1:
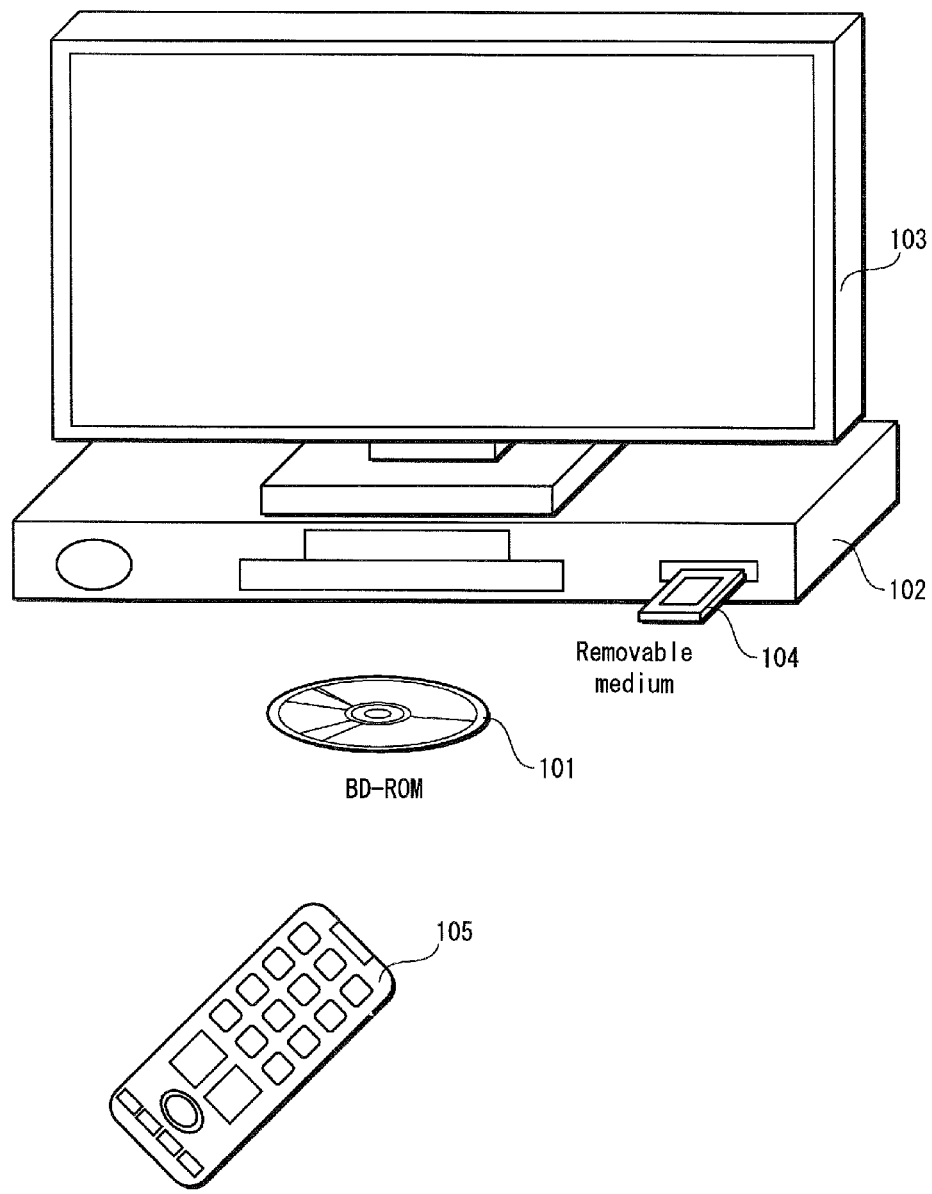
FIG. 1 is a schematic diagram showing a home theater system that uses a recording medium according to a first embodiment of the present invention.

FIG. 1 is a schematic diagram showing a home theater system that uses a recording medium according to a first embodiment of the present invention. In FIG. 1, the recording medium according to the present invention is a BD-ROM 101. As shown in the figure, this home theater system plays back the BD-ROM 101 and includes a playback device 102, a television 103, a removable medium 104, and a remote control 105.

The BD-ROM 101 is a read-only Blu-ray disc (BD)™, i.e. a BD-ROM disc. The BD-ROM 101 can be a different portable recording medium, such as a BD-R and a BD-RE.

The playback device 102 is mounted with a BD-ROM drive which is an optical disc drive conforming to the BD-ROM format. The playback device 102 also includes an connection unit to which the removable medium 104 is connectable. The removable medium 104 can be an SD memory card, Memory Stick™, Compact Flash™, Smart Media™ or Multimedia Card™, and a removable hard disk drive.

The television 103 provides an interactive operation environment to a user by displaying a playback image of a movie work, a menu, and the like.

The remote control 105 is an accessory of the playback device 102. The remote control 105 receives a user operation to the playback device 102 and transmits a command signal in accordance with the received user operation. This concludes the description of a usage pattern of the recording medium and the playback device according to the present invention.

<BD-ROM 101>

Next, a description is given of details of the BD-ROM 101 which is the recording medium according to the present invention.

Figure 2:
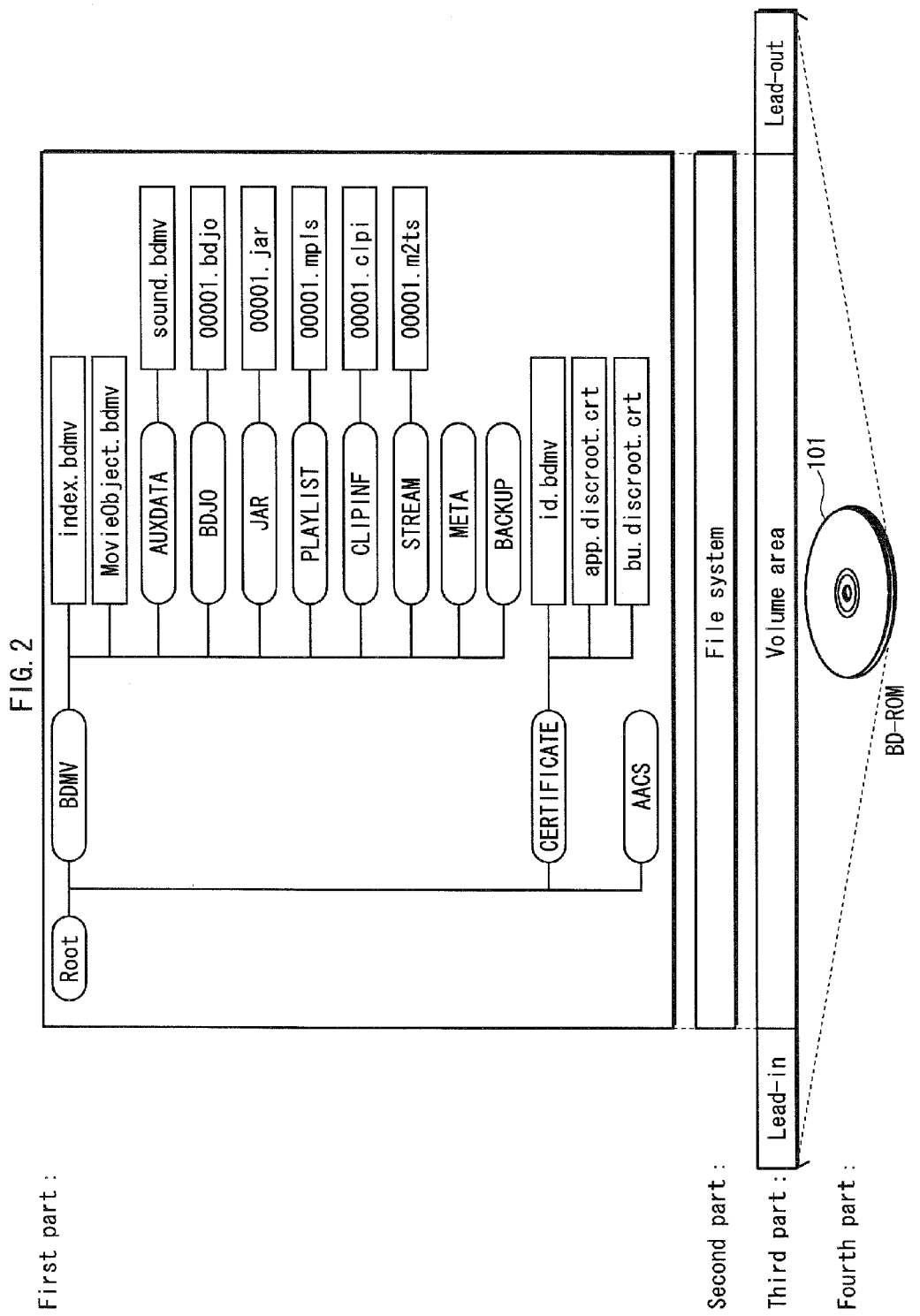
FIG. 2 shows an internal structure of a BD-ROM.

FIG. 2 is a schematic diagram showing a data structure of the BD-ROM 101. The fourth part from the top of the FIGURE indicates the BD-ROM 101, and the third part indicates a track 202 on the BD-ROM. In the figure, the track 202, which spirals from an inner to an outer circumference of the BD-ROM 101, is schematically extended in a transverse direction. Like other optical discs, such as a DVD and a CD, the BD-ROM 101 has a storage area formed in a spiral from the inner to the outer circumference. The storage area has a logical address space for storing logical data between a lead-in area provided along the inner circumference and a lead-out area provided along the outer circumference. A special area called BCA (Burst Cutting Area) is provided inside the lead-in area. Only the BD-ROM drive is permitted to access the BCA, and the access by an application programs is prohibited. The BCA is therefore often used for the sake of a copyright protection technology and the like.

The second part of the figure indicates a logical address space managed by a file system. The logical address space stores data, starting from file system volume information, followed by application data, such as video data. The file system is a mechanism for representing data on a disc in units called directories or files, and is UDF (Universal Disc Format) in the BD-ROM 101. In an ordinary PC (Personal Computer) for daily use also, data recorded on a hard disk with use of a directory/file structure may be displayed on the PC through a file system called FAT or NTFS, with usability improved. The file system makes it possible to read the logical data stored with use of the directory/file structure like the ordinary PC does.

The first part of the figure indicates an application format of the BD-ROM 101 based on the file system. In the present embodiment, the directory and file structure of the BD-ROM 101 is as follows. Immediately under a root directory (ROOT), a BDMV directory, a CERTIFICATE directory, an AACS directory, and the like are located. In the BDMV directory, data, such as AV contents and management information, handled on the BD-ROM 101 are recorded. The following mainly describes the BDMV directory.

Under the BDMV directory are an index file (index.bdmv), a movie object file (MovieObject.bdmv), a PLAYLIST directory, a CLIPINF directory, a STREAM directory, a BDJO directory, a JAR directory, an AUXDATA directory, a META directory, and a BACKUP directory. The index file includes an index table defining a title. The movie object file defines a dynamic scenario. An AV clip (00001.m2ts) storing multiplexed AV contents such as video and audio, a clip information file (00001.clpi) storing management information of the AV clip, a playlist file (00001.mpls) defining a logical playback path of the AV clip, a BD-J object file (00001.bdjo) defining a JAR file to be executed and a method for the execution, and a JAR file (00001.jar) storing a BD-J application are located under the STREAM directory, the CLIPINF directory, the PLAYLIST directory, the BDJO directory, and the JAR directory mentioned above, respectively.

A description is given below of a data structure of each file located under the BDMV directory.

<Index File>

Firstly, the index file (Index. Bdmv) is described. The index file is management information regarding the entire recording medium. After the recording medium is inserted into the playback device, the playback device reads the index table file first, thereby uniquely recognizing the disc. The index file further stores the index table indicating title numbers of a plurality of titles playable on the BD-ROM 101 in one-to-one correspondence with program files defining the titles, in other words, BD-J objects or movie objects.

Figure 3:
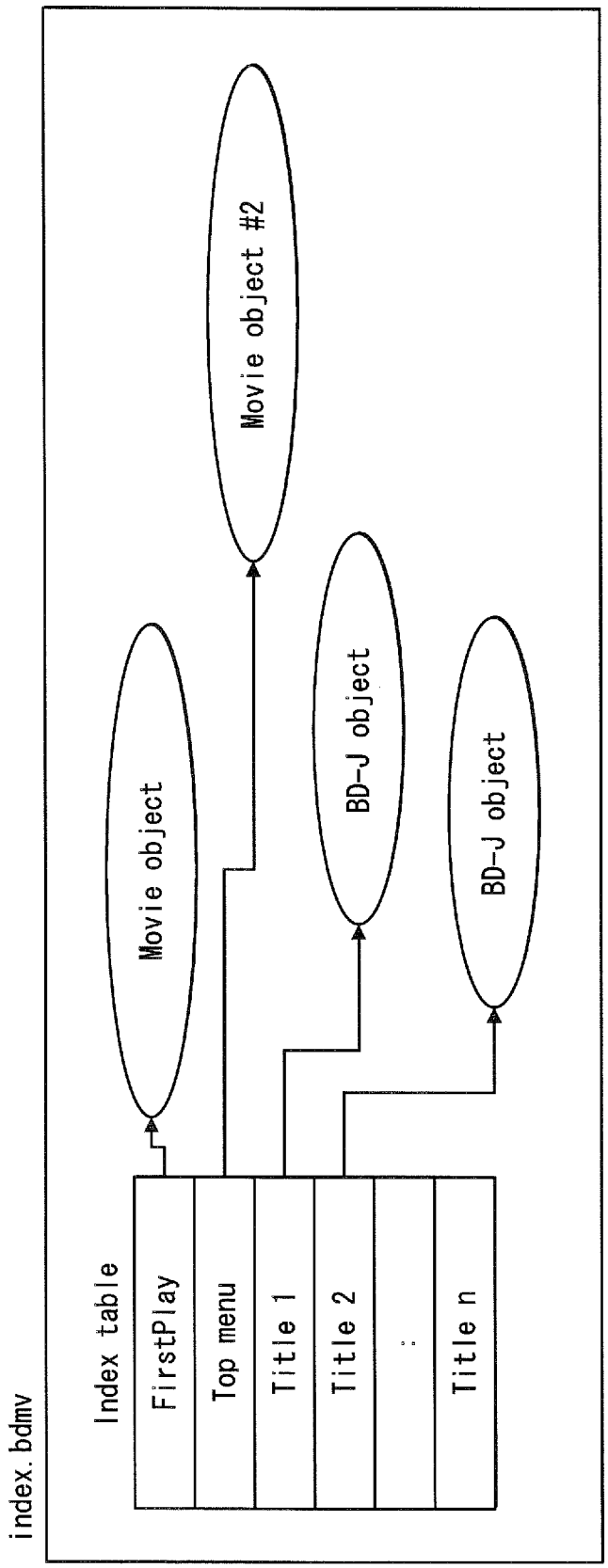
FIG. 3 shows details of an index file.

As shown in FIG. 3, the index table defines correspondence between each title constituting a title structure of the BD-ROM and an operation mode object defining an operation mode. The title structure is explained as follows. When the BD-ROM is inserted, playback of a title (first play title) is started, which is accompanied by a warning display and a logo display from a content provider to the viewer. Once the first play title ends, normal titles (normal titles identified by serial numbers, "1", "2", and "3") constituting a main feature of the movie work is played back. After completion of the playback of the main feature, a title for receiving a title selection (top menu title) is played back to wait for a user selection for a normal title. The top menu title is also played back when the user executes a command, such as "TOP MENU", by operating the remote control. A relation between the movie work and the titles is a relation between the movie work and a plurality of versions of the movie work. That is to say, in the movie work with only a single version, a relation "movie work=title" is satisfied. Each title of the BD-ROM is one of the first play title, the normal title, and the menu title as mentioned above and is allocated with the operation mode object for defining the operation mode. This defines in details the operation mode by which each title is to be operated. The index table does not directly describe the relation between each title and the corresponding video stream, but describes a relation between each title and the corresponding operation mode object through which the video stream is played back. This helps define a title which only causes an operation mode object to operate without AV playback.

<Movie Object File>

Figure 4:
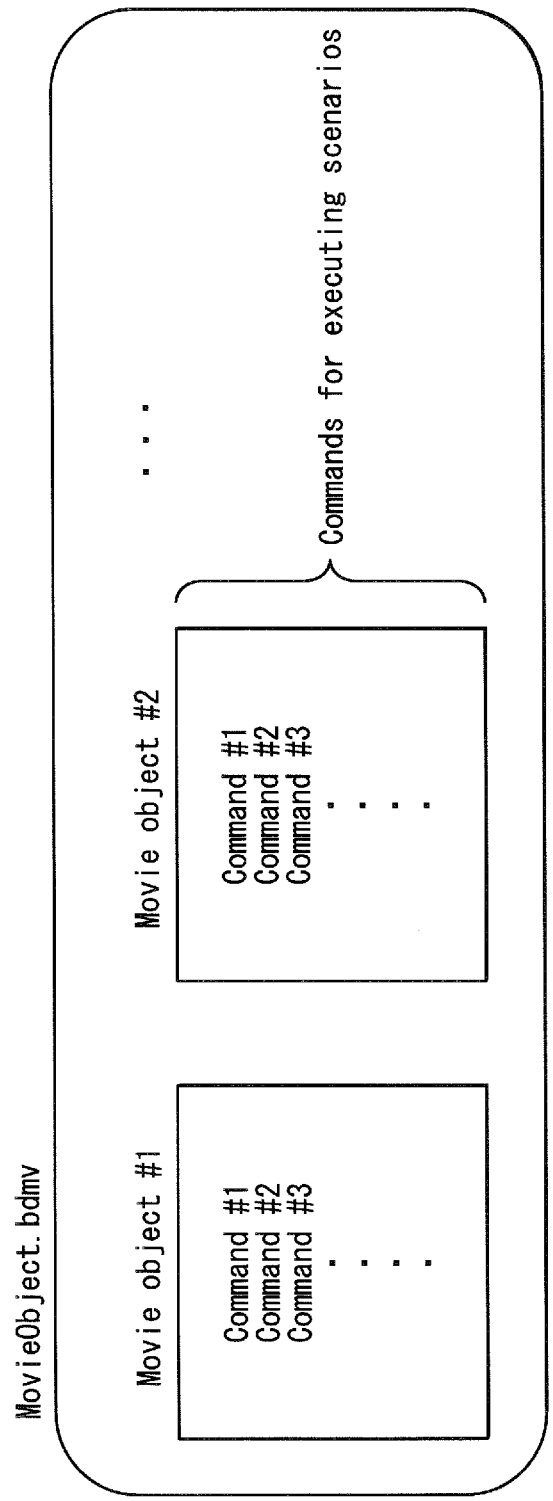
FIG. 4 shows details of a movie object file.

As shown in FIG. 4, the movie object file (MovieObject. Bdmv) defines one or more movie objects. Each movie object is identified by a movie object ID. The movie object is a program file that defines a control procedure to be performed by the playback device in the operation mode (HDMV mode) controlled by the command interpreter. The movie object includes one or more navigation commands, such as a command to play back a playlist and a command to transition to another movie object or another title. The playback device sequentially executes a sequence of the navigation commands. For example, when PlayPL#N is described, the playback device selects a file name of the corresponding playlist from among the PLAYLIST directory and plays back the selected playlist. For example, when JumpObject#N is described, the playback device selects the corresponding movie object from among the movie object file and executes the selected movie object.

<BDJ Object File>

The BD-J object file is a file with an extension "bdjo" ("xxxxx.bdjo" where "xxxxx" is variable and the extension "bdjo" is fixed). The BD-J object file stores a BD-J object which defines a control procedure to be performed by the playback device in a BD-J mode. The BD-J object includes an application management table (ApplicationManagementTable( )), and is data for causing a platform to perform application signaling accompanied by title switching during playback of the BD-ROM. This sort of application whose lifecycle is bound by the application management table is particularly called a "BD-J application". Specifically, applicationManagementTable( ) includes application_id indicating a BD-J application to be executed and application_control_code indicating control to be performed upon execution of the BD-J application. An initial execution state of the application after a title selection is defined by application_control_code, and it can be defined whether the BD-J application is to be automatically started (AUTOSTART) after loaded in a virtual machine, or the BD-J application is not to be automatically started (PRESENT) after loaded in the virtual machine.

<AV Clip>

The AV clip is a stream file with the extension "m2ts" ("xxxxx. m2ts" where "xxxxx" is variable and the extension "m2ts" is fixed), and stores a digital stream in MPEG-2 transport stream format.

FIG. 5 shows a structure of the AV clip. As shown in the figure, the AV clip is obtained by multiplexing at least one of a video stream, an audio stream, a presentation graphics (PG) stream, and an interactive graphics (IG) stream. The video stream refers to primary video and secondary video of a movie. The audio stream refers to primary audio of the movie and secondary audio to be mixed with the primary audio. The presentation graphics stream refers to a text subtitle of the movie. The primary video is normal video displayed on a screen. On the other hand, the secondary video is video displayed in a smaller window within the primary video images. The interactive graphics stream refers to an interactive screen formed by displaying a GUI element on the screen. Each stream included in the AV clip is identified by a PID. For example, the video stream used as video of the movie is assigned with the PID 0x1011, the audio stream is assigned with the PIDs from 0x1100 to 0x111F, the presentation graphics stream is assigned with the PIDs from 0x1200 to 0x121F, the interactive graphics stream is assigned with the PIDs from 0x1400 to 0x141F, the video stream used as the secondary video of the movie is assigned with the PIDs from 0x1B00 to 0x1B1F, the audio stream used as the secondary audio to be mixed with the primary audio is assigned with the PIDs from 0x1A00 to 0x1A1F.

FIG. 6 schematically shows a method for multiplexing of the AV clip. Firstly, each of the video stream including a plurality of video frames and the audio stream including a plurality of audio frames (the first part of the figure) is converted into a PES packet sequence (the second part), and is further converted into a source packet sequence (the third part). Similarly, each of the presentation graphics stream (PG stream) data and the interactive graphics stream (IG stream) data (the seventh part) is converted into a PES packet sequence (the sixth part), and is further converted into a source packet (the fifth part). The obtained source packets constituting the video, the audio, and the graphics are arranged in order of ATSs, thus forming the AV clip multiplexed in a single stream (the fourth part).

FIG. 7A shows further details on a method for storing the video stream in the PES packet sequence. The first part of FIG. 7A indicates a video frame sequence of the video stream. The second part indicates the PES packet sequence. The third part indicates a TS packet sequence obtained by converting the PES packet sequence. As indicated by arrows yg1, yg2, yg3, and yg4 in the figure, pictures are classified into a plurality of video presentation units, namely, I picture, P picture, and B picture, and stored in payloads of PES packets. Each PES packet contains a PES header which stores a PTS (Presentation Time-Stamp) and a DTS (Decoding Time-Stamp). The PTS indicates time at which the picture stored in the PES packet is to be displayed. The DTS indicates time at which the picture stored in the PES packet is to be decoded.

FIG. 7B shows a packet format eventually written in the AV clip. The first part indicates the TS packet sequence and the second part indicates the source packet sequence.

As shown in the first part, each TS packet is a packet of a fixed length and divided into a four-byte "TS header" and a 184-byte "TS payload". The "TS header" includes information, such as a PID, for identifying the stream, and the "TS payload" stores data. The above-described PES packets are classified and stored in the TS payload. In a case of the BD-ROM, as shown in the second part, each TS packet is provided with a four-byte TP_Extra_Header and converted into a 192-byte source packet to constitute the AV clip. Such information as an ATS (Arrival_Time_Stamp) is described in TP_Extra_Header. The ATS indicates time at which the TS packet is to be transferred to a PID filter. In the AV clip, as shown in the third part, the source packets are arranged, and numbers which increment from the beginning of the AV clip are called SPNs (source packet numbers).

In addition to the TS packets of each stream (e.g., video, audio and graphics streams), the AV stream also includes TS packets of a Program Association Table (PAT), a Program Map Table (PMT), a Program Clock Reference (PCR) and the like. The PAT indicates the PID of the PMT used in the AV clip, and has its own PID registered as 0. The PMT includes the PIDs for the video, the audio, and the text subtitle streams included in the AV clip, and attribute information of the streams associated with the PIDs. The PMT also includes various types of descriptors relating to the AV clip. The descriptors particularly include copy control information showing whether copying of the AV clip is permitted or not permitted. The PCR includes STC time information associated with the ATS showing when the PCR packet is to be transferred to the decoder, in order to synchronize an ATC (Arrival Time Clock), which serves as a time axis of the ATS, with a STC (System Time Clock), which serves as the time axis of the PTS and the DTS.

Figure 8:
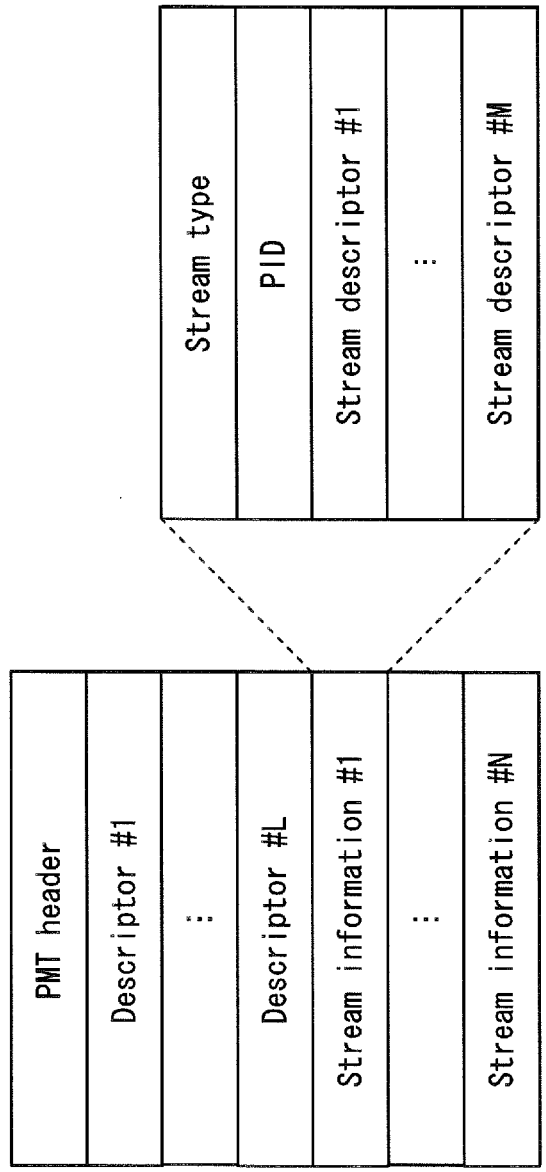
FIG. 8 shows details of a PMT.

FIG. 8 shows details of a data structure of the PMT. At the beginning of the PMT, a PMT header is placed. The PMT header indicates the length of data, and the like included in the PMT. The PMT header is followed by the descriptors relating the AV clip. The copy control information mentioned above and others are described as the descriptors. The descriptors are followed by stream information pieces relating to the respective streams included in the AV clip. Each stream information piece includes a stream type, a stream PID, and stream descriptors. The stream type is information for identifying a codec used for compressing the stream. The stream descriptors describe attribute information of the stream (such as a frame rate and an aspect ratio). There are as many stream descriptors as the number of the streams included in the AV clip.

<Clip Information File>

Figure 9:
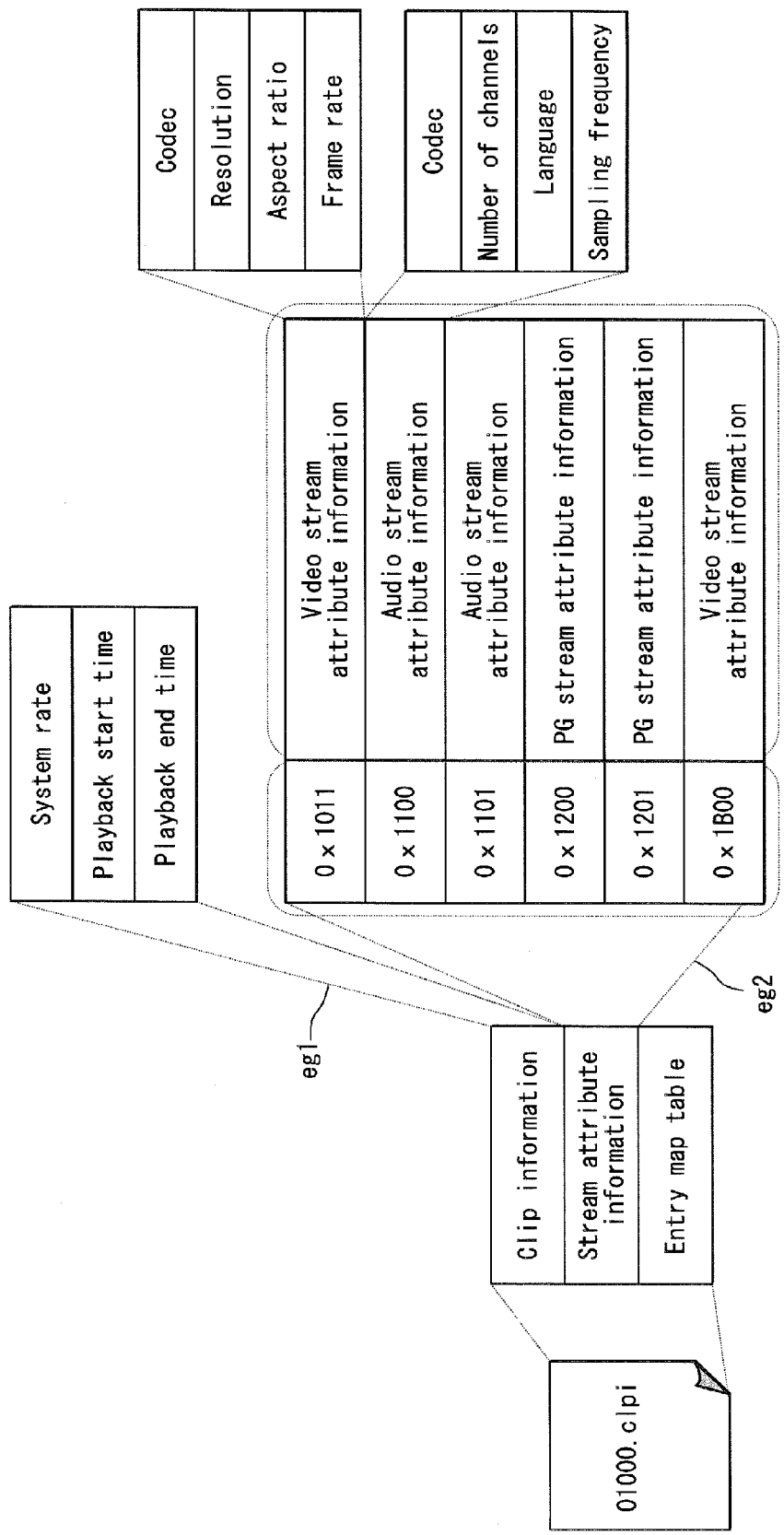
FIG. 9 shows details of a clip information file.

The clip information file with the extension "clpi" ("xxxxx. Clip where "xxxxx" is variable and the extension "clpi" is fixed) is a management information piece associated on a one-to-one basis with the AV clip. As shown in FIG. 9, the clip information file includes clip information, stream attribute information, and an entry map.

The clip information includes a system rate, a playback start time, and a playback end time, as indicated by a leader line eg1. In the playback device, the TS packets belonging to the AV clip are transferred from a read buffer to a system target decoder. The system rate refers to the upper limit of the transfer rate. The interval between the ATSs of the source packets is set so that the transfer rate is limited to the system rate or lower. The playback start time indicates the PTS located at the beginning of the AV clip, e.g. the PTS of the top video frame. The playback end time indicates the value of the STC delayed a predetermined time from the PTS located at the end of the AV clip, e.g. the sum of the PTS of the last video frame and the playback time of one frame.

The stream attribute information registers, for each PID, the attribute information piece of the corresponding stream included in the AV clip, as shown by the leader line eg2. Each attribute information piece is different for the video stream, the audio stream, the presentation graphics stream, and the interactive graphics stream. The attribute information corresponding to the video stream includes a codec type used for compressing of the video stream, as well as a resolution, aspect ratio, and frame rate for each picture constituting the video stream. On the other hand, the attribute information corresponding to the audio stream includes a codec type used for compressing the audio stream, as well as the number of channels included in the audio stream, a language, and a sampling frequency of the audio stream. The playback device uses this attribute information to initialize the decoder prior to playback.

FIGS. 10A shows the entry map table in the clip information file. The entry map table is information table in which the PTSs and the SPNs are described. The PTSs indicate time at which the respective intraframe pictures (referred to below as I pictures) included in the AV clip are to be displayed, and the SPNs are the numbers at which the respective I pictures start in the AV clip.

Here, a pair of a PTS and the corresponding SPN indicated in one row in the table is called an entry point information piece. Also, values starting from the top row as 0 and incremented for each entry point are called entry point IDs (referred to below as "EP_IDs"). Use of the entry point information pieces enables the playback device to specify a position of a file in the AV clip corresponding to any point on the time axis of the video stream, as shown in FIG. 10B. For example, at the time of special playback, such as fast forwarding and rewinding, an I picture registered in an entry point information piece is specified and selected to be played back. This realizes effective processing without a need of analyzing the AV clip. Furthermore, the entry point information pieces are created for the respective video streams multiplexed in the AV clip and managed by the PIDs.

<Playlist File>

Next, a description is given of the playlist file with the extension "mpls" (xxxxx. Mpls where "xxxxx" is variable and the extension "mpls" is fixed).

Figure 11:
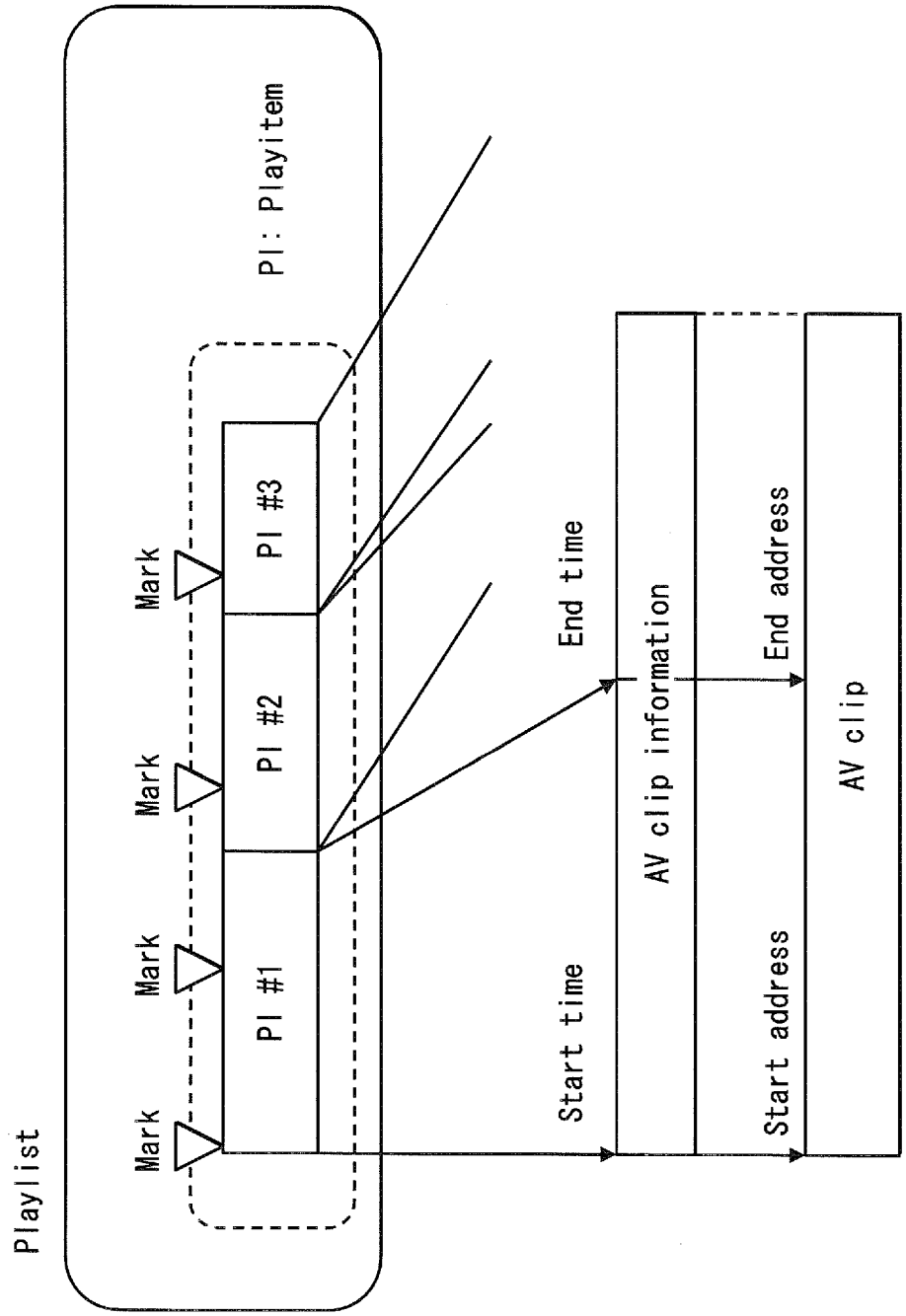
FIG. 11 shows details of a playlist.

The playlist indicates a playback path of the AV clip. As shown in FIG. 11, the playlist includes one or more playitems each indicating a playback section along the AV clip. Each playitem is identified by a playitem ID and described in the playlist in the playitems' playback order. The playlist also includes marks each indicating a playback start point. The marks can be assigned to a playback section defined by a playitem and can be assigned to any point that can be a playback start point. The marks are used for searching for a playback start position during random access. For example, when the playlist file specifies a playback path for a movie title, the entry marks are assigned to the top of each chapter. Consequently, the playback device can play back the movie title by chapters.

Figure 12:
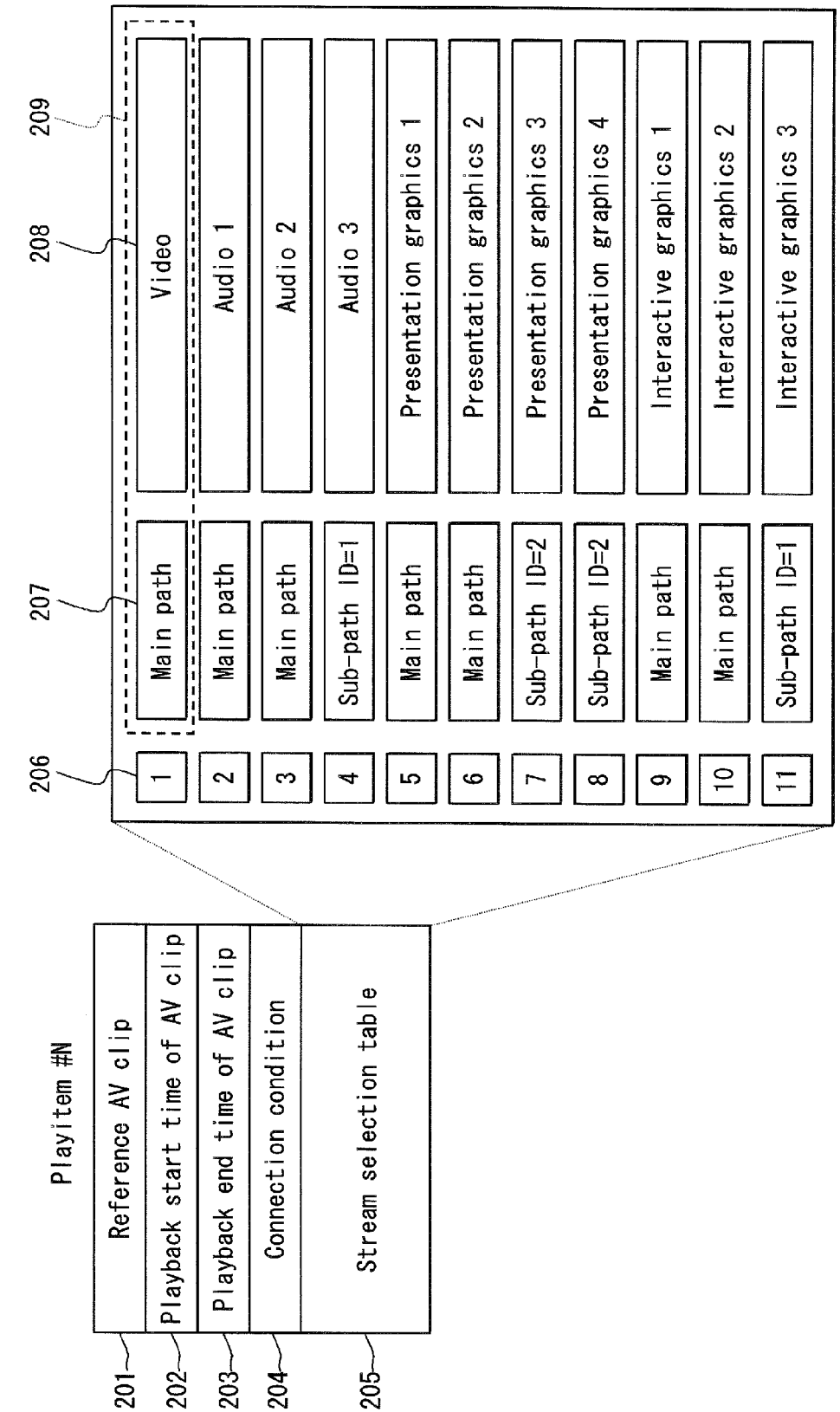
FIG. 12 shows details of a playitem.

The following describes contents of each playitem with reference to FIG. 12. Each playitem includes a reference AV clip 1401, a playback start time 1402, a playback end time 1403, a connection condition 1404, and a stream selection table 1405. The reference AV clip 1401 indicates the AV clip in which the playitem's playback section is defined, with a name of the corresponding clip information file. Since the playback start time and the playback end time are time information pieces, as shown in the lower part of FIG. 13, the playback device acquires the SPNs corresponding to the specified playback start time and playback end time, by referring to the entry map of the clip information file indicated by the reference AV clip 1401. By doing so, the playback device specifies the read start position and performs playback processing. Meanwhile, a playback path of the sequence of playitems is defined as a main path here.

The stream selection table 1405 lists a plurality of stream entries 1409 each composed of a stream selection no. 1406, a stream path information piece 1407, and a stream identification information piece 1408. The stream selection no. 1406 is a number incremented from the top stream entry 1409 listed in the stream selection table, and used by the playback device to identify the stream. The stream path information piece 1407 indicates an AV clip in which the stream indicated by the corresponding stream identification information piece 1408 is multiplexed. For example, the stream path information piece "main path" indicates that the stream is multiplexed in an AV clip of the playitem. On the other hand, the stream path information piece "sub-path ID=1" indicates that the stream is multiplexed in an AV clip of the sub-playitem corresponding to the playback section of the playitem on the sub-path indicated by the sub-path ID. The stream identification information piece 1408 is information, such as the PID, and indicates a stream multiplexed in the reference AV clip. Each stream entry 1409 also stores the attribute information of the corresponding stream. The attribute information herein refers to information indicating characteristics of the stream, and includes a language attribute when the stream is the audio stream, the presentation graphics stream, or the interactive graphics stream, for example.

Figure 13:
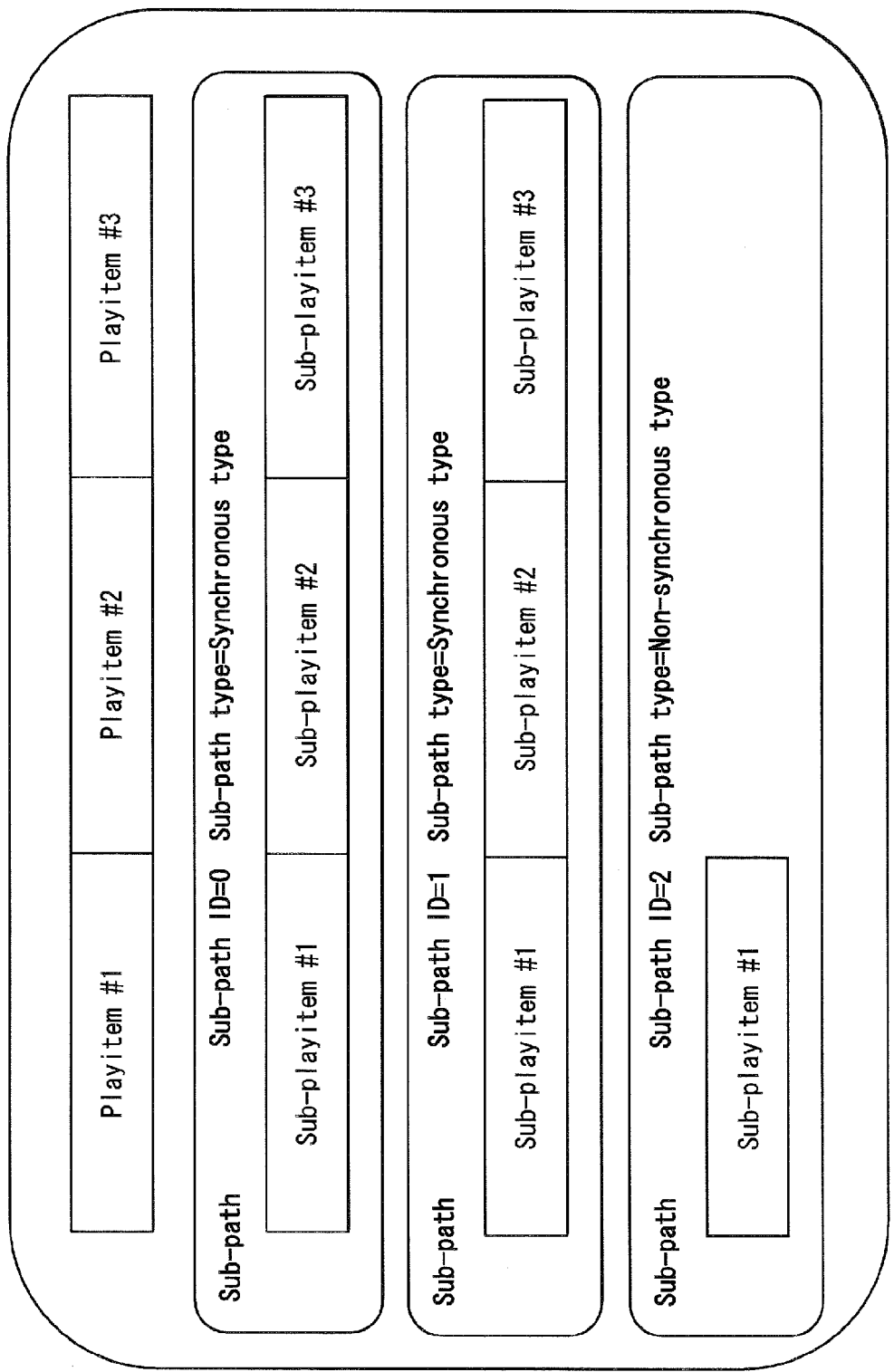
FIG. 13 shows details of a playlist containing sub-paths.

The playlist may include one or more sub-paths, as shown in FIG. 13. The sub-paths are assigned with IDs in order of the sub-paths' registration to the playlist. These IDs are used as sub-path IDs for identifying the sub-paths. Each sub-path indicates a playback path sequence which is to be played back in parallel with the main path. There are two types of sub-paths. One is a synchronous sub-path which is played back in synchronization with playback of the main path, and the other is a non-synchronous sub-path which can be played back without being synchronized with the playback of the main path. These types are described as sub-path types of the respective sub-paths. Like each playitem, each sub-playitem includes the reference AV clip 1401, the playback start time 1402, and the playback end time 1403. When the sub-path is of the synchronous type, the playback start time 1402 and the playback end time 1403 of the sub-playitem are represented by the same time-axis as the main path. On the other hand, when the sub-path is of the non-synchronous type, the playback start time 1403 and the playback end time 1403 are represented by a different time-axis than the main path. For example, suppose that a stream entry 1409 registered in the stream selection table 1405 of a playitem stream #2 indicates presentation graphics 1 with the sub-path ID=0. In this case, the presentation graphics 1 multiplexed in the AV clip of a sub-playitem #2 on the sub-path with the sub-path ID=0, which is to be played back in synchronization with the playback section of the playitem #2, is played back in the playback section of the playitem #2. Also, for example, suppose that the stream entry 1409 registered in the stream selection table 1405 indicates secondary video 1 with the sub-path ID=2. In this case, the secondary video 1 multiplexed in the AV clip of the sub-playitem #1 on the sub-path with the sub-path ID=2 is played back in the playback section of the playitem #2.

<JAR File>

Next, a description is given of the JAR file with the extension "jar" (xxxxx. jar where "xxxxx" is variable and the extension "jar" is fixed).

The JAR file stores a BD-J application. The BD-J application is a Java™ application operated in a Java™ platform fully provided with Java™ 2 Micro_Edition (J2ME) Personal Basis Profile (PBP 1.0), and Globally Executable MHP specification (GEM1.0.2) for package media targets.

The BD-J application is controlled by Application Manager through a xlet interface. The xlet interface has four states, i.e. "loaded", "paused", "active", and "destroyed" states.

The above-described Java™ platform includes a standard Java™ library for displaying image data of JFIF (JPEG), PNG, and other formats. With this construction, the Java™ application can realize a GUI framework that includes the HAVi framework defined in GEM1.0.2 and also includes a remote control navigation mechanism in GEM1.0.2.

With such a construction, the Java™ application can realize a screen display that includes display of buttons and texts, and an online display (contents of BBS) or the like based on the HAVi framework, simultaneously with displaying a moving image on the same screen. In addition, the screen display presented by the Java™ application can be controlled by the remote control.

Such a BD-J application is composed of a series of files, and these files are converted into a Java™ archive file which conforms to a specification described on the website http://Java.sun.com/j2se/1.4.2/docs/guide/jar/jar.html. The Java™ archive file is in a Java™-specific zip format file whose contents can be viewed by using commercially available ZIP extraction software.

Note that a description is given later in details on operations of the BD-J application, and the BD-J application has a program to perform the following five operations.

(1) Playing back a playlist through a playback control unit 7 which is described later. The playlist playback herein refers to playback of an AV clip managed by the playlist.

(2) Acquiring an update kit from a WWW server, such as the interne, and stores the acquired update kit in the local storage.

(3) Instructing a virtual file control unit 20 to construct a virtual file by combining the BD-ROM with the update kit.

(4) Setting a value in a register set in the playback device.

(5) Transferring, to the system target decoder, PNG/JPEG-formatted data for menu and game graphics, and displays the decoded data.

The above operations can be flexibly performed according to a configuration of the program, and a method for controlling the operations is determined according to a BD-J application programming process in an authoring process.

This concludes the data structure of the BD-ROM which is the recording medium according to the present invention.

<Playback Device 102>

Next, a description is given of the playback device and a playback method according to the present invention.

Figure 14:
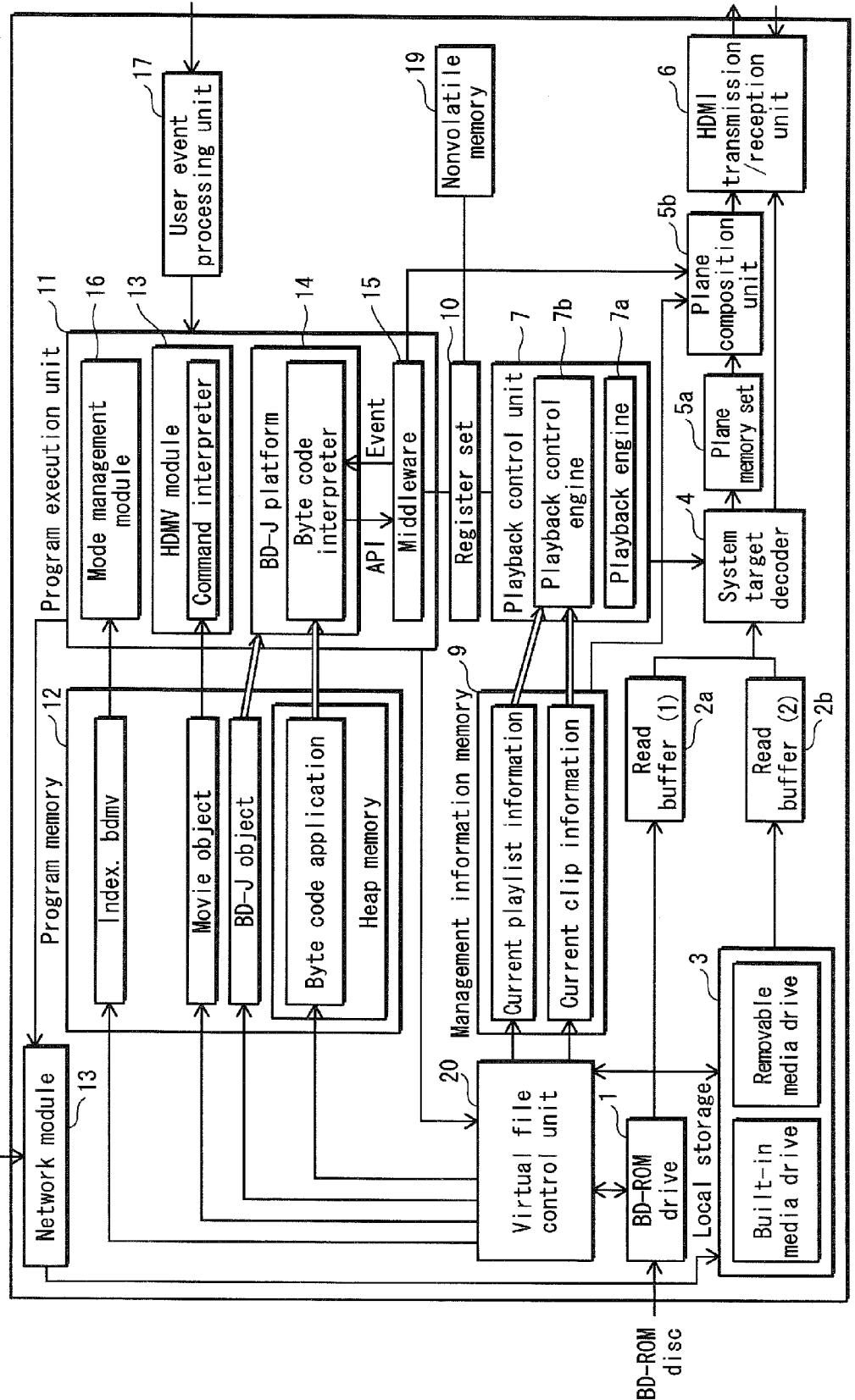
FIG. 14 shows an internal structure of a playback device.

FIG. 14 shows a structure of the playback device 102. The playback device 102 includes a BD-ROM drive 1, a read buffer (1) 2a, a read buffer (2) 2b, a local storage 3, a system target decoder 4, a plane memory set 5a, a plane composition unit 5b, an HDMI transmission/reception unit 6, the playback control unit 7, a management information memory 9, a register set 10, a program execution unit 11, a program memory 12, a network module 13, a user event processing unit 17, a nonvolatile memory 19, and the virtual file control unit 20.

The BD-ROM drive 1 reads out data from a BD-ROM disc based on a request from the virtual file control unit 20. An AV clip read out from the BD-ROM disc is transferred to the read buffer (1) 2a. From the BD-ROM disc, not only an AV clip but also an index file, a movie object file, a playlist file, a clip information file, a BD-J object file, and a JAR file are read out. These files are transferred to the virtual file control unit 20.

The read buffer (1) 2a is a buffer composed of, for example, a memory for temporarily storing data read by the BD-ROM drive.

The local storage 3 includes a built-in media drive for accessing a hard risk, and a removable media drive for accessing a semiconductor memory card, such as the SD memory card. The local storage 3 stores therein an update kit downloaded from an external I/F, such as the network module 13, data to be used by applications, and the like. An area for storing the update kits is divided into small areas that are in one-to-one correspondence with BD-ROMs. Also, an area for storing data used by applications is divided into small areas that are in one-to-one correspondence with applications. Data, such as an update kit, stored in the SD memory card or the like is read out by the local storage 3 in accordance with a request from the virtual file control unit 20. From among the read data, an AV clip is transferred to the read buffer (2) 2b. Note that a description is given later of a data structure of the update kit, and the data read out by the local storage 3 includes not only an AV clip, but also an index file, a movie object file, a playlist file, a clip information file, a BD-J object file, a JAR file, and a merge management information. Such data is transferred to the virtual file control unit 20.

The read buffer (2) 2a is a buffer composed of, for example, a memory for temporarily storing data read by the local storage 3.

The system target decoder 4 decodes and plays back the streams by performing demultiplexing processing on the source packets read out into the read buffer (1) 2a and the read buffer (2) 2b. The system target decoder 4 also performs processing of decoding and playing back the JPEG-formatted and the PNG-formatted graphics data for menu display and others, upon being instructed by the program execution unit 11. A description is given later of details of the system target decoder 4.

The plane memory set 5a is composed of a plurality of plane memories. The plane memories include a primary video plane, a secondary video plane, an IG plane, a PG plane, and a BD-J plane.

The plane composition unit 5b instantaneously superimposes data written in the respective memories of the plane memory set 5a, and outputs the superimposed images into the HDMI transmission/reception unit 6.

The HDMI transmission/reception unit 6 performs an authentication phase and a negotiation phase in conformity to, for example, the HDMI standard (HDMI: High Definition Multimedia Interface), and outputs image data to the television 103.

The playback control unit 7 includes a playback engine 7a and a playback control engine 7b, and controls playback of the playback device, such as playback processing of an AV clip via the playlist information, in accordance with a playback command from the program execution unit 11 and a notification from the user event processing unit 17. The playback control unit 7 also sets and updates various player variables in the register set 10 in accordance with changes in playback states. Furthermore, the playback control unit 7 refers to the player variables to specify, to the system target decoder 4, an elementary stream to be decoded and offers information necessary for decoding the respective elementary streams.

The playback engine 7a executes AV playback functions. The AV playback functions refer to a group of functions succeeded from DVD and CD players. the AV playback functions are processing, such as starting playback, stopping playback, pausing, canceling pausing, canceling still image function, fast forward performed by specifying an immediate value indicating the playback speed, rewind performed by specifying an immediate value indicating the playback speed, switching audio, switching picture data for secondary video, switching angle, and the like.

The playback control engine 7b executes playlist playback functions in response to a function call from the command interpreter (which is the operator of the HDMV mode) and the Java™ platform (in which the BD-J mode is operated). The playlist playback functions are processing of performing, from among the aforementioned AV playback functions, the playback start and the playback stop in accordance with the current playlist information constituting the current playlist and the current clip information.

The management information memory 9 is a memory for storing the current playlist information and the current clip information. The current playlist information is a playlist information piece that is currently being a target of processing, from among a plurality of playlist information pieces that can be accessed from the BD-ROM, the built-in media drive, or the removable media drive. The current clip information is a playlist information piece that is currently being a target of processing, from among a plurality of clip information pieces that can be accessed from the BD-ROM, the built-in media drive, or the removable media drive.

The register set (a player state/setting register set) 10 is a set of registers for storing the player variables. There are two types of the player variables: a system parameter (SPRM); and a general-purpose parameter (GPRM) for storing arbitrary information that is to be used by program files. An SPRM indicates the playback state of the playback device 102. FIG. 15 is a list of SPRMs. Each SPRM is assigned with a serial number, and each serial number is associated with a unique variable value. The contents of major SPRMs are shown below. Here, the numbers in parentheses indicate the serial numbers.

SPRM(0): Language code
SPRM(1): Primary audio stream number
SPRM(2): Subtitle stream number
SPRM(3): Angle number
SPRM(4): Title number
SPRM(5): Chapter number
SPRM(6): Program number
SPRM(7): Cell number
SPRM(8): Key name
SPRM(9): Navigation timer
SPRM(10): Current playback time
SPRM(11): Player audio mixing mode for karaoke
SPRM(12): Country code for parental management
SPRM(13): Parental level
SPRM(14): Player configuration for video
SPRM(15): Player configuration for audio
SPRM(16): Language code for audio stream
SPRM(17): Language code extension for audio stream
SPRM(18): Language code for subtitle stream
SPRM(19): Language code extension for subtitle stream
SPRM(20): Player region code
SPRM(21): Secondary video stream number
SPRM(22): Secondary audio stream number
SPRM(23): Player state
SPRM(24): Reserved
SPRM(25): Reserved
SPRM(26): Reserved
SPRM(27): Reserved
SPRM(28): Reserved
SPRM(29): Reserved
SPRM(30): Reserved
SPRM(31): Reserved The SPRM(10) indicates the PTS of the picture currently being decoded and is updated every time a picture is decoded and written into the primary video plane memory. Accordingly, the current playback point can be known by referring to the SPRM(10).

The language code for audio stream in SPRM(16) and the language code for text subtitle stream in SPRM(18) show default language codes of the playback device 102. These codes may be changed by a user with use of the OSD or the like of the playback device 102, or the codes may be changed by an application program via the program execution unit 11. For example, if the SPRM(16) shows "English", then during playback processing of a playlist, the playback control unit 7 first searches the stream selection table of the playitem for a stream entry having the language code for "English". The playback control unit 7 then extracts the PID from the stream identification information of the stream entry and transmits the extracted PID to the system target decoder 4. As a result, an audio stream having the PID is selected and decoded by the system target decoder 4. These processes can be executed by the playback control unit 7 with use of the movie object file or the BD-J object file.

During playback processing, the playback control unit 7 controls the playback while checking values set as the player variables. The playback control unit 7 updates the SPRM(1), the SPRM(2), the SPRM(21), and the SPRM(22), in particular. These SPRM respectively show, in the stated order, the stream numbers of the audio stream, the text subtitle stream, the secondary video stream, and the secondary audio stream that are currently being processed. For example, suppose that the SPRM(1) indicating the STN of the audio stream has been changed by the program execution unit 11. In this case, the playback control unit 7 first refers to the STN shown by the new SPRM(1) and retrieves the stream entry that includes this STN from the STN table of a playitem currently being processed. The playback control unit 7 then extracts the PID from the stream identification information of the stream entry and transmits the extracted PID to the system target decoder 4. As a result, an audio stream having the PID is selected and decoded by the system target decoder 4. This is how the audio stream to be played back is switched. The text subtitle stream and the secondary video stream to be played back can be similarly switched.

The program execution unit 11 includes an HDMV module 13, a BD-J platform 14, a middleware 15, and a mode management module 16. The program execution unit 11 is a processor for executing a program stored in a BD program file.

The HDMV module 13 is a DVD virtual player in which the HDMV mode is operated. The HDMV module 13 is also an executor of the HDMV mode. The HDMV module 13 has a command interpreter, and performs the control in the HDMV mode by interpreting and executing the navigation command constituting the movie object. The navigation command is described in a syntax that resembles a syntax used in the DVD-Video. Accordingly, it is possible to realize a DVD-Video-like playback control by executing the navigation command.

The BD-J platform 14 is a Java™ platform in which the BD-J mode is operated, and is fully implemented with Java2 Micro_Edition (J2ME) Personal Basis Profile (PBP 1.0) and Globally Executable MHP specification (GEM 1.0.2) for package media targets. The BD-J platform 14 is composed of a class loader, a byte code interpreter, and an application manager. The BD-J platform 14 realizes various functions in accordance with a BD-J application to be executed.

The class loader is one of system applications, and loads a BD-J application by reading out byte codes from the class file residing in the JAR archive file, and storing the byte codes into the heap memory.

The byte code interpreter is what is called a Java™ virtual machine. The byte code interpreter converts (i) the byte codes constituting the BD-J application stored in the heap memory and (ii) the byte codes constituting the system application, into native codes, and causes the MPU to execute the native codes.

The application manager is one of system applications, and performs application signaling for the BD-J application (e.g., starts or ends the BD-J application) based on the application management table in the BD-J object. This concludes the description of the internal structure of the BD-J platform.

The middleware 15 is an operating system for the embedded software, and is composed of a kernel and a device driver. The kernel provides the BD-J application with a function unique to the playback device, in response to a call for the Application Programming Interface (API) from the BD-J application. The middleware 15 also realizes control of the hardware, such as starting the interruption handler by sending an interruption signal.

The mode management module 16 holds Index.bdmv that has been read out from the BD-ROM, built-in media drive, or removable media drive, and performs mode management and branch control. The mode management by the mode management module is module assignment to cause either the BD-J platform 14 or the HDMV module 13 to execute the dynamic scenario.

The program memory 12 stores a current dynamic scenario, and is used for processing performed by the HDMV module (which is an operator of the HDMV mode) and the Java™ platform (in which the BD-J mode is operated). The current dynamic scenario is one of the Index.bdmv, the BD-J object, and the movie object recorded on the BD-ROM which is currently being a target of execution. The program memory 12 includes a heap memory. The heap memory is a stack region for storing byte codes of the system application, byte codes of the BD-J application, system parameters used by the system application, and application parameters used by the BD-J application.

The network module 13 is a module that controls data communication with an external network, and acquires an update kit from the WWW server, such as the interne, and transfers the acquired update kit to the local storage.

The user event processing unit 17 receives a user operation via a remote control, and causes the program execution unit 11 or the playback control unit 7 to perform processing as instructed by the received user operation. For example, when the user presses a button on the remote control, the user event processing unit 17 instructs the program execution unit 11 to execute a command included in the button. For example, when the user presses a fast forward or rewind button on the remote control, the user event processing unit 17 instructs the playback control unit 7 to execute the fast forward or rewind processing on the AV stream of the playlist currently being played back.

The nonvolatile memory 19 is a recording medium that is, for example, a readable/writable memory, and is a medium such as flash memory or FeRAM that can preserve the recorded data even if power is not supplied thereto. The nonvolatile memory 19 is used to store a backup of data stored in the register set 10.

The virtual file control unit 20 controls the BD-ROM drive 1 and the local storage 3, and realizes functions of the virtual file system. The functions of the virtual file system refer to construction of a virtual package and control over access to a ROM disc or the local disc via the virtual package. The virtual package is a virtual BD-ROM package on a memory obtained by combining a content recorded on a BD-ROM disc with an update kit stored in the local storage 3 based on the merge management information stored in the local storage 3. The constructed virtual package has the same format as the data structure of a BD-ROM. On the virtual package, it is possible not only to add a file into an original ROM disc but to replace an original file on the ROM disc with a file stored in the local storage. The construction of a virtual package by the virtual file control unit 20 is triggered by insertion of a BD-ROM disc and a command from the program execution unit 11 to construct a virtual file, and executed when playback of a title is interrupted (e.g. at timing of switching a title being played back). A description is given later of the construction of a virtual package and the file access control via the virtual package.

Figure 16:
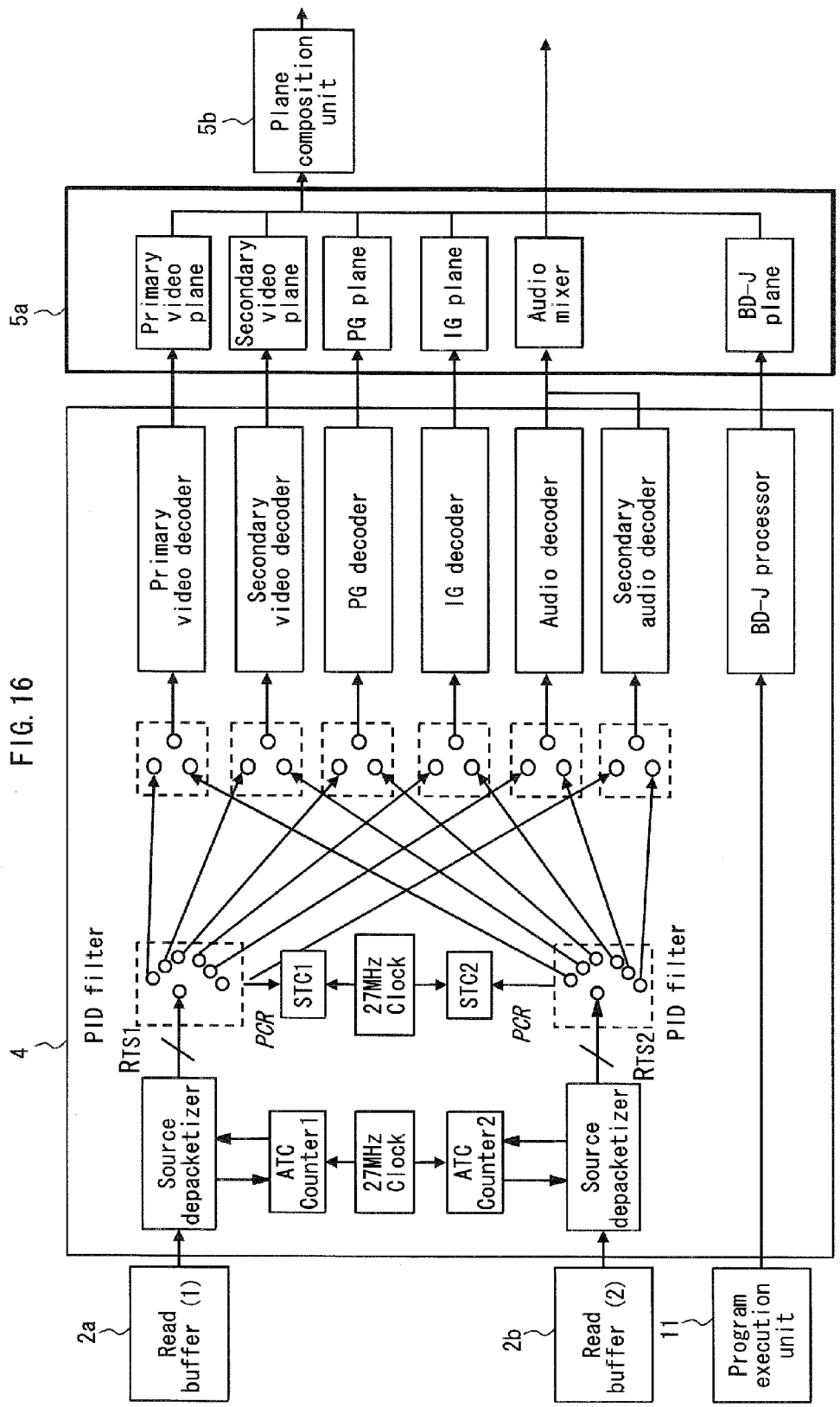
FIG. 16 shows an internal structure of a system target decoder.

Next, a description is given of the system target decoder 4 with reference to FIG. 16.

A source depacketizer of the system target decoder 4 interpretes each of the source packets transferred to the system target decoder 4, extracts a TS packet from the source packet, and transfers the extracted TS packet to the PID filter. In transferring the TS packet, the source depacketizer adjusts the time of input into the decoder in accordance with the ATS of the source packet. Specifically, the source depacketizer transfers only the TS packet to the PID filer according to the recording rate of the AV clip at a moment when the value of the ATC generated by the ATC counter becomes equal to the value of the ATS of the source packet.

Referring to the PIDs, the PID filter transfers, from among the TS packets output from the source depacketizer, TS packets having a PID that matches a PID required for playback, to a primary video decoder, a secondary video decoder, an IG decoder, a PG decoder, a primary audio decoder, or a secondary audio decoder. For example, in the case of the BD-ROM, the TS packets including the PID 0x1011 are transferred to the primary video video decoder, the TS packes including the PIDs from 0x1B00 to 0x1B1F are transferred to the secondary video video decoder, the Ts packets including the PIDs from 0x1100 to 0x111F are transferred to the primary audio decoder, the TS packets including the PIDs from 0x1A00 to 0x1A1F are transferred to the secondary audio decoder, the TS packets including the PIDs from 0x1200 to 0x121F are transferred to the PG decoder, and the TS packets including the PIDS from 0x1400 to 0x141F are transferred to the IG decoder.

As shown in FIG. 16, the system target decoder 4 includes two pairs of the source depacketizer and the PID filter: one pair processes an AV clip transferred from the read buffer (1); and the other pair processes an AV clip transferred from the read buffer (2). An AV clip referred to by a main path is, when the sub-path is of the synchronized type, played back in synchronization with an AV clip referred to by the sub-path. An AV clip referred to by a main path is, when the sub-path is of the non-synchronized type, not played back in synchronization with an AV clip referred to by the sub-path.

The primary video decoder includes a buffer storing data. The primary video decoder also removes information, such as the TS headers and the PES headers, from the stored data to take out coded pictures (I picture, P picture, and B picture) so that the respective images on the video stream are decoded at predetermined decoding times (DTSs) and a plurality of frame images are created. The primary video decoder outputs the created frame images to the primary video plane at the respective display times (PTSs). Methods for compressing and encoding the video stream multiplexed in the AV clip include MPEG2, MPEG-4 AVC, and VC1, and decoding methods for the compressed images are switched according to the attribute of the stream.

The secondary video decoder has the same structure as the primary video decoder, decodes an secondary video stream input thereto, and writes the resultant pictures to the secondary video plane in accordance with respective display times (PTSs).

The IG decoder 38 extracts an interactive graphics stream from the TS packets input from the source depacketizer, decodes the extracted interactive graphics stream, and writes the resultant uncompressed graphics data to the IG plane in accordance with respective display times (PTSs).

The PG decoder extracts a presentation graphics stream from the TS packets input from the source depacketizer, decodes the extracted presentation graphics stream, and writes the resultant uncompressed graphics data to the PG plane in accordance with respective display times (PTSs).

The primary audio decoder includes a buffer storing therein data. The primary audio decoder also removes the TS headers and the PES headers from the stored data to perform audio stream decode processing so that uncompressed LPCM audio data is obtained. The primary audio decoder outputs the created frame images to an audio mixer at the respective playback times (PTSs). Methods for compressing and encoding the audio stream multiplexed in the AV clip include AC3 and DTS, and decoding methods for the compressed audio are switched according to the attribute of the stream.

The secondary audio decoder has the same structure as the primary audio decoder, decodes a secondary audio stream input thereto, and outputs resultant uncompressed LPCM audio data to the audio mixer in accordance with respective playback times (PTSs). Methods for compressing and encoding the audio stream multiplexed in the AV clip include DolbyDigitalPlus and DTS-HD LBR, and decoding methods for the compressed audio are switched according to the attribute of the stream.

The audio mixer mixes (i.e. superimposes audio of) the uncompressed audio data output from the primary audio decoder with the uncompressed audio data output from the secondary audio decoder and outputs the mixed audio data to a speaker or the like.

A BD-J processor decodes the graphics data (PNG, JPEG) transferred from the program execution unit 11 and outputs the decoded graphics data to the BD-J plane in accordance with the display time specified by the BD-J application.

This concludes the description of the internal structure of the playback device.

<Virtual File System>

A description is given of the construction of a virtual package and the file access associated with the virtual package.

The virtual package is constructed by files stored on the BD-ROM 101 and an update kit stored in the SD memory card 104 inserted into the local storage 3. First of all, a description is given of a data structure of the update kit stored in the SD memory card 104.

<Update Kit>

Figure 17:
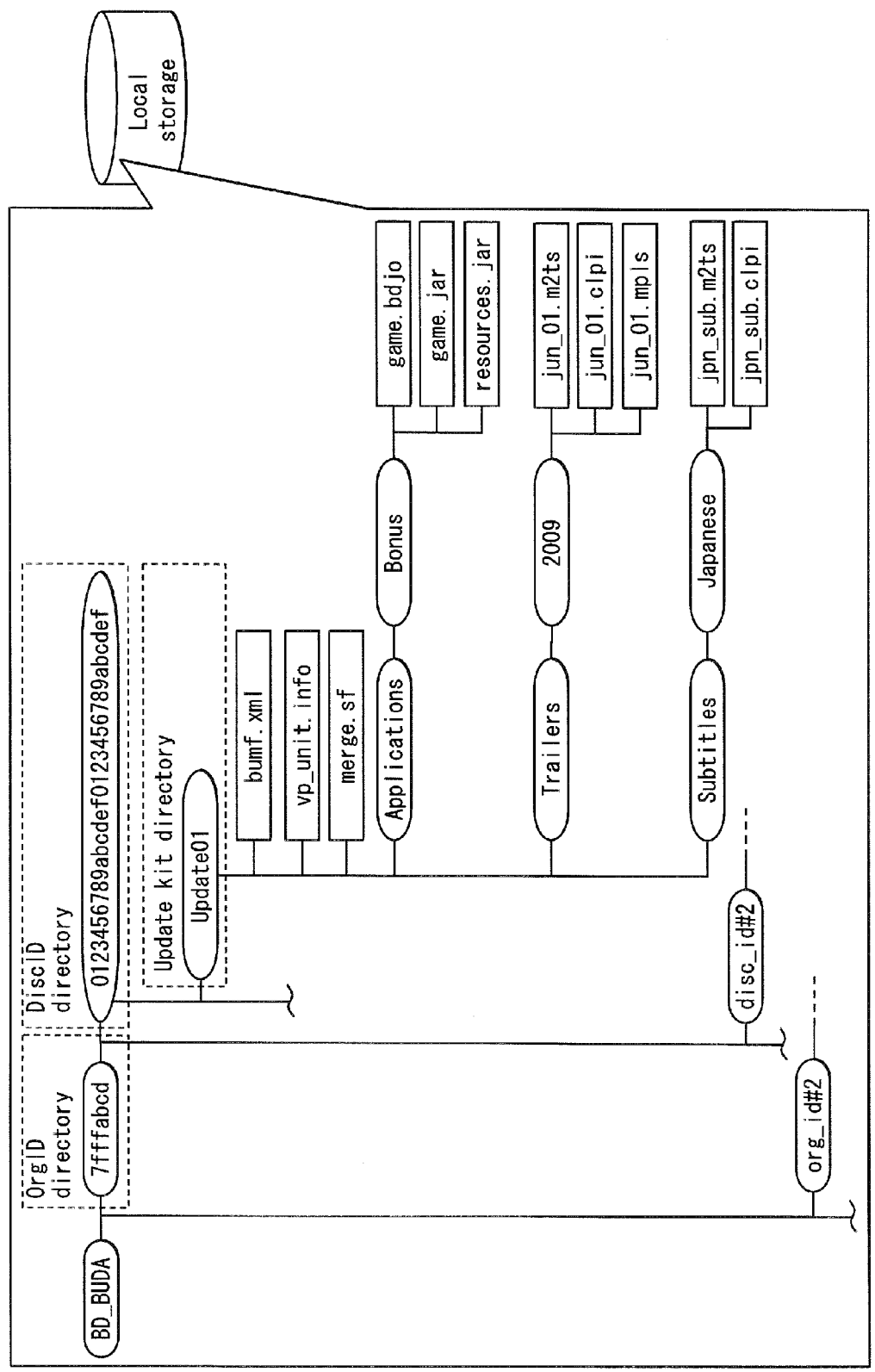
FIG. 17 shows a file directory structure of an update kit.

FIG. 17 shows the area in the SD memory card 104 for storing the update kits. The area in the SD memory card 104 for storing the update kits is divided into areas that are in one-to-one correspondence with BD-ROMs, with use of an OrgID directory and a DiscID directory. An update kit storage area root directory is found immediately under the root directory of the SD memory card 104, indicates a root of the area for storing the update kits (i.e. update kit storage area), and has a directory name of a fixed value (BD_BUDA).

The OrgID directory is a directory whose name is composed of eight characters, and which represents, by hexadecimal notation, a 32-bit identifier (OrganizationID) for identifying the provider of the movie work, described in the BD management information (index file) of the BD-ROM recording layer. The successive "0"s at the head of the OrganizationID are omitted from the directory name. For example, when the OrganizationID is 0x0000001A, the directory name is "1A".

The DiscID directory is a directory which represents, by hexadecimal notation, four 32-bit parts that are obtained by separating the 128-bit identifier (DiscID) for identifying the BD-ROM recording layer, described in the BD management information (index file) of the BD-ROM recording layer. As is the case with the OrganizationID, the successive "0"s at the head of the DiscID are omitted from the directory name.

Under the DiscID directory, update kit directories are provided in one-to-one correspondence with the update kits. An update kit is found under each update kit directory. In an example of FIG. 17, an update kit named "Update01" is stored under a DiscID directory with a directory name "0123456789abcdef0123456789abcdef".

Each update kit includes a merge management information file (bumf. xml), a signature information file (merge. sf), a state signaling file (vp_unit. info), and other additional content data files (e.g. game. bdjo, game. jar, resources. jar, jun_01. m2ts, jun_01. clip, jun_01. mpls, jpn_sub. m2ts, and jpn_sub. clpi).

Figure 18:
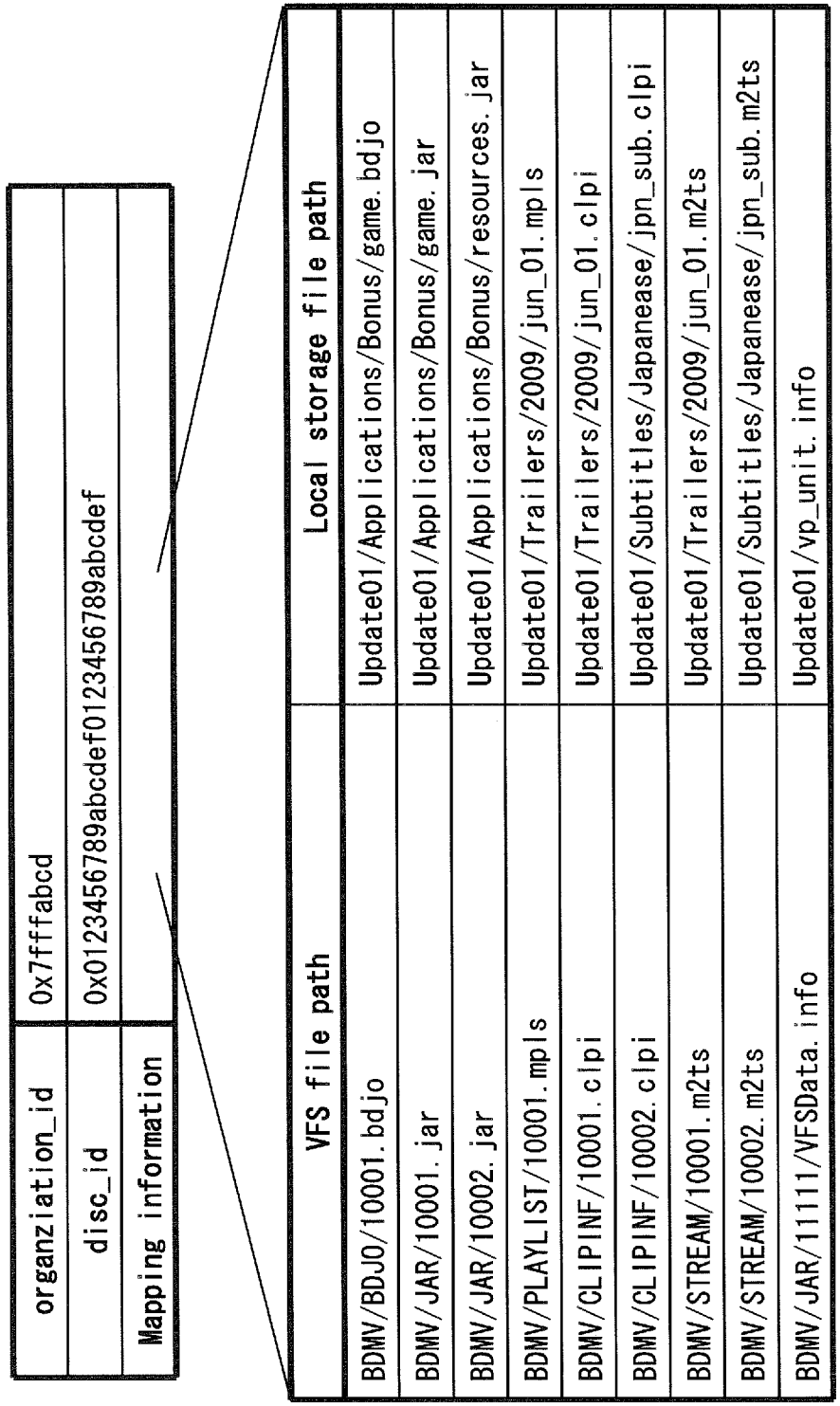
FIG. 18 shows details of a merge management information file.

The merge management information file (bumf. xml) stores the OrganizationID, the DiscID, and mapping information, as shown in FIG. 18. The mapping information is a table that brings file paths (referred to below as local storage file paths) of additional content data files constituting the virtual package as well as the state signaling file in the SD memory card 104 into one-to-one correspondence with virtual paths (referred to below as VFS file paths) for accessing these files on the virtual file system. Specifically, as shown in FIG. 18, in the mapping information, the local storage file paths are described as relative paths for the update kit directory, and the VFS file paths are described as relative paths for a disc root directory. The merge management information file further stores hash values of the respective additional content data files indicated by the mapping information.

The signature information file is a file indicating an electronic signature applied by the provider to the merge management information file, and is stored immediately under the update kit directory with a file name "MERGE.sf". The encrypted hash value is generated by calculating a hash value for the information that needs to be protected from tampering, and encrypting the hash value using a predetermined private key. In the signature information file of the present embodiment, the hash value for the merge management information file is encrypted using a private key corresponding to a public key contained in a merge certificate recorded in the BD-ROM recording layer.

The merge certificate is a certificate that is used for authenticating the merge management information file, and includes a public key publicized by the provider. The merge certificate provided from the provider is stored in BD-ROM recording layer, with a file name "bd. cert". The file format of the merge certificate may be, for example, X.509.

The additional content data files are a group of files that are to be added/updated with respect to the original contents recorded in the BD-ROM recording layer. Playlist files, AV clips, clip information files, movie object files, BD-J objects, JAR files, index files, and the like are recorded here.

The state signaling file is a file that is used for determining the virtual package construction state by the BD-J application in the playback device according to the present invention. In any update kit, a fixed path "BDMV/JAR/11111NFSData. info" shown in FIG. 18 is assigned as the VFS file path of the state signaling file by the corresponding merge management information file. In the authoring process of a BD-ROM, it is prohibited to create a file corresponding to the file path "BDMV/JAR/11111/VFSData. info" on the BD-ROM.

Meanwhile, a content of the state signaling file is no particular object for the purpose of determining the virtual package construction state. In the present embodiment, a VP information file (vp_unit. info) indicating the content of the update kit is used as the state signaling file. FIG. 19 shows the content of the state signaling file according to the present embodiment. Specifically, the OrganizationID and the DiscID of the associated ROM disc, an identifier, a name, and a version number of the update kit, details of the data included in the update kit, a file name of a video image representing the update kit, and text information in various languages representing the update kit are recordind in the state signaling file. The above information makes it possible to easily obtain the version of the update kit and detailed contents of the data included in the update kit. Note that the information recorded in the file of FIG. 19 may be added or deleted as needed. For example, the OrganizationID and the DiscID of the associated ROM disc may be deleted, or a plurality of OrganizationIDs and a plurality of DiscIDs may be recorded. Furthermore, the above information may be recorded in the state signaling file in a text format, an XML (Extensible Markup Language) format, a binary format, or the like.

<Construction of Virtual Package>

Next, a description is given of processes of constructing a virtual package by the virtual file control unit 20 with use of contents recorded on the BD-ROM 101 and contents recorded in the SD memory card 104 based on the contents of the merge management information file.

The virtual file control unit 20 constructs a virtual package by the following processes (1) to (5).

(1) Determinating Tampering of the Merge Management Information File

The file control unit 20 determines whether the merge management information file has been tampered with by calculating a hash value from the merge management information file and comparing a value obtained by decrypting, with use of the public key contained in the merge certificate in the BD-ROM storage layer, a hash value of the merge management information file indicated by the signature information file with the calculated hash value. When the calculated hash value matches the decrypted hash value, it is determined that the merge management information file has not been tampered with.

(2) Checking Presence of Additional Content Data Files

In the case where the merge management information file has not been tampered with, file control unit 20 confirms that the respective additional content data files reside on the local storage file paths indicated by the mapping information.

(3) Determining Tampering of the Additional Content Data Files

The file control unit 20 calculates hash values for the respective additional content data files, and compares the calculated hash values with hash values of the respective additional content data files recorded in the mapping information. When the calculated hash values match the recorded hash values, it is determined that the additional content data files have not been tampered with.

(4) Changing the Additional Content Data Files to Read-only Attributes

In the case where the respective additional content data files whose correspondence is indicated by the mapping information have not been tampered with, file control unit 20 changes the additional content data files to read-only attributes.

(5) Allocating to VFS File Paths

The file control unit 20 reads the mapping information in the merge management information file, creates a disc image in which the respective update kit files are allocated to the VFS file paths indicated by the mapping information, and provides the created disc image to the playback control unit 7 and the program execution unit 11.

Figure 20:
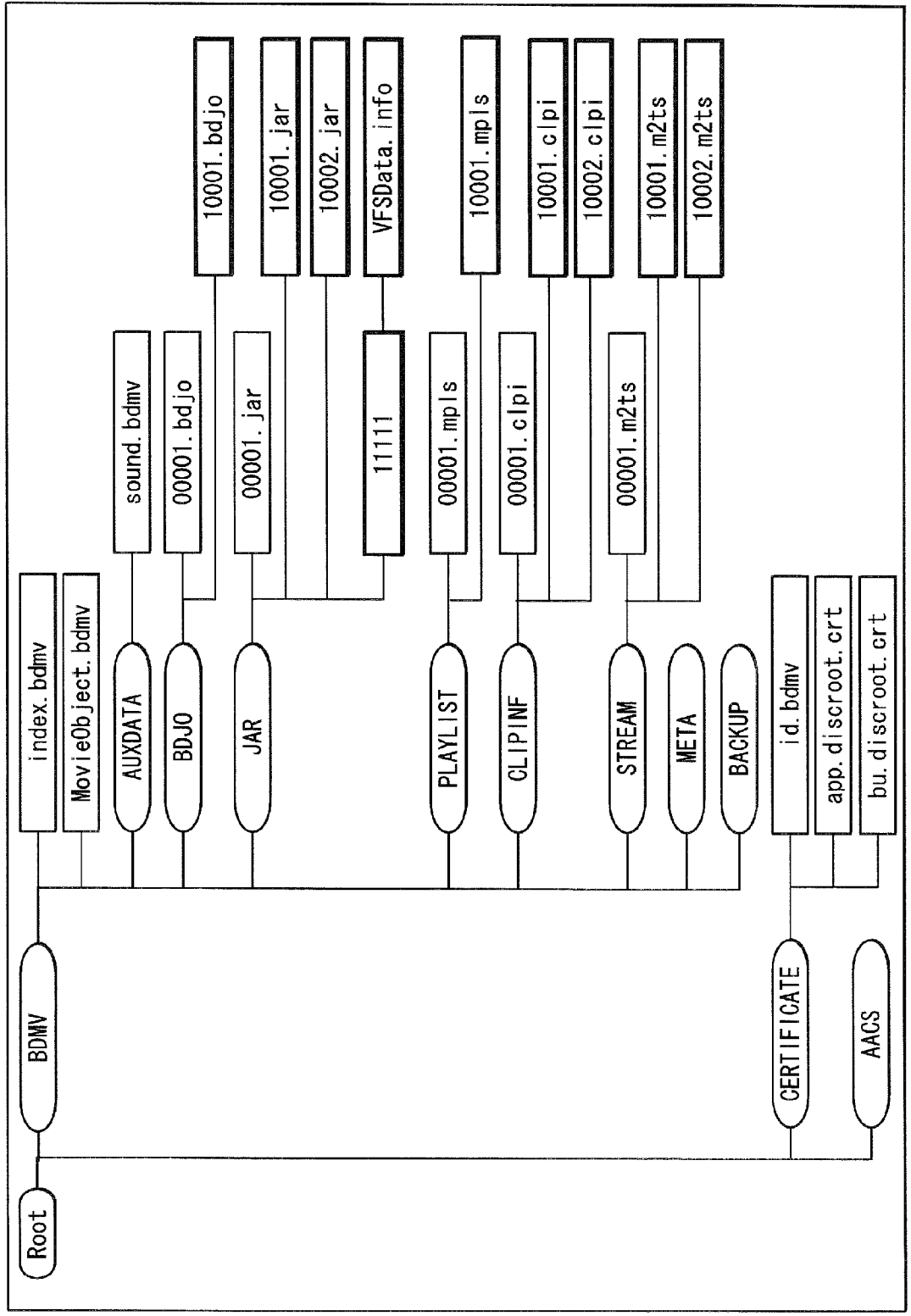
FIG. 20 shows a file structure of a virtual package constructed in accordance with the merge management information file shown in FIG. 18.

FIG. 20 shows a file structure of a virtual package constructed by combining the file structure of the BD-ROM 101 shown in FIG. 2 with the file structure of the update kits shown in FIG. 17 in accordance with the merge management information file shown in FIG. 18. In the figure, a directory and files indicated by heavy lines are in fact recorded in the SD memory card 104.

Figure 21:
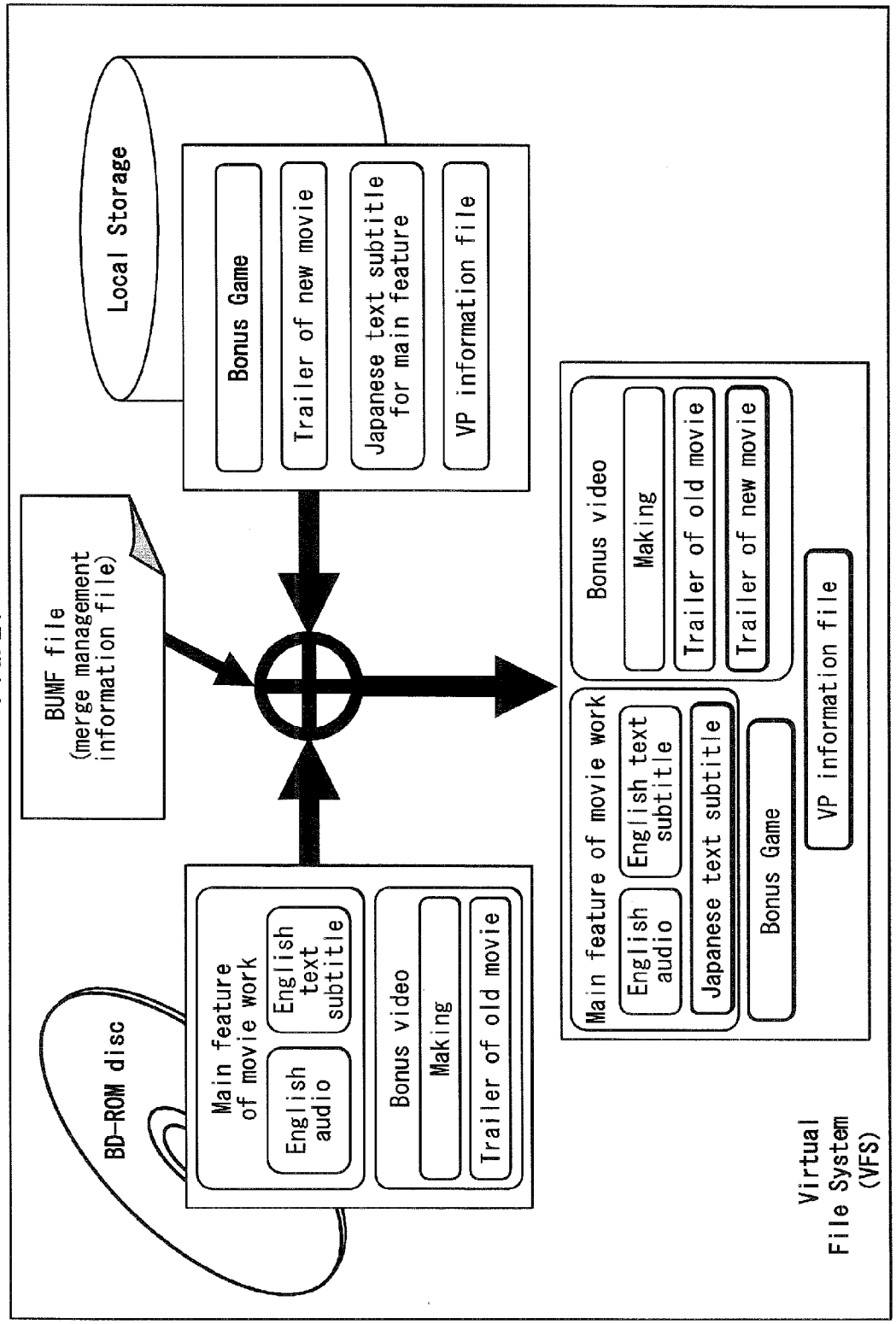
FIG. 21 shows an example of contents of the virtual package realized by a virtual file system.

FIG. 21 shows an example of contents of the virtual package realized by the virtual file system. In FIG. 21, the main feature and bonus video of a movie are recorded on the ROM disc, and the Japanese text subtitle, a trailer of a coming movie, a file for a bonus game, and the VP information file used as the state signaling file are recorded in the local storage. In this case, constructing the virtual package enables execution of video output and screen display in the virtual file system in which the main feature and the bonus video of the movie on the ROM disc, and the Japanese text subtitle, the trailer of the coming movie, the bonus game, and the VP information file in the local storage appear to be recorded in a single disc.

<Access Control to Virtual Package>

The above processes are used to construct the virtual package. After that, in response to an access request using a VFS path from the playback control unit 7 and the program execution unit 11, the virtual file control unit 20 refers to the mapping information to check a recording medium recording thereon a substantial file, and instructs one of the BD-ROM drive 1 and the local storage 3 to read out the data.

Specifically, upon receiving, from the playback control unit 7 and the program execution unit 11, a read command specifying a file path on the virtual package, the virtual file control unit 20 refers to the mapping information and determines whether the specified file path is described as a VFS path in the mapping information. When the specified file path is not described in the VFS file path in the mapping information, the virtual file control unit 20 determines that the substantial data for the specified file is recorded on the BD-ROM101, converts the file path on the virtual package into a file path on the BD-ROM 101, and transfers a read command to the BD-ROM drive 1. On the other hand, when the specified file path is described in the VFS file path in the mapping information, the virtual file control unit 20 determines that the substantial data for the specified file is recorded in the SD memory card 104, converts the file path on the virtual package into a local storage file path as corresponded by the mapping information, and transfers a read command to the local storage 3. Consequently, the playback control unit 7 and the program execution unit 11 are enabled to access an additional content data file and the state signaling file recorded in the SD memory card 104, using the file path on the virtual package. In this way, when playing back the text subtitle, audio, video, and the like added in the SD memory card 104 just as data recorded on the ROM disc, the playback control unit 7 and the program execution unit 11 request the above file accesses to the virtual file control unit 20, and the virtual file control unit 20 transfers the access commands to the files on the ROM disc or in the SD memory card 104. In other words, when playing back the text subtitle, audio, video, and the like, the playback control unit 7 and the program execution unit 11 accesses the files on the ROM disc or in the local storage via the virtual file control unit 20.

Meanwhile, upon receiving, from the playback control unit 7 and the program execution unit 11, a read command specifying a file path on the virtual package while the virtual package is not constructed, the virtual file control unit 20 is not able to find any merge management information file to refer to. Accordingly, the virtual file control unit 20 converts the file path on the virtual package into a file path on the BD-ROM 101 and transfers the read command to the BD-ROM drive 1.

<Construction State of Virtual Package>

The following three virtual package construction states may be considered: a state where no update kit is recorded in the SD memory card 104 inserted into the local storage 3; a state where an update kit is recorded in the SD memory card 104, but the virtual file control unit 20 has not completed constructing a virtual package; and a state where an update kit is recorded in the SD memory card 104 and the virtual file control unit 20 has completed constructing a virtual package.

Among the three states, in the first state, no update kit resides in the first place, and an access to an update kit file is impossible. However, in the second and the third states, the BD-J application is able to access an update kit file by directly specifying the file path in the SD memory card in a read command. So it is important to determine a difference between these two states. From now on, the state where an update kit is recorded in the SD memory card 104, but the virtual file control unit 20 has not completed constructing a virtual package is called a "prepared state", and the state where an update kit is recorded in the SD memory card 104 and the virtual file control unit 20 has completed constructing a virtual package is called a "valid state".

Figure 22:
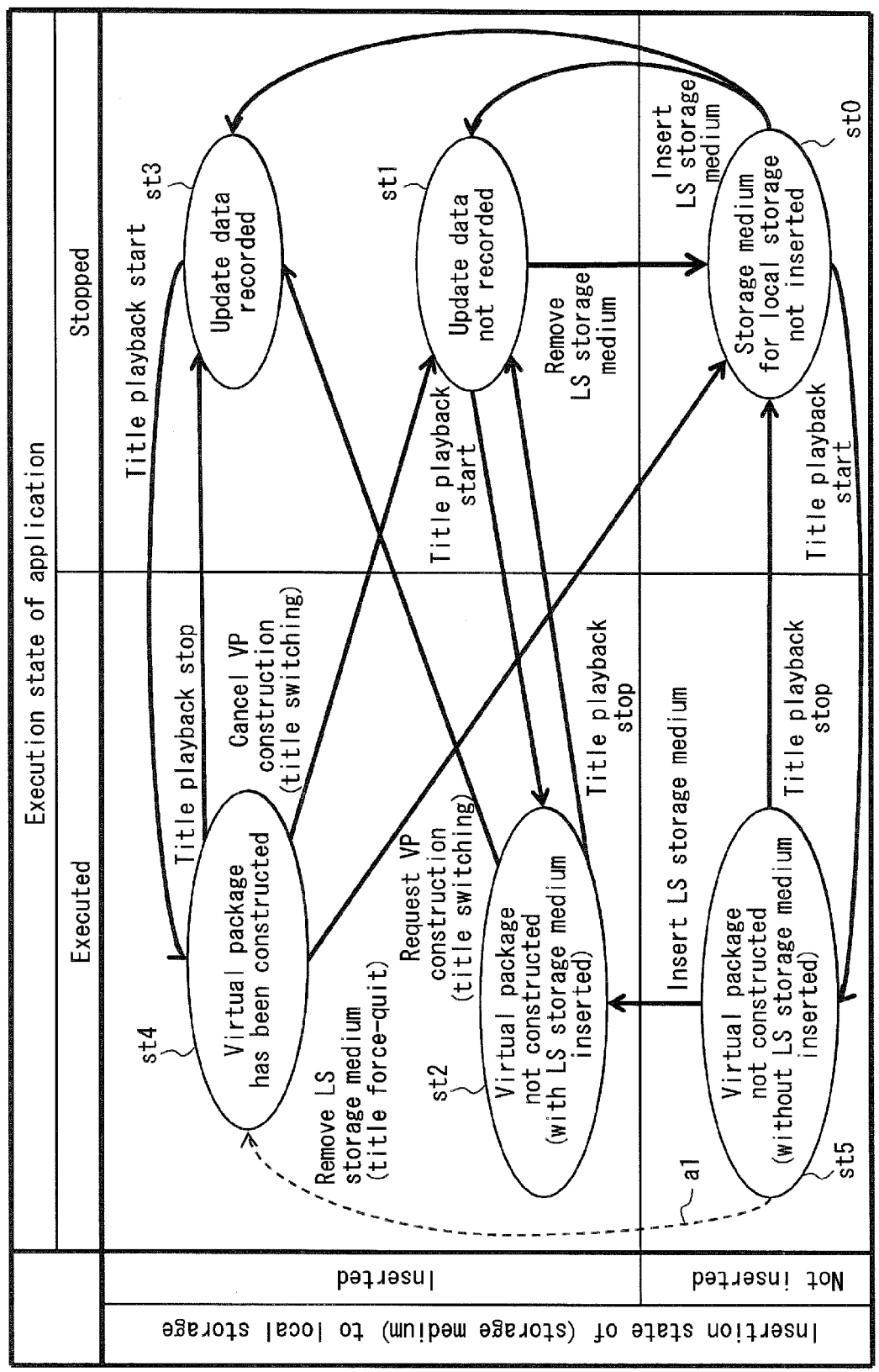
FIG. 22 shows state transitions caused by connection of a local storage and execution of a BD-J application.

A description is given of occasions when the prepared state and the valid state of a virtual package happen, with reference to FIG. 22. Firstly, the prepared state happens in st3 and st2 in the figure. The state of st3 happens when, from the state (st4) where a virtual package is once constructed with use of an update kit recorded in the SD memory card 104 and after the SD memory card 104 is removed from the local storage 3 and the virtual package is cancelled (st0), the SD memory card 104 is reinserted into the local storage 3 (st3). Normally, the virtual file control unit 20 subsequently waits for title switching and reconstructs a virtual package before the next title is started to be played back, thus bringing about the valid state (st4) of the virtual package.

Regarding the prepared state at st2, the state happens when, from the state (st4) where the virtual package is once constructed and after the SD memory card 104 is removed from the local storage 3 and the virtual package is cancelled (st0), execution of the BD-J application is started (st5) and then the SD memory card 104 is reinserted into the local storage 3 (st2). In this case, the virtual file control unit 20 waits for the BD-J application to stop following the title switching and constructs the virtual package prior to re-execution of the BD-J application, thus bringing about the valid state (st4) of the virtual package.

As mentioned above, the prepared state happens between the reinsertion and the title switching in the reconstruction process of the virtual package caused by the removal/reinsertion of the SD memory card 104 storing the update kit.

Note that the process (3) in the virtual package construction process may create a heavy processing load. For example, when a large-size file, such as an AV clip, is included in the update kit, calculating the hash value for the file requires a heavy load. Upon each removal/reinsertion of the SD memory card 104 in which the update kit is recorded, a virtual package needs to be reconstructed. It is not preferable to perform such processing that requires a heavy load every time from a viewpoint of improving efficiency in use of hardware resources. Accordingly, another implementation where, from among all the virtual package construction processes, the processes (1) to (4) are performed only for one virtual package that is to be initially constructed, and only the process (5) is performed for a virtual package that is to be reconstructed. Furthermore, the processes (1) to (4) do not influence playback of a title on the BD-ROM 101, and therefore are executable in parallel with the title playback of the BD-ROM 101. In contrast, the process (5) must be performed during a time when the title playback is stopped. Accordingly, it can also be considered that the state where the processes (1) through (4) have been finished equals the prepared state, and the state where the process (5) has been performed equals the valid state.

<Determination of Virtual Package Construction State>

The following describes a method for determining which of the prepared state and the valid state the virtual package construction state is.

Figure 23:
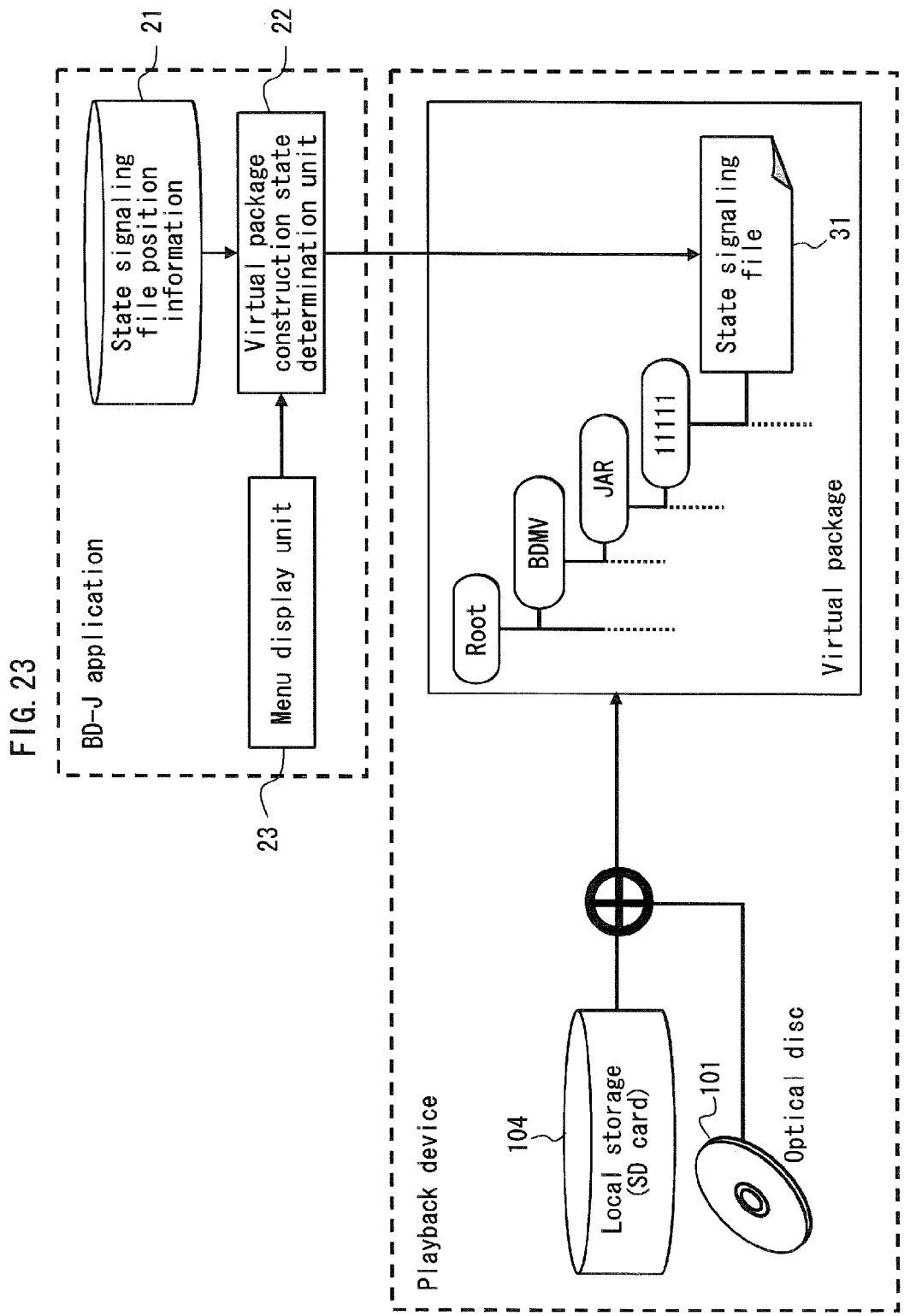
FIG. 23 illustrates a function of the BD-J application to determine a construction state of the virtual package.

FIG. 23 illustrates a function of the BD-J application to determine the virtual package construction state.

The BD-J application is incorporated with state signaling file position information 21 in the BD-J application programming process in the authoring process. The state signaling file position information 21 is the VFS file path assigned to the state signaling file in the merge management information file of the update kit. The VFS file path assigned to the state signaling file is the predetermined file path which is fixed and commonly used in any update kits. In the present embodiment, "BDMV/JAR/11111/VFSData. info" is used as the VFS file path.

A virtual package construction state determination unit 22 attempts a read command while specifying the file path indicated by the state signaling file 21, and determines the virtual package construction state according to success or failure of the read command. Specifically, the virtual package construction state determination unit 22 determines that the virtual package is in the valid state when the read command is successful, and that the virtual package is in the prepared state when the read command results in an error.

Actually, when the virtual package is in the valid state, a state signaling file 31 is allocated on the virtual package. The virtual file control unit 20 converts the path specified by the read command into the local storage file path before transferring the read command to the local storage 3. Consequently, the virtual file control unit 20 successfully reads out the state signaling file. On the other hand, when the virtual package is in the prepared state, the virtual file control unit 20 converts the path specified by the read command into the file path on the BD-ROM 101 before transferring the read command to the BD-ROM drive 1. However, in the authoring process of the BD-ROM, it is prohibited to create a file corresponding to the file path "BDMV/JAR/11111/VFSData. info" on the BD-ROM. Accordingly, a file with the same file path name cannot be recorded on the BD-ROM 101, and the read command inevitably results in an error.

The determination result of the virtual package construction state determination unit 22 is used in a menu display unit 23, for example, to display an appropriate menu in accordance with the virtual package construction state.

Of course, when the SD memory card is not inserted into the local storage 3 of the playback device also, the read command for the state signaling file inevitably results in an error. The virtual package construction state determination unit 22 may determine that the virtual package is in the prepared state in such a case as well.

Figure 24:
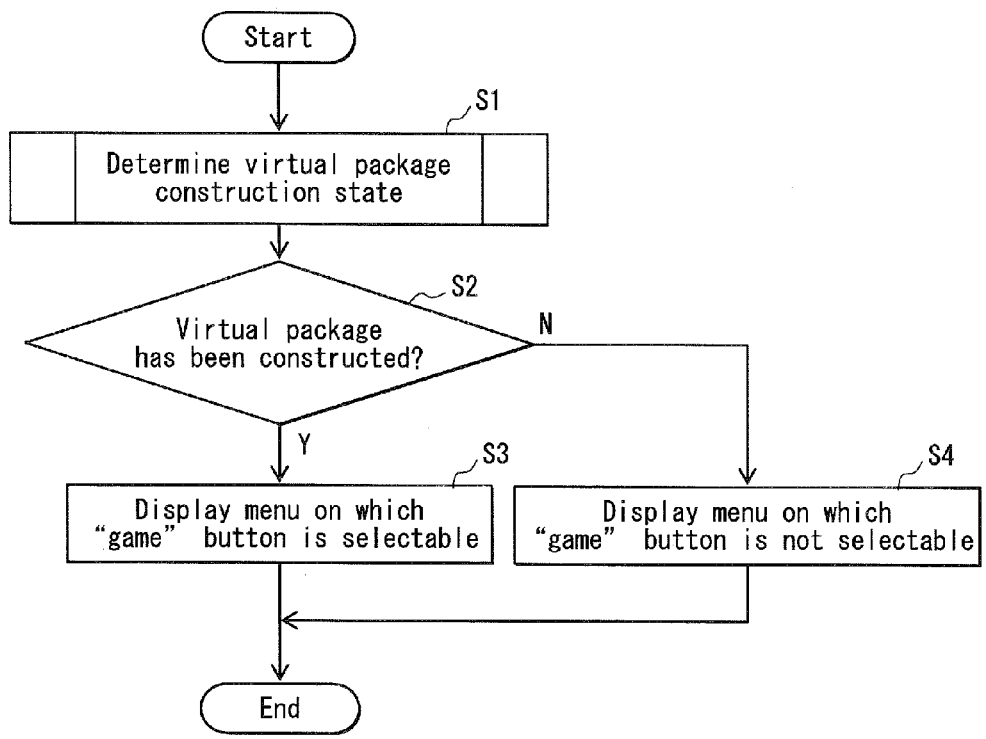
FIG. 24 is a flowchart showing a procedure of menu display control.
Figure 25:
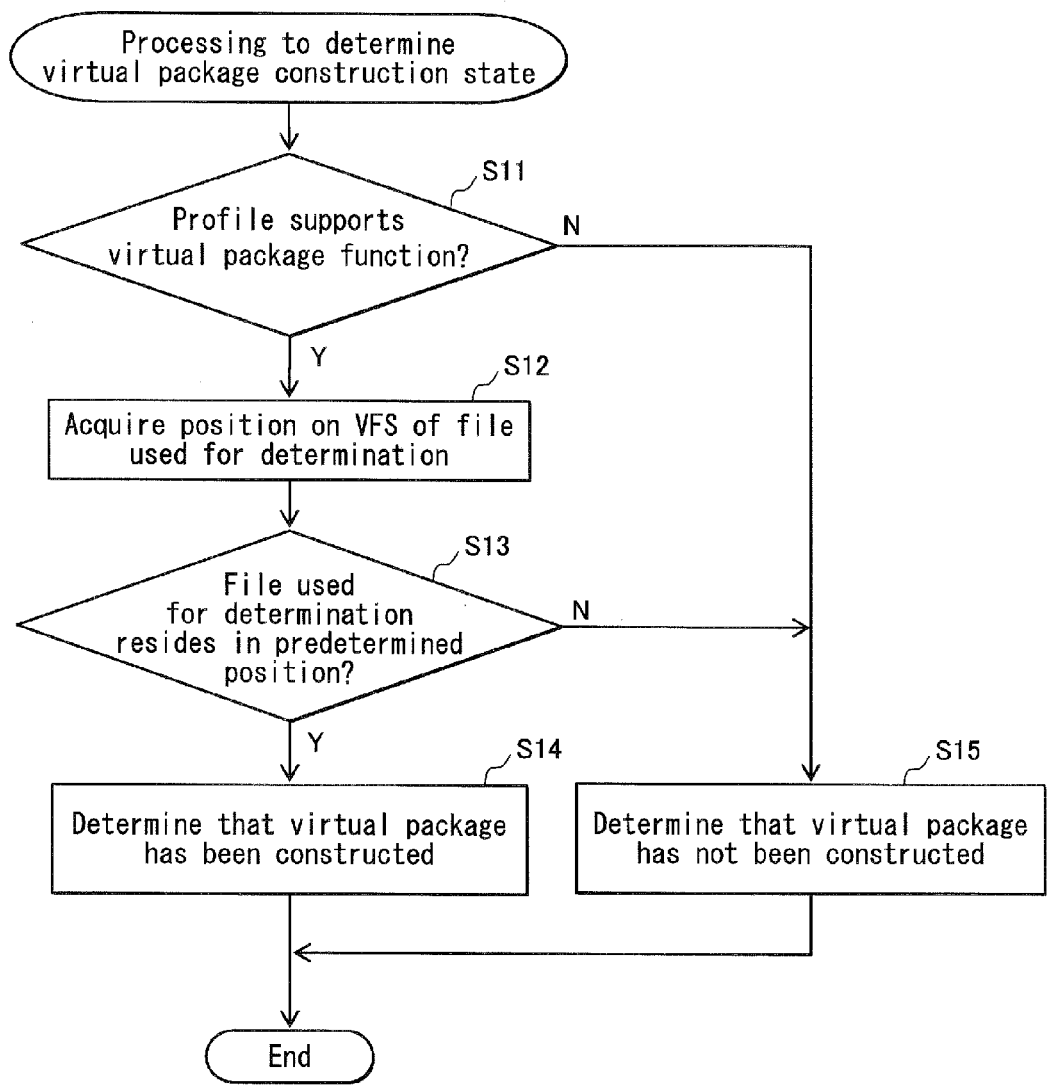
FIG. 25 is a flowchart showing a procedure for processing of determining the virtual package construction state.

The above functions are realized by causing the computer to execute processing procedures shown in flowcharts of FIG. 24 and FIG. 25 described in object oriented compiler language.

FIG. 24 shows the procedure of menu display control. In the present flowchart, in step S1, the virtual package construction state is determined. When determining that the virtual package is in the valid state (step S2: Yes), the BD-J application permits display of a button for calling an additional content included in the update kit, such as the "Game" button, upon display of a menu screen (step S3). On the other hand, when determining that the virtual package is in the prepared state (step S2: No), the BD-J application prevents display of the "Game" button upon display of the menu screen (step S4).

FIG. 25 is a flowchart showing the procedure for processing of determining the virtual package construction state. In the present flowchart, in step S11, it is determined whether the playback device, in which the BD-J application is executed, supports the virtual file system functions, according to Profile information and the like recorded in a recording medium embedded in the playback device. When determining that the playback device supports the virtual file system functions (step S11: Yes), the BD-J application reads out the state signaling file position information 21 and acquires the fixed VFS file path assigned to the state signaling file (step S12). By issuing a read command to the virtual file control unit 20 using the fixed VFS file path, the BD-J application determines whether or not the state signaling file resides on the virtual package (step S13). When the state signaling file is successfully read out by specifying the fixed VFS file path, the BD-J application determines that the virtual package is in the valid state (step S14). On the other hand, when the state signaling file is not successfully read out by specifying the fixed VFS file path, the BD-J application determines that that the virtual package is in the prepared state (step S14).

The processing shown in FIG. 25 is repeatedly performed during execution of the BD-J application. In accordance with the determination result about whether or not the state signaling file is accessible by specifying the fixed VFS file path, it is appropriately determined whether the virtual package is in the prepared state or in the valid state. This prevents a situation where the malfunction occurs as a result of the virtual package construction state incorrectly determined by the BD-J application.

Note that the processing to determine the virtual package construction state may be performed immediately after s start of the BD-J application. This reduces the number of access to the state signaling file. The reasons why the number of access is reduced is that the construction of the virtual package must always be completed at timing before execution of the BD-J application is started and cannot be completed during the execution of the BD-J application. Accordingly, the determination result obtained immediately after a start of the BD-J application does not change until the end of the application. For the above reasons, by preserving the determination result obtained immediately after re-execution of the BD-J application, and using the determination result throughout the operation period of the BD-J application, the state signaling file needs to be accessed for less number of times for determination of the virtual package construction state. This speeds up the processing of the BD-J application.

The following describes the method for determining which of the prepared state and the valid state the virtual package construction state is. Meanwhile, the operator of the processing procedures shown in the flowcharts of FIG. 24 and FIG. 25 may be the virtual file control unit 20. Furthermore, another control unit may be provided in the playback device so that the control unit performs the processing procedures shown in FIG. 24 and FIG. 25.

Alternatively, the processing procedures shown in FIG. 24 and FIG. 25 may be implemented as APIs to be provided by the middleware of the program execution unit 11. By doing so, the virtual file control unit 20 or another control unit provided in the playback device may provide, to the BD-J application, information about whether or not the virtual package is in the valid state.

It is also possible to describe the processing procedures shown in FIG. 24 and FIG. 25 in source cords of the BD-J application, and cause the program execution unit 11 to perform the processing procedures by executing the BD-J application.

<Operation Example of BD-J Application>

Figure 27B:
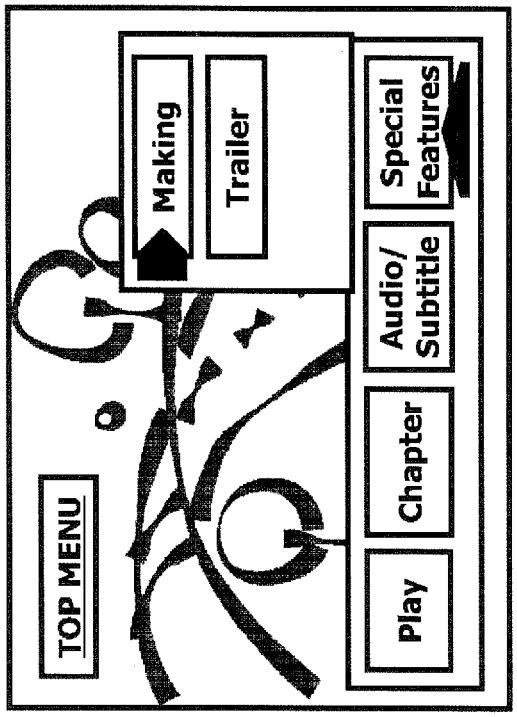
FIG. 27B shows an example of the bonus function menu display when the virtual package shown in FIG. 21 is in a prepared state.
Figure 27A:
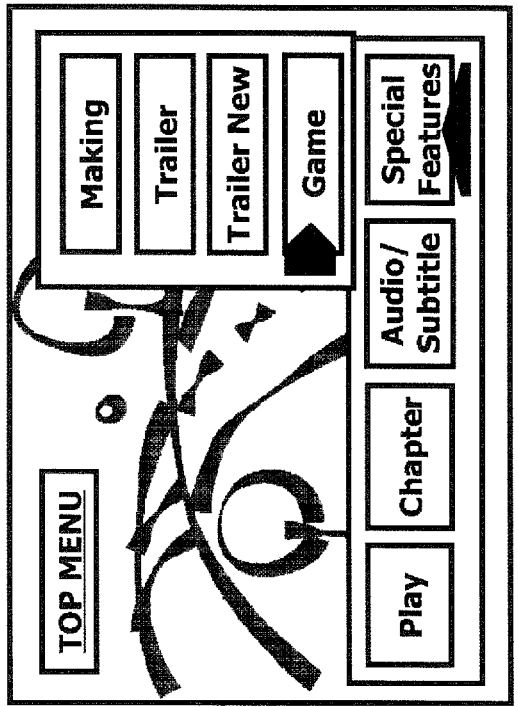
FIG. 27A shows an example of a bonus function menu display when the virtual package shown in FIG. 21 is in a valid state.

FIG. 26 chronologically shows a connection state of the medium to the local storage 3, the playback state of the title, the actual virtual package construction state, and the result of determining the construction state by the BD-J application. The BD-J application executed here has a function of acquiring the update kit as shown in FIG. 21 from the network or the like, requesting for construction of the virtual package, and displaying a bonus selection menu appropriate for the virtual package construction state. The JAR file, that is, a substance of the BD-J application, includes an PNG file used for displaying the bonus selection menus shown in FIG. 27A and FIG. 27B.

Firstly, after the SD memory card is inserted into the local storage 3 at a time point t0 in FIG. 26, the BD-J application recorded on the BD-ROM is started at t1. At this time point, the update kit is not recorded in the SD memory card. Accordingly, in the state transitions diagram shown in FIG. 22, the state st0 at the time point t0 transitions to the state st1, and further transitions to the state st2 where the application is executed. Here, the BD-J application determines the virtual package construction state. Since the virtual package has not been constructed in a period from t1 to t2 in FIG. 26, the BD-J application determines that the virtual package construction state is in the prepared state. Accordingly, in the case of displaying a bonus selection menu in the period, the BD-J application displays the bonus function menu shown in FIG.

27B containing only a "Making" button and a "Trailer" button as options. These buttons necessitate accessing the main feature or the bonus video of the movie recorded on the ROM disc. The bonus selection menu of FIG. 27B contains neither an option for playing back the trailer of the coming movie nor an option for executing the bonus game, and the user is not able to play back the trailer of the coming movie or execute the bonus game.

When it is determined that the virtual package construction state is in the prepared state, the BD-J application accesses the SD memory card inserted into the local storage 3 using the local file path, and determines whether the update kit is recorded or not. When the update kit is not recorded, the BD-J application downloads the update kit via the network module. After acquiring the update kit, the BD-J application records the update kit in the local storage 3. Subsequently, the BD-J application requests the virtual file control unit 20 to construct the virtual file system.

Upon requesting the virtual file control unit 20 to construct the virtual file system, the BD-J application requests the program execution unit 11 to stop/restart the title being played back. The reason why the title being played back is to be stopped/restarted is that construction of the virtual file system must always be completed at the timing before the BD-J application is executed. In other words, even if the virtual file control unit 20 is instructed to construct the virtual file system during execution of the BD-J application, the virtual package cannot be completely constructed unless the title being played back is once stopped and played back again. To put it another way, a condition for completing construction of the virtual file system is that the virtual file control unit 20 is able to read the merge management information file recorded in a predetermined position in the local storage and the additional content data file of the update kit corresponding to (i.e. described in) the merge management information file. Consequently, the title being played back is stopped at t2 in FIG. 26, and the construction of the virtual package is completed at the subsequent playback restart of the title at t3. In the state transition diagram shown in FIG. 22, the state st2 transitions to the state st3 as a result of the BD-J application being stopped following the title playback stop, and further transitions to the state st4 at the title playback restart where the construction of the virtual package is completed. Here, once the BD-J application is executed in the title whose playback is restarted, the BD-J application determines that the virtual package is in the valid state in a period from t3 to t4 in FIG. 26. Accordingly, in the case of displaying a bonus selection menu in the period, the BD-J application displays the bonus function menu shown in FIG. 27A containing a "Trailer New" button and the "Game" button, in addition to the "Making" button and the "Trailer" button as options. Here, in response to a user selection on the "Trailer New" button, the trailer of the coming movie added into the local storage is played back, and in response to a user selection on the "Game" button, the bonus game added into the local storage is executed. This realizes the operation in which the main feature and the bonus video of the movie recorded on the ROM disc, and the Japanese text subtitle, the trailer of the coming movie, and the bonus game in the local storage appear to be recorded in a single disc.

With the construction of the virtual package completed, once the SD memory card is removed from the local storage 3 at t4 in FIG. 26, the title being played back is stopped, and the BD-J application is force quit. Subsequently, the title playback is started with the SD memory card still removed from the local storage 3, and the BD-J application of the title being played back is executed without the construction of the virtual package completed. In the state transition diagram shown in FIG. 22, due to the removal of the SD memory card, the state st4 transitions to the state st0. From there, upon restart of the title playback, the state transitions to the state st5.

As mentioned above, the condition for completing the construction of the virtual package is that the virtual file control unit 20 is able to read the merge management information file recorded in the predetermined position in the SD memory card and the corresponding update kit. However, in the example of the figure, at the time point t5 before the title playback is restarted, the SD memory card is removed from the local storage. Accordingly, prior to the title playback start, there is no update kit corresponding to the merge management information file, and it is impossible to read the update kit corresponding to the merge management information file recorded in the predetermined position in the local storage. From this state, even when the previously removed SD memory card is reinserted into the local storage again at t6, the reconstruction of the virtual package cannot be completed because the title is being played back. In the state transition diagram shown in FIG. 22, due to the reinsertion of the SD memory card, the state st5 transitions to the state st2.

On the other hand, in a conventional technique shown in FIG. 35, due to the reinsertion of the SD memory card at t6, the BD-J application inadvertently accesses the update kit recorded in the SD memory card by directly specifying the local address for the SD memory card, thereby incorrectly determining that the virtual package is in the valid state where the construction is completed. Referring back to the state transition diagram, due to the reinsertion of the SD memory card, the BD-J application according to the conventional technique incorrectly determines that the state st5 transitions to the state st4 as shown by a dash line arrow al. In accordance with the incorrect determination, the BD-J application of the conventional technique displays the bonus function menu of FIG. 27A which ought to be displayed when the virtual package is in the valid state, even though the virtual package is in the prepared state. This used to cause the unusual state where the contents of the menu display are not consistent with operations available by the displayed contents.

In contrast, the BD-J application of the present embodiment is able to correctly determine that the virtual package is in the prepared state in a time period from t6 to t7, by determining the virtual package construction state using the state signaling file by the processing procedure shown in FIG. 25. Accordingly, in the case of displaying the bonus selection menu in the period, the BD-J application rightly displays the bonus function menu shown in FIG. 27B which ought to be displayed when the virtual package is in the prepared state. In this way, even in the situation accompanied by the unusual state with the BD-J application using the conventional technique, the BD-J application of the present embodiment does not display, in the bonus function menu, a button for selecting the processing which necessitates accessing an additional content data file included in the update kit. As a result, the consistency is retained between contents of the menu display and the operations available by the displayed contents.

Subsequently, the title playback is stopped once at t7, and started again at t8, and the virtual package is constructed prior to the title playback start. Accordingly, the construction of the virtual package is already completed upon and after the title playback restart, and the BD-J application of the title being played back determines that the virtual package construction state is the valid state. As a result, the bonus selection menu shown in FIG. 27A containing the "Game" button for executing the bonus game as an option is displayed.

As has been described, according to the structure of the present embodiment, the BD-J application is able to correctly determine the virtual package construction, whereby the BD-J application is prevented from malfunctioning in the period after the reinsertion of the SD memory card into the local storage 3 and before the stop of the BD-J application.

Furthermore, in the present first embodiment, the predetermined fixed file path is used as the VFS file path assigned to the state signaling file. This enables the BD-J application to correctly determine the virtual package construction state always using the same file path. Furthermore, by using the fixed file path as the VFS file path assigned to the state signaling file, it becomes easier to use a single application for a plurality of update kits or to use a plurality of applications for a single update kit.

Note that the file for use in the determination in the step S13 may be a file other than the file format shown in FIG. 19, as far as the corresponding VFS file path is described in the merge management information. Such a file may be a file belonging to the update kit like the state signaling file, a file additionally recorded in the recording medium embedded in the playback device, or a data file within the BD-J application. In the case where the file recorded in the recording medium embedded in the playback device or the data file within the BD-J application is used for the determination, the file needs to be recorded in the local storage together with the update kit at the time of downloading the update kit.

Meanwhile, when the state signaling file is in an AV data format, the AV data is unintentionally played back upon being accessed, possibly causing inconvenience. Such inconvenience is avoided by making the state signaling file in a text format, since the text file cannot be actually played back in the determination of access. Furthermore, by reducing a size of the file for use in determining as much as possible, a time required for acquiring and accessing the file is shortened, and the processing of the BD-J application is sped up.

Moreover, in the case where the file additionally recorded in the recording medium embedded in the playback device or the data file within the BD-J application is used for the determination in the step S27, the VFS file path information must be prepared for the BD-J application to access the file. The VFS file path information may be referred to by the merge management information, or may be recorded within the playback device or the BD-J application.

(Second Embodiment)

In the first embodiment, the virtual package is constructed using a single update kit for a single BD-J application. However, by preparing a plurality of update kits for a single BD-J application, a variety of virtual packages may be constructed from the single BD-J application. In a present second embodiment, a description is given of an implementation of the present invention in which a variety of virtual packages are constructed by a single BD-J application with use of a plurality of update kits.

FIG. 28 shows a data structure of the SD memory card 104 in which two update kits corresponding to a common BD-J application are stored. An update kit storage area of the SD memory card 104 is divided for different BD-ROMs. In an example shown in the figure, two update kits indicated as "Update01" and "Update02" are recorded under the DiscID directory relating to a BD-ROM with the DiscID "0123456789abcdef0123456789abcdef".

Under the update kit directory "Update01", a merge management information file 41 and a state signaling file 42 relating to the update kit "Update01" are located. Although not shown in the figure, additional content data files relating to a content added by the update kit are also located under the update kit directory.

Similarly, under the update kit directory "Update02", a merge management information file 43, a state signaling file 44 relating to the update kit "Update02", and additional content data files relating to a content added by the update kit are located.

Here, in the state signaling file 42 of the "Update01", information relating to the update kit belonging to the "Update01" is described in the format shown in FIG. 19. In the state signaling file 44 of the "Update02", information relating to the update kit belonging to the "Update02" is described in the format shown in FIG. 19.

Furthermore, the merge management information file 41 and the merge management information file 43 both indicate in the respective mapping information the common VFS file path "BDMV/JAR/11111NFSData. info" as the local storage file path assigned to the state signaling file.

Figure 29:
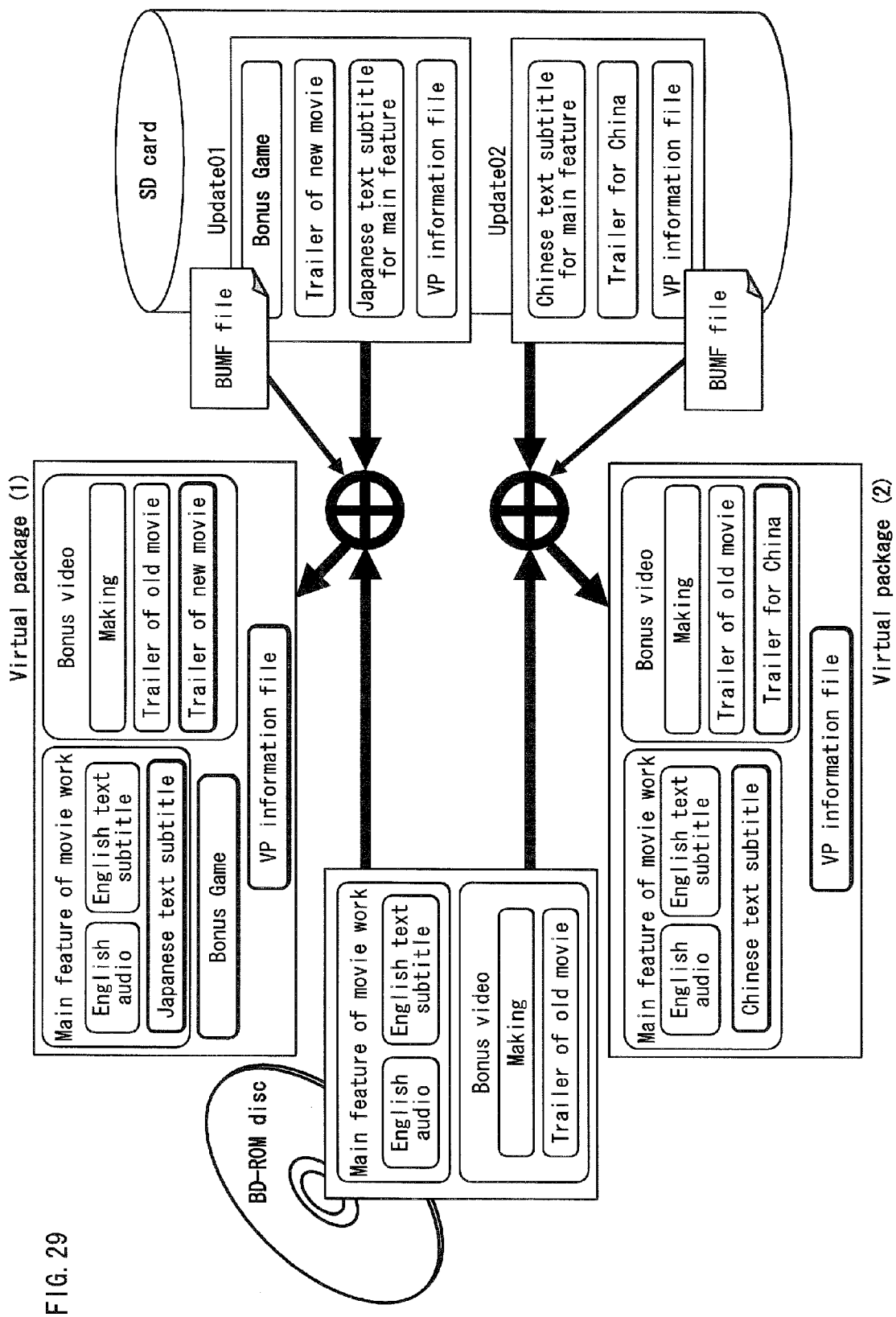
FIG. 29 shows contents constructed by the plurality of update kits corresponding to the single ROM disc.

FIG. 29 schematically shows virtual packages constructed using the "Update01" and the "Update02". In an example of the figure, the main feature and the bonus video of the movie are recorded on the ROM disc. As the "Update01", files relating to the Japanese text subtitle, the trailer of the coming movie, and the bonus game are recorded in the SD memory card. As the "Update02", files relating to a Chinese text subtitle and a trailer for China are recorded in the SD memory card. In this case, two different virtual packages may be constructed. One is a virtual package (1) that realizes video output and screen display in which the main feature and the bonus video of the movie on the ROM disc and the Japanese text subtitle, the trailer of the coming movie, and the bonus game in the local storage appear to be recorded in a single disc. The other is a virtual package (2) that realizes video output and screen display in which the main feature and the bonus video of the movie on the ROM disc and the Chinese text subtitle and the trailer for China in the local storage appear to be recorded in a single disc. Note that a plurality of update kits cannot be used simultaneously to construct a virtual package. More specifically, only one of the "Update01" and the "Update02" can be used for one virtual package to be constructed. In order to change the update kit to use, a virtual package needs to be reconstructed.

In the first embodiment, with use of the processing shown in FIG. 24 and FIG. 25, the virtual package is determined to be in the valid state when the state signaling file is accessible by specifying the fixed file path "BDMV/JAR/11111NFSData. info" on the virtual package. Then, the bonus selection menu (of FIG. 27A) is displayed on which the additional content included in the update kit is available. On the other hand, the virtual package is determined to be in an invalid (i.e. prepared) state when the state signaling file is not accessible by specifying the fixed path. Then, the bonus selection menu (of FIG. 27B) is displayed on which the additional content included in the update kit is not available. However, when the BD-J application needs to handle the plurality of update kits as in the present second embodiment, a problem might arise. Specifically, upon determining that a virtual package is in the valid state, the BD-J application might display the bonus selection menu showing the additional content provided by an update kit different from the update kit used for the current virtual package being constructed.

The following describes an example of the above problem. The description is given of the case where there are the Update01 and the Update02 shown in FIG. 29 for the BD-ROM 101: the Update01 is used for adding to the ROM disc the Japanese text subtitle, the trailer of the coming movie, and the bonus game; and the Update02 is used for adding to the ROM disc the Chinese text subtitle and the trailer for China. In this case, the virtual file control unit 20 and the BD-J application are not able to determine which one of the update kits is used for constructing the virtual file system, while capable of executing the processing to determine the virtual package construction state as shown in FIG. 25. Hence, the BD-J application could inadvertently display the bonus selection menu shown in FIG. 27A as a result of determining that the virtual package is in the valid state by the processing to determine the virtual package construction state shown in FIG. 25, despite the fact that the virtual package (2) is constructed by adding into the ROM disc the Chinese text subtitle and the trailer for China using the Update02 of FIG. 29. The bonus selection menu of FIG. 27A thus displayed contains the "Game" button option for executing the bonus game. However, even if the user selects the "Game" button, the bonus game is not executable since the virtual package (2) of FIG. 29 is actually constructed. In other words, in the above case, the consistency is not established between contents of the bonus selection menu and the operations available by the displayed contents.

In view of the above problem, the BD-J application according to the second embodiment specifies the update kit used for the virtual package being currently constructed (i.e. the current virtual package) by checking the content of the state signaling file. As shown in FIG. 19, the information contained in the state signaling file enables the BD-J application to uniquely specify the update kit currently in use, even when a plurality of different update kits reside in the SD memory card. Furthermore, the above information enables the BD-J application to specify the ROM disc with which the target update kit can be combined for constructing a virtual file system. The above information also enables the BD-J application to easily obtain the version of the update kit and detailed contents of the data included in the update kit.

With the update kit used for the current virtual package thus specified, the BD-J application is able to check whether or not a file necessary for the processing the BD-J application is to execute is contained in the update kit used for constructing the virtual package. Consequently, the BD-J application of the second embodiment performs control so that an appropriate bonus menu is displayed in accordance with the update kit used for the current virtual package. The above configuration of the BD-J application prevents the BD-J application from accessing an update kit other than the update kit used for constructing the current virtual package. This also prevents, for example, the situation where the contents of the bonus display menu are not consistent with operations available by the displayed contents.

In sum, the BD-J application according to the second embodiment determines which one of the update kits is used for constructing the virtual package, and performs control to prohibit an access to an update kit other than the update kit used for constructing the virtual package.

Note that the information recorded in the file of FIG. 19 may be added or deleted as needed. For example, the OrganizationID and the DiscID of the associated ROM disc may be deleted, or a plurality of OrganizationIDs and a plurality of DiscIDs may be recorded. Furthermore, the information indicating the content of the update kit may be recorded in another file, such as the merge management information file.

Figure 30:
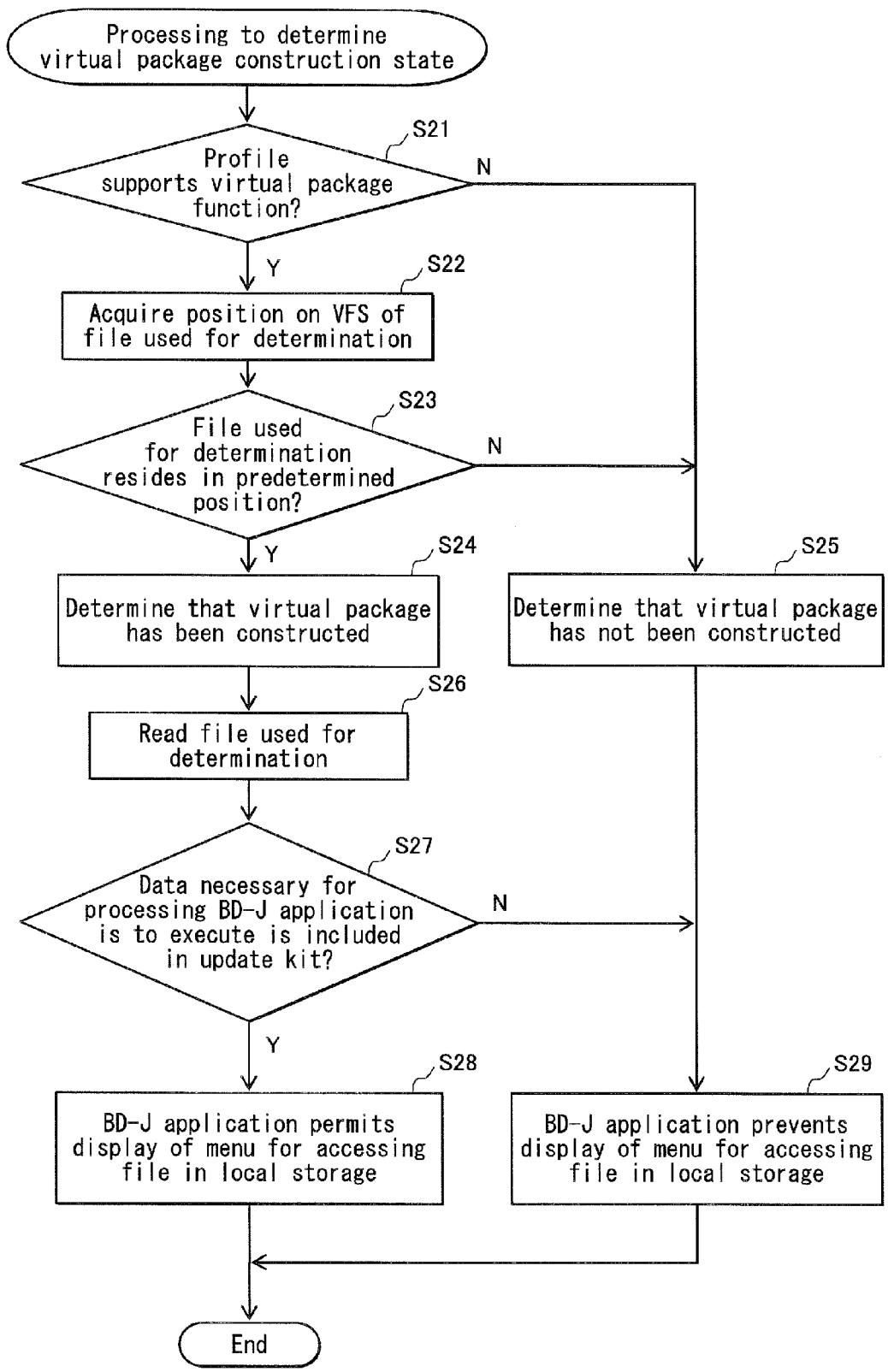
FIG. 30 is a flowchart showing the procedure for processing of determining the virtual package construction state according to a second embodiment.

The above functions are realized by causing the computer to execute a processing procedure shown in a flowchart of FIG. 30 described in the object oriented compiler language.

FIG. 30 is the flowchart showing the procedure for processing of determining the virtual package construction state according to the second embodiment. Steps from S21 through S25 in the present flowchart are same as the processing to determine the virtual package construction state described in the first embodiment with reference to FIG. 25.

Here, the step S24, where the BD-J application determines that the virtual package is in the valid state, is taken when the state signaling file is successfully read out in response to the read command using the fixed VFS file path issued in the step S23. It should be noted that the state signaling file read out using the fixed VFS file path belongs to the current virtual package. So, when determining that the virtual package is in the valid state in the step S24, the BD-J application subsequently reads out the content of the state signaling file (step S26). In accordance with the information read in the step S26, the BD-J application determines whether or not a file necessary for the processing the BD-J application is to execute is included in the update kit used for the constructed virtual package (step S27). For example, when the BD-J application is to execute processing to display the bonus selection menu, an item called "details of data contained in update kit" shown in FIG. 19 is referred to, and it is determined whether or not the additional contents of the bonus game and the trailer for the coming movie are included in the update kit (step S27). If it is determined that these contents are included (step S27: Yes), the BD-J application permits display of the buttons for calling the additional contents included in the update kit, such as the "Game" button and the "Trailer New" button (step S28) upon display of the menu screen.

On the other hand, when the state signaling file is not successfully read out using the fixed VFS file path, and the BD-J application determines that the virtual package is in the prepared state (step S25), or when, although the state signaling file is successfully read out using the fixed VFS file path, it is determined that the bonus game and the trailer for the coming movie are not included in the item "details of data contained in update kit" of the read state signaling file (step S27: No), the BD-J application prevents display of the "Game" button and the "Trailer New" button for calling the additional contents upon display of the menu screen (step S29).

This concludes the description of the procedure for processing of determining the virtual package construction state according to the second embodiment.

Note that the file for use in the determination in the step S27 may be a file other than the state signaling file. Such files include a file belonging to the update kit like the state signaling file, a file additionally recorded in the recording medium embedded in the playback device, and a data file within the BD-J application. Note that, however, storing the information indicating the contents of the update kit together with the file for use in determining the virtual package construction state in a single file facilitates the determination of the virtual package construction state and the determination of the update kit being used by a single file read operation. The reason is that the read command is already issued for the state signaling file for the purpose of determining the virtual package construction state in the step S23. Accordingly, storing the contents of the update kit in the state signaling file omits a need for additionally issuing a read command in the step S26 after it is determined in the step S24 that the virtual package is in the valid state. Thus, the effective processing is realized by making the file used for determining the virtual package construction state double as the file for storing the contents of the update kit.

Meanwhile, when the file for use in the determination in the step S27 is in the AV data format, the AV data is unintentionally played back upon being accessed, possibly causing inconvenience. Such inconvenience is avoided by making the state signaling file in the text format, since the text file cannot be actually played back in the determination of access. Furthermore, by reducing the size of the file for use in the determination as much as possible, the time required for acquiring and accessing the file is shortened, and the processing of the BD-J application is sped up.

Moreover, in the case where the file additionally recorded in the recording medium embedded in the playback device or the data file within the BD-J application is used for the determination in the step S27, the file path information must be prepared for the BD-J application to access the file. The file path information may be recorded in the merge management information or within the playback device or the BD-J application.

By using a fixed file path as the path the file path information indicates, the BD-J application is enabled to correctly determine the virtual package construction state always using the same file path. The use of the fixed file path further realizes use of a single application for a plurality of update kits in common (reuse of the application) or use of a plurality of applications for a single update kit (creation of the common update kit with a plurality of titles). As a result, the application(s) and the update kit(s) are effectively created.

Moreover, as a method for determining the contents of the update kit, it is possible to acquire only the information for uniquely specifying the update kit currently in use, such as the identifier of the update kit. The acquired information may be used as a key to obtain other information, namely, information of data and file contents included in the update kit, from the network or another recording medium. It is also possible to use, as the key, other files and the merge management information file included in the update kit.

As has been described, according to the second embodiment, the application is enabled to specify the update kit currently in use using the information indicating the contents of the update kit recorded in the file in the local storage in determining the virtual package construction state, and control the processing of the application in accordance with the update kit used for constructing the virtual package. As a result, even when there are a plurality of update kits, the application is prevented from accessing an update kit other than the update kit used for constructing the virtual package. Furthermore, the plurality of update kits are handled by a single application, and the application is therefore effectively developed.

<Modifications of Second Embodiment>

As above, the second embodiment describes the structure for specifying the update kit used for the current virtual package by checking the content of the state signaling file in the situation where a variety of virtual packages are constructible from a single BD-J application using a plurality of update kits. In this structure, the common VFS file path (BDMV/JAR/11111NFSData. info) is allocated for all signaling files in the mapping information of any merge management information files so that the state signaling file of each update kit is assigned with the common file path. This enables the BD-J application to check, for any update kit being used, the content of the state signaling file always using the same file path.

In contrast, it is also possible to allocate different VFS file paths for the state signaling files in the mapping information of the respective merge management information files so that the state signaling file of each update kit is assigned with a different one of the file paths. In this case, the BD-J application may specify the update kit being used, by attempting to see whether or not the file paths of the state signaling files for the respective update kits are accessible.

In the above modification, when there are two update kits of the Update01 and the Update02, for example, "BDMV/JAR/11111NFSData_update01.txt" is registered as the VFS file path of the state signaling file in the mapping information of the merge management information file for the Update01. On the other hand, "BDMV/JAR/11111NFSData_update02.txt" is registered as the VFS file path of the state signaling file in the mapping information of the merge management information file for the Update02.

Furthermore, at the time of creating the BD-J application, a data file serving as state signaling file position information pieces about the respective update kits is incorporated into the JAR file, that is, a substance of the BD-J application. Each state signaling file position information piece indicates the VFS file path assigned to the state signaling file in the corresponding update kit.

When the BD-J application configured as above is executed, the following processes are performed in determining the virtual package construction state. The BD-J application attempts a read command by specifying the file paths indicated by the state signaling file position information pieces for the respective update kits, and specifies the update kit used by the current virtual package according to which file path serves to read the state signaling file.

When there are two update kits of the Update01 and the Update02 mentioned above, the BD-J application determines that the Update01 is used for the current virtual package when the state signaling file is successfully read out by specifying the path "BDMV/JAR/11111NFSData_update01.txt". On the other hand, the BD-J application determines that the Update02 is used for the current virtual package when the state signaling file is successfully read out by specifying the path "BDMV/JAR/11111NFSData_update02.txt".

(Third Embodiment)

In a third embodiment, a description is given of a structure for implementing a recording device and a recording method according to the present invention.

The recording device described here is called an authoring device, deployed in a production studio for distribution of movie contents, and used by an authoring staff member. In a usage pattern of the recording device according to the present invention, digital streams compressed and encoded in accordance with the MPEG standards, as well as a scenario describing how to play back a movie title, are created in response to an operation from the authoring staff member. Then, a volume image and an update kit are created. The volume image is to be stored in a BD-ROM containing the data. An objective of the recording device according to the present invention is to create the recording medium and the update kit described in the first embodiment.

Figure 31:
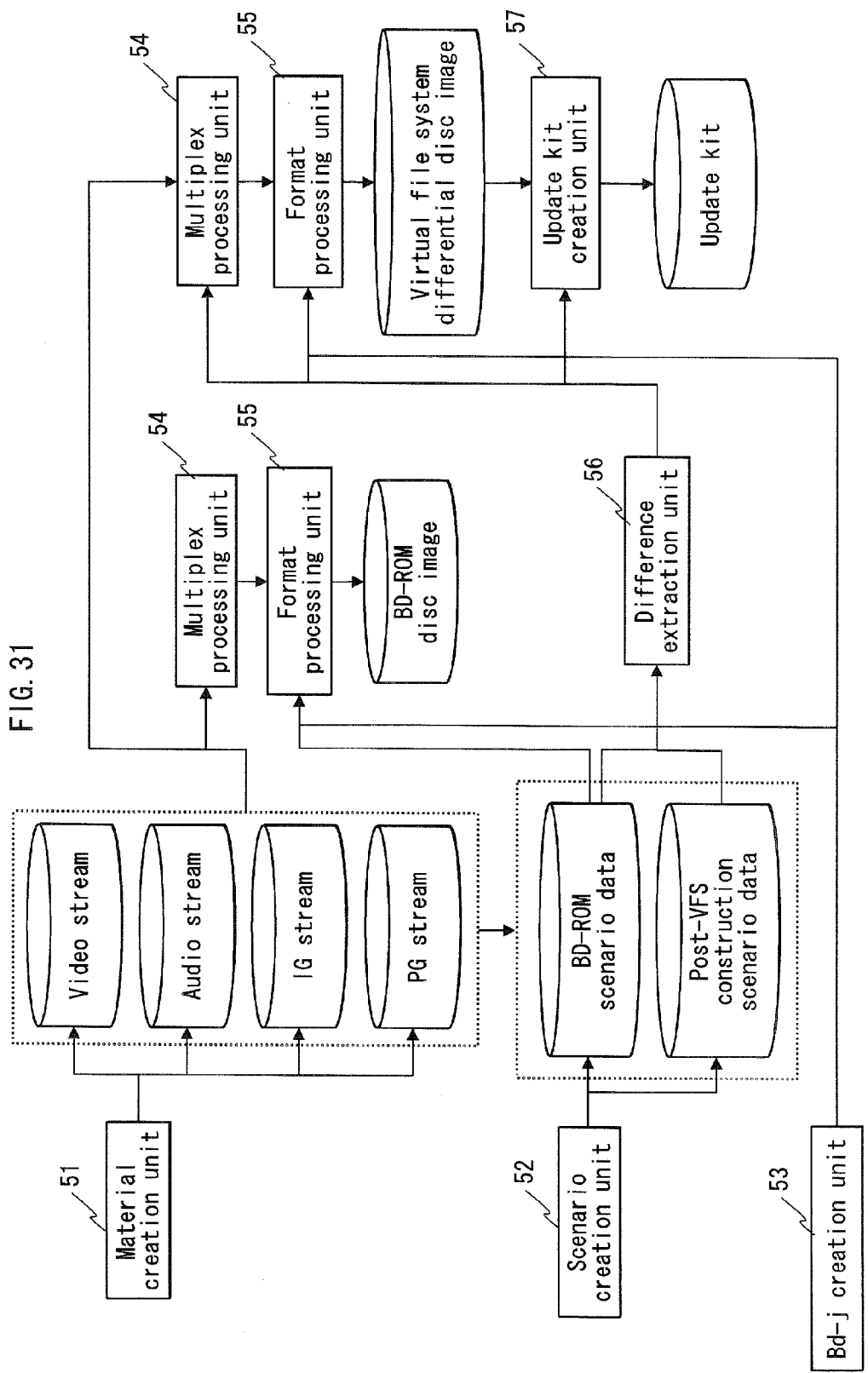
FIG. 31 shows an internal structure of a recording device.

FIG. 31 shows an internal structure of the recording device according to the present invention. As shown in the figure, the recording device of the present invention includes a material creation unit 51, a scenario creation unit 52, a BD-J creation unit 53, a multiplex processing unit 54, a format processing unit 55, a difference extraction unit 56, and an update kit creation unit 57. The recording device of the present invention can be implemented as a system LSI (integrated circuit).

The material creation unit 51 creates various streams, such as a video stream, an audio stream, a presentation graphics stream, and an interactive graphics stream. The material creation unit 51 creates the video stream by encoding video images, such as uncompressed bit-map images, in accordance with the compression methods, such as MPEG4-AVC and MPEG2. The material creation unit 51 also creates the audio stream by encoding uncompressed LinearPCM audio or the like in accordance with the compression method, such as AC3. The material creation unit 51 creates the presentation graphics stream, that is, the format of a text subtitle stream conforming to the BD-ROM standards, based on a text subtitle information file containing text subtitle images, display timing, and text subtitle effects such as fade-in and fade-out. The material creation unit 51 creates the interactive graphics stream, that is, the format of a menu screen conforming to the BD-ROM standards, based on a menu file describing bit-map images for use in a menu, as well as transitions and display effects of buttons displayed on the menu.

The scenario creation unit 52 creates the scenario (i.e. BD-ROM scenario data) in a format conforming to the BD-ROM standards in accordance with information about the respective streams created by the material creation unit 51 and the operation from the authoring staff member via the GUI. The scenario herein refers to a set of files, such as an index file, a movie object file, and a playlist file. The scenario creation unit 52 also creates a parameter file describing streams constituting respective AV clips for performing multiplex processing.

In order to create the update kit, scenario data which is desired to be applied when the virtual package is constructed (i.e. post-construction scenario data) is created.

The BD-J creation unit 53 serves to program BD-J applications. The BD-J creation unit 53 creates a BD-J application by drafting source cords of a BD-J application program in response to a user request via a user interface, such as the GUI. At this time, a data file serving as the state signaling file position information 21 of FIG. 23 is incorporated as an external file into the BD-J application program.

The multiplex processing unit 54 multiplexes the video stream, the audio stream, the text subtitle stream, the button stream, and others described in the BD-ROM scenario data into an MPEG2-TS-formatted AV clip. Simultaneously, the multiplex processing unit 54 creates the clip information file corresponding to the AV clip. The multiplex processing unit 54 creates the clip information file by the following method. The multiplex processing unit 54 creates mark information simultaneously with creating the AV clip. More specifically, the multiplex processing unit 54 detects whereabouts of I pictures when the video stream contained in the AV clip among the streams created by the material creation unit 51 is in the MPEG2 format or a VC-1 format, and detects whereabouts of I pictures or IDR pictures when the video stream contained is in the MPEG4-AVC format. The multiplex processing unit 54 then registers, as the mark information, marks each indicating a display time of a different one of the pictures in correspondence with what number source packet of the MPEG2-TS-formatted AV clip contains top data of the picture. When two types of the video stream, namely the primary video stream and the secondary video stream, are contained in the AV clip, mark information is created simultaneously for both types. The multiplex processing unit 54 creates the clip information file by pairing the mark information created by the unit 54 itself with the attribute information indicating an audio attribute, a video attribute, or the like for each stream.

The format processing unit 55 arranges the BD-ROM scenario data created by the scenario creation unit 52 or the post-construction scenario data, the BD-J application created by the BD-J creation unit 53, the AV clip and the clip information file created by the multiplex processing unit 54 in the format conforming to the BD-ROM standards. By doing so, the format processing unit 55 creates a BD-ROM disc image or a virtual package differential disc image in the UDF format which is the file system conforming to the BD-ROM standards. The BD-ROM is manufactured by converting the created BD-ROM disc image into BD-ROM data to be pressed and performing press processing on the BD-ROM data.

Furthermore, in accordance with descriptions of the post-construction scenario data, the format processing unit 55 creates a file (e.g. the state signaling file in the first and the second embodiments) containing information for uniquely specifying the update kit to be created.

Note that the file containing the information for specifying the BD-ROM disc image to be created may be created based on the BD-ROM scenario data.

The difference extraction unit 56 compares the two scenario data and extracts differential data. For example, the difference extraction unit 56 extracts a file which is not found in the original disc image or a file which is updated using a binary compare.

In accordance with the differential data extracted from the extraction unit 56 and the virtual file system differential disc image, the update kit creation unit 57 creates the merge management information file, the signature information file, a network playlist, and a clip in conformity to the aforementioned data format of update kits, and arranges the files and directories in the format conforming to the BD-ROM standards. In the merge management information file created here, "BDMV/JAR/11111/VFSData. info" is recorded as the VFS file path of the state signaling file.

Figure 32:
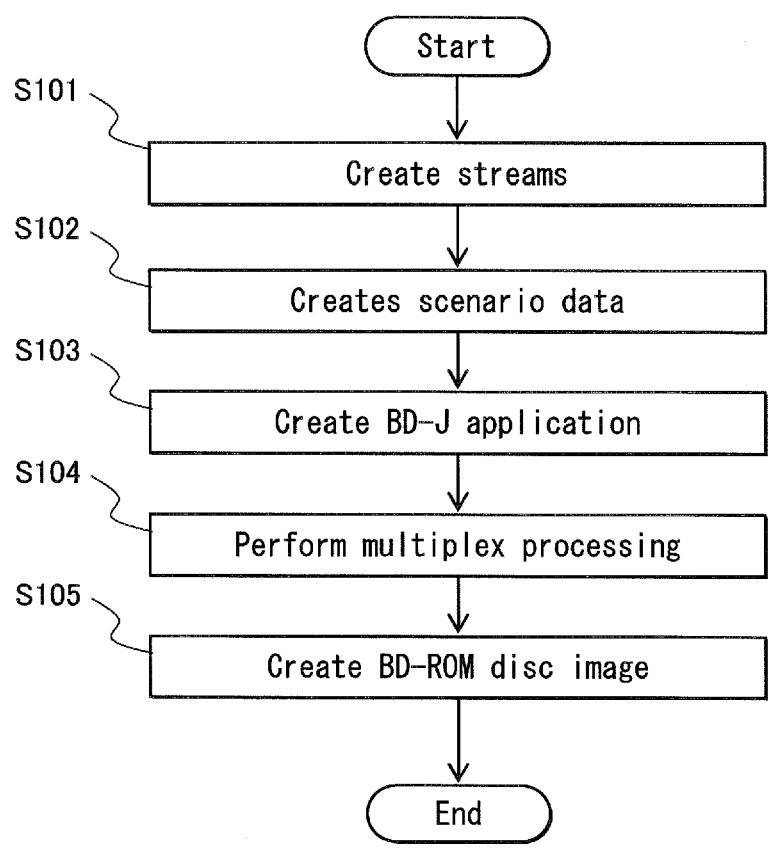
FIG. 32 shows a flowchart showing processing of creating a BD-ROM disc image performed in the recording device.

With reference to FIG. 32, a description is next given of a method for creating the BD-ROM disc image according to the embodiment.

In step S101, the material creation unit 51 creates the video stream, the audio stream, the IG stream, and the PG stream.

In step S102, the scenario creation unit 52 creates the BD-ROM scenario data describing the playback scenario, such as the index file, the movie object file, and the playlist file.

In step S103, the BD-J creation unit 53 creates the BD-J application program.

In step S104, the multiplex processing unit 54 creates the AV clip and the clip information file based on the BD-ROM scenario data.

In step S105, the format processing unit 55 creates the disc image conforming to the BD-ROM standards by rearranging the BD-ROM scenario data, a multiplexed AV clip, the clip information file, and a BD-J application byte code data in the file/directory structure according to the BD-ROM standards.

Figure 33:
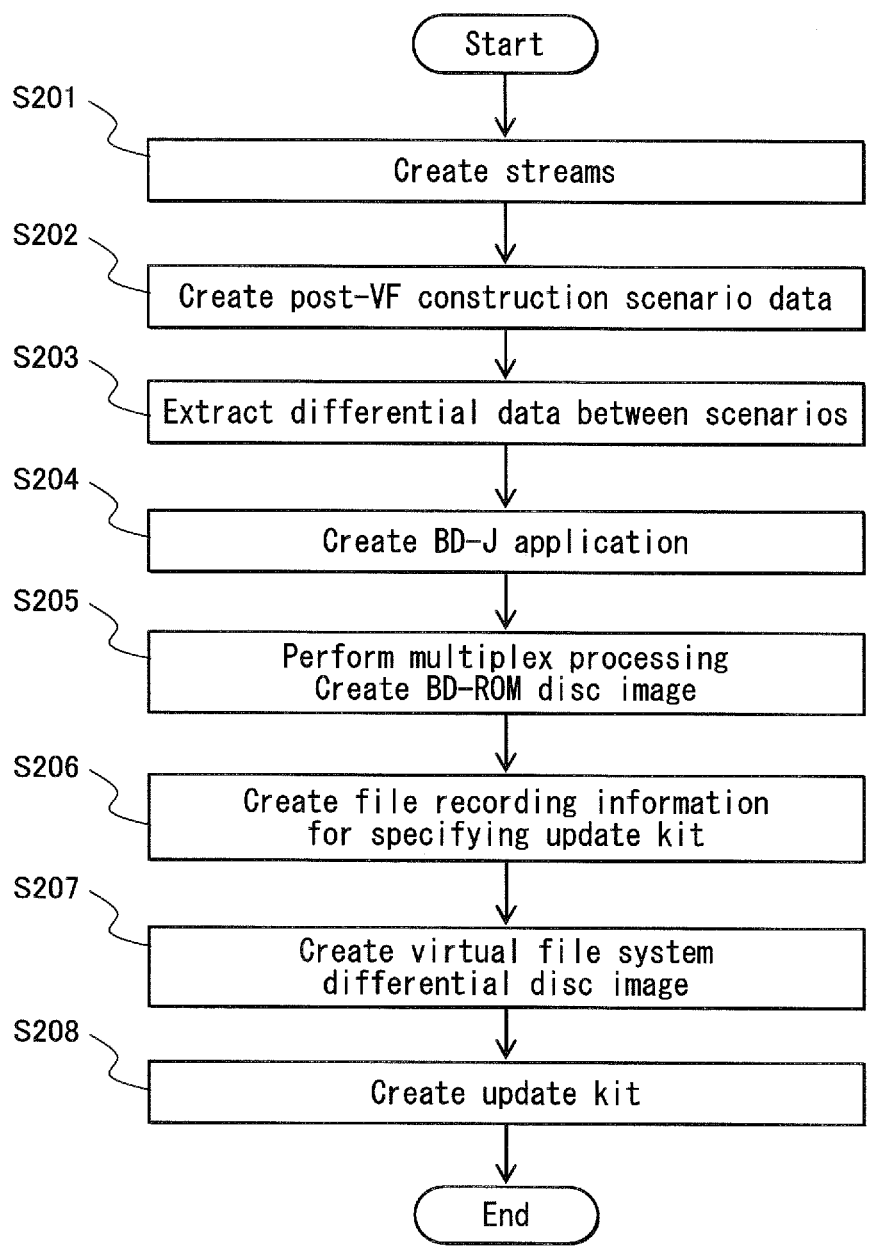
FIG. 33 is a flowchart showing processing of creating an update kit performed in the recording device.

With reference to FIG. 33, a description is next given of a method for creating the update kit according to the embodiment.

In step S201, the material creation unit 51 creates the video stream, the audio stream, the IG stream, and the PG stream required for the virtual file system.

In step S202, the scenario creation unit 52 creates the post-construction playback scenario, such as the index file, the movie object file, the playlist file, and the network playlist file.

In step S203, the difference extraction unit 56 compares the above two scenarios and extracts the differential data.

In step S204, the BD-J creation unit 53 creates the post-construction BD-J application program desired to be applied when the virtual file system is constructed.

In step S205, the multiplex processing unit 54 creates the AV clip and the clip information file based on the differential data.

In step S206, in accordance with descriptions of the post-construction scenario data, the format processing unit 55 creates the file recording the information for uniquely specifying the update kit to be created.

Note that the file created here may only record information which serves as the key, and another file or data base may be created as the information which can be associated with the key for uniquely specifying the update kit.

In step S207, the format processing unit 55 creates the virtual file system differential disc image by arranging the file created in the step S206 which records the information for uniquely specifying the update kit, the post-construction scenario data, the BD-J application, the AV clip, and the clip information file in the format conforming to the BD-ROM standards.

In step S208, in accordance with the differential data extracted from the difference extraction unit 56 and the virtual file system differential disc image, the update kit creation unit 57 creates the merge management information file, the signature information file, the network playlist, and the clip in conformity to the aforementioned data format of update kits, and arranges the files and directories in the format conforming to the BD-ROM standards.

(Other Modifications)

The present invention is described above based on the embodiments. However, the present invention is of course not limited to the embodiments. The following modifications are also within the scope of the present invention.

(1) The present invention may be the methods for controlling the playback device and the recording device shown by the processing procedures in the flowcharts described in the embodiments. Also, the present invention may be computer programs with program codes for causing computers to operate in accordance with the processing procedures, or may be digital signals representing the computer programs.

Also, the present invention may be a computer-readable recording medium, such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded.

Also, the present invention may be the computer programs or the digital signals which are transmitted via an electronic communications circuit, a wireless or fixed-line communications circuit, and a network like the Internet.

Also, the present invention may be carried out by another independent computer system by transferring the computer programs or the digital signals which have been recorded on the recording media, or by transferring the computer programs or the digital signals via the network or the like.

(2) In the first and the second embodiments, the menu display by the BD-J application is described in which the display function is limited in accordance with the virtual package construction state.

The present invention is applicable to control other types of processing that require an access to an additional content data file in the local storage in accordance with the determination about the virtual package construction state. Examples of such types of processing that require an access to an additional content data file in the local storage include playback of a text subtitle, audio, and video in the local storage, and execution of the BD-J application added into the local storage.

The BD-J application can in some cases access a file in the local storage regardless of the virtual package construction state. Examples of such cases include when the BD-J application records data which necessitates reading and writing from/into the local storage, such as user information (e.g. account name, mail address) recorded into an ADA (Application Data Area), a game score, an operation history (e.g. playback status of warning which is played back only at initial viewing, and a history of discs which have been viewed in the past), and cash information. Such cases also include when there is no need for accessing a file in the local storage via the virtual file control unit 20, such as when files in the local storage are played back as text subtitle, audio, and video data.

(3) In the first embodiment, as the method for prohibiting an access to an update kit in the local storage while the virtual package is in the prepared state, it is illustrated that any options requiring an access to the update kit are not displayed. Other methods may be used for prohibiting an access to an update kit in the local storage. As one exemplary method, options may be displayed on a menu with, when selectable, their colors and shapes modified. This gives control to the user not to select options for executing functions which might cause the malfunction. As another method, control may be performed when the user selects one of the options which might cause the malfunction, to present the user a message that the selected option is unexecutable, the reason why unexecutable, a procedure necessary for executing the option, and others. As another method, when the user selects one of the options which might cause the malfunction, the selected function may be made executable (i.e. construction of the virtual package is completed, and title playback is started) before executing the selected function. Yet another method is to ignore the user operation. Also, one or more of the above methods may be combined.

(4) In the first embodiment, as the method for acquiring an update kit, the method for downloading the update kit via the network is illustrated. However, the update kit may be acquired not only via the network but from another recording medium.

(5) The BD-ROM disc may be configured to record a disc information file (CCC.DINFO) containing a set of the video image representing the update kit and the text information, on top of the file structure shown in FIG. 2.

Figure 34:
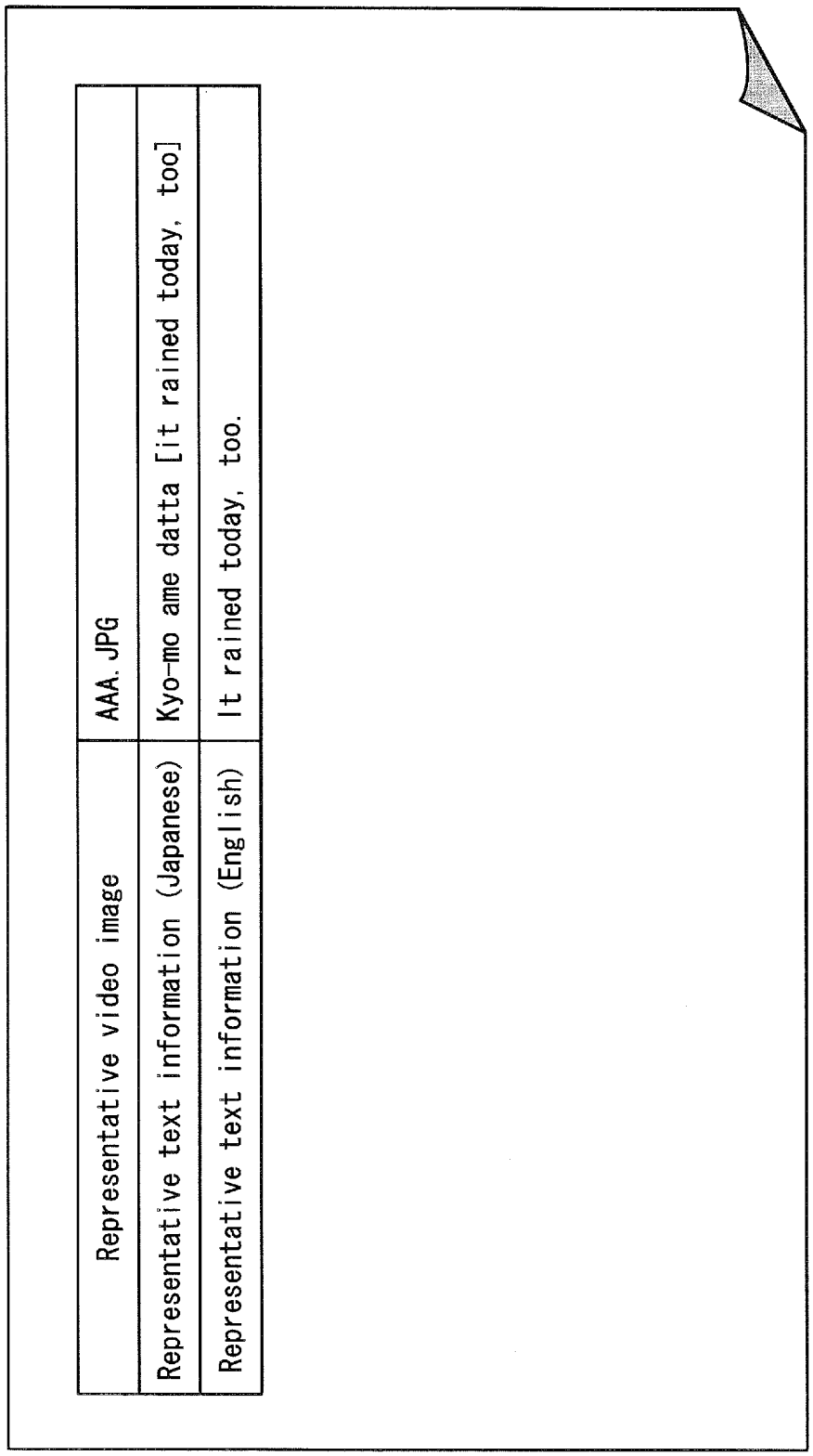
FIG. 34 shows details of a disc information file.

For example, the data structure shown in FIG. 34 may be used for the disc information file. In the example of the figure, the disc information file stores a relative path to a thumbnail video file representing the content included in the BD-ROM, as well as the text information for each of the languages representing the content included in the BD-ROM. In the text information, a title name or the like of the content included in the BD-ROM is described.

The disc information file may be used to implement in the playback device a function of displaying an image of the video file and the text information by the GUI or the like. This enables the user to easily grasp the disc content.

In the case where the above function is implemented in the playback device, the content of the update kit can be displayed on a GUI screen in the playback device by using the state signaling file which stores the information similar to the disc information file. At the same time, the state signaling file can be used as the GUI for the user to delete the update kit.

Specifically, before the application acquires the update kit from the network or another recording medium, a thumbnail image representing the update kit along with the text information such as a name of the update kit, for example, may be displayed as the content of the update kit. This enables the BD-J application or the playback device to provide the user interface with which the user can easily select an update kit they want to acquire in accordance with preference of the user, even when there are a plurality of update kits.

Furthermore, there may be a case where a plurality of update kits are already recorded in the local storage, and some of the plurality of update kits need to be deleted in order to record an additional update kit to be acquired, since available space in the local storage is small. In such a case, thumbnail images representing the update kits along with the text information such as names of the update kits, for example, may be displayed as the contents of the update kits. This enables the BD-J application or the playback device to provide the user interface with which the user can easily select an update kit they want to delete from the local storage, even when a plurality of update kits is recorded in the local storage.

Moreover, there may be a case where a plurality of update kits are already recorded in the local storage, and construction of the virtual file system is completed using one of the plurality of update kits. In such a case, as the content of the update kit used for constructing the virtual file system, a thumbnail image representing the update kit along with the text information such as a name of the update kit, for example, may be displayed by referring to the description of the state signaling file. This enables the BD-J application or the playback device to provide the user interface with which the user can easily check whether or not construction of the virtual file system is completed, and when construction of the virtual file system is completed, check the content of the update kit used for constructing the virtual file system, even when a plurality of update kits is recorded in the local storage.

(6) It is desirable that part of the components of the playback device that is mainly composed of logic devices, such as the system target decoder 4, the playback control unit 7, the program executing unit 11, and the virtual file control unit 20, is realized as a system LSI.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI includes a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback device 102.

Such a system LSI can be embedded into various types of devices that can play back images, such as a television, a game machine, a personal computer, a one-segment mobile phone, as well as into the playback device 102.

It is desirable that the system LSI conforms to the Uniphier architecture.

A system LSI conforming to the Uniphier architecture includes the following circuit blocks.

Data Parallel Processor (DPP)

The DPP is an SIMD-type processor where a plurality of elemental processors perform a same operation. The DPP achieves a parallel decoding of a plurality of pixels constituting a picture by causing operating units, embedded in the respective elemental processors, to operate simultaneously by a single instruction.

Instruction Parallel Processor (IPP)

The IPP includes: a local memory controller that is composed of an instruction RAM, an instruction cache, a data RAM, and a data cache; a processing unit that is composed of an instruction fetch unit, a decoder, an execution unit, and a register file; and a virtual multi processing unit that causes the processing unit to execute a parallel execution of a plurality of applications.

MPU Block

The MPU block is composed of: peripheral circuits, such as ARM core, external bus interface (Bus Control Unit: BCU), DMA controller, timer, and vector interrupt controller; and peripheral interfaces, such as UART, GPIO (General Purpose Input Output), and sync serial interface.

Stream I/O Block

The stream I/O block performs data input/output with the drive device, hard disk drive device, and SD memory card drive device which are connected onto the external busses via the USB interface and the ATA packet interface.

AV I/O Block

The AV I/O block, which is composed of audio input/output, video input/output, and OSD controller, performs data input/output with the television and the AV amplifier.

Memory Control Block

The memory control block performs reading and writing from/to the SD-RAM connected therewith via the external buses. The memory control block is composed mainly of an internal bus connection unit for controlling internal connection between blocks, an access control unit for transferring data with the SD-RAM connected to outside of the system LSI, and an access schedule unit for adjusting requests from the blocks to access the SD-RAM.

The following describes a detailed production procedure. First, a circuit diagram of a part to be the system LSI is drawn, based on the drawings that show structures of the embodiments.

As the constituent elements of the target structure are realized, buses connecting between the circuit elements, ICs, or LSIs, peripheral circuits, interfaces with external entities and the like are defined. Further, the connection lines, power lines, ground lines, clock signals and the like are defined. For these definitions, the operation timings of the constituent elements are adjusted by taking into consideration the LSI specifications, and band widths necessary for the constituent elements are secured. With other necessary adjustments, the circuit diagram is completed.

After the circuit diagram is completed, the implementation design is performed. The implementation design is a work for creating a board layout by determining how to arrange the parts (circuit elements, ICs, LSIs) of the circuit and the connection lines onto the board.

After the implementation design is performed and the board layout is created, the results of the implementation design are converted into CAM data, and the CAM data is output to equipment such as an NC machine tool. The NC machine tool performs the SoC implementation or the SiP implementation. The SoC (System on Chip) implementation is a technology for printing a plurality of circuits onto a single chip. The SiP (System in Package) implementation is a technology for packaging a plurality of circuits by resin or the like. Through these processes, a system LSI of the present invention can be produced based on the internal structure of the playback device 102 described in each embodiment above.

It should be noted here that the integrated circuit generated as described above may be called IC, LSI, ultra LSI, super LSI or the like, depending on the level of the integration.

It is also possible to achieve the system LSI by using the FPGA (Field Programmable Gate Array). In this case, a lot of logic elements are to be arranged in a lattice, and vertical and horizontal wires are connected based on the input/output combinations described in LUT (Look-Up Table), so that the hardware structure described in each embodiment can be realized. The LUT is stored in the SRAM. Since the contents of the SRAM are erased during power-off, when the FPGA is used, it is necessary to define the Config information so as to write, onto the SRAM, the LUT for realizing the hardware structure described in each embodiment.

This embodiment is realized by middleware and hardware part corresponding to the system LSI, hardware part other than the part corresponding to the system LSI, interface part for the middleware, interface part for the middleware and system LSI, interface with the hardware part other than the part corresponding to the system LSI, and the user interface part, and when these are embedded in a playback device, these operate in cooperation with each other to provide unique functions.

By appropriately defining the interface part for the middleware, and the interface part for the middleware and system LSI, it is possible to separately develop, in parallel, the user interface part, middleware part, and system LSI part of the playback device. This makes it possible to develop the product more efficiently. Note that the interface can be segmented in various ways.

(7) The present invention may be any combination of the above embodiment and modifications.

[Industrial Applicability]

A playback device, a playback method, a recording medium, a recording device, a recording method, and an integrated circuit according to the present invention are capable of correctly determining whether data acquired from a network or the like is added into a ROM disc, and displaying to a user only executable menu items. This realizes distribution of movie contents, such as movie titles, more attractive than before to markets, and hence activates a movie market and a commercial device market. Accordingly, the playback device, the playback method, the recording medium, the recording device, the recording method and the integrated circuit according to the present invention are highly applicable in a movie industry and a commercial device industry.

REFERENCE SIGNS LIST

101 BD-ROM
102 playback device
103 television
104 removable medium
105 remote control
1 BD-ROM drive
2a read buffer (1)
2b read buffer (2)
3 local storage
4 system target decoder
5a plane memory set
5b plane composition unit
6 HDMI transmission/reception unit
7 playback engine
7a playback control engine
7b playback control unit
9 management information memory
10 register set
11 program execution unit
12 program memory
13 HDMV module
13 network module
14 BD-J platform
15 middleware
16 mode management module
17 user event processing unit
19 nonvolatile memory
20 virtual file control unit
21 state signaling file position information
22 virtual package construction state determination unit
23 menu display unit
31 state signaling file
41 merge management information file
42 state signaling file
43 merge management information file
44 state signaling file
51 material creation unit
52 scenario creation unit
53 BD-J creation unit
54 multiplex processing unit
55 format processing unit
56 difference extraction unit
57 update kit creation unit

The invention claimed is:

1. A playback device comprising:
a read unit operable to read an application program from a read-only recording medium;
a program execution unit operable to execute the application program read by the read unit;
a connection unit to which a local storage is removably connected; and
a virtual file control unit operable to construct a virtual package by combining a file structure of the local storage with a file structure of the read-only recording medium, wherein
the local storage stores therein a state signaling file, a file path of the state signaling file on the virtual package not corresponding to any file recorded on the read-only recording medium, and
the program execution unit determines, while the local storage is connected, whether the virtual package is in a prepared state or in a valid state by attempting to access the state signaling file using the file path on the virtual package.

2. The playback device of claim 1, wherein
after constructing the virtual package, when the local storage is disconnected and then reconnected during execution of the application program, the virtual file control unit brings the virtual package into the prepared state, and
after the local storage is reconnected, when execution of the application program is started again, the virtual file control unit brings the virtual package in the prepared state into the valid state.

3. The playback device of claim 2, wherein
access to the state signaling file using the file path on the virtual package is a request for reading the state signaling file using a fixed file path, the fixed file path being assigned by the virtual file control unit to the state signaling file.

4. The playback device of claim 3, wherein
the access to the state signaling file using the file path on the virtual package is attempted when the execution of the application program is started again.

5. The playback device of claim 3, wherein
the application program provides the program execution unit with an additional function which is not contained on the read-only recording medium by accessing the local storage via the virtual package,
when the virtual package is in the prepared state, the program execution unit prevents a user from selecting the additional function, and
when the virtual package is in the valid state, the program execution unit accepts a user selection of the additional function.

6. The playback device of claim 3, wherein
the state signaling file is a text file.

7. The playback device of claim 3, wherein
the local storage further stores therein files used for constructing another virtual package, as well as an alternative state signaling file for the other virtual package,
the alternative state signaling file on the other virtual package and the state signaling file on the virtual package are the same in the file path,
the virtual file control unit constructs one of the virtual package and the other virtual package, and
the program execution unit determines, while the local storage is connected, which one of the virtual package and the other virtual package is in the valid state by attempting a file access using the file path.

8. An integrated circuit for controlling a playback device including (i) a read unit operable to read an application program from a read-only recording medium and (ii) a connection unit to which a local storage is removably connected, the integrated circuit comprising:
a program execution unit operable to execute the application program read by the read unit; and
a virtual file control unit operable to construct a virtual package by combining a file structure of the local storage with a file structure of the read-only recording medium, wherein
the local storage stores therein a state signaling file, a file path of the state signaling file on the virtual package does not correspond to any file recorded on the read-only recording medium, and
the program execution unit determines, while the local storage is connected, whether the virtual package is in a prepared state or in a valid state by attempting to access the state signaling file using the file path on the virtual package.

9. A playback method used in a playback device including (i) a read unit operable to read an application program from a read-only recording medium and (ii) a connection unit to which a local storage is removably connected, the playback method comprising:
a reading step of reading the application program from the read-only recording medium;
a program execution step of executing the application program read by the read unit;
a virtual file controlling step of constructing a virtual package by combining a file structure of the local storage with a file structure of the read-only recording medium; and
a determination step of determining, while the local storage is connected, whether the virtual package is in a prepared state or in a valid state by attempting to access a state signaling file stored in the local storage using a file path of the state signaling file on the virtual package, wherein
the file path on the virtual package does not correspond to any file recorded on the read-only recording medium.

10. A non-transitory computer-readable recording medium storing therein an application program, the application program comprising the step of:
causing a playback device, which constructs a virtual package by combining a file structure of the recording medium with a file structure of another recording medium, to determine whether the virtual package is in a prepared state or in a valid state by attempting to access a state signaling file stored on the other recording medium using a file path of the state signaling file on the virtual package, wherein
the file path on the virtual package does not correspond to any file recorded on the recording medium.

11. A recording device comprising:
a unit for creating stream data;
a unit for creating scenario data describing a playback scenario of the stream data;
a unit for creating an application program to be executed in the playback scenario; and
a unit for writing to a recording medium the stream data, the scenario data, and the application program, wherein
the application program includes the step of causing a playback device, which constructs a virtual package by combining a file structure of the recording medium with a file structure of another recording medium, to determine whether the virtual package is in a prepared state or in a valid state by attempting to access a state signaling file stored on the other recording medium using a file path of the state signaling file on the virtual package, and
the file path on the virtual package does not correspond to any file recorded on the recording medium.

12. A recording method comprising the steps of:
creating stream data;
creating scenario data describing a playback scenario of the stream data;
creating an application program to be executed in the playback scenario; and
writing to a recording medium the stream data, the scenario data, and the application program, wherein
the application program includes the step of causing a playback device, which constructs a virtual package by combining a file structure of the recording medium with a file structure of another recording medium, to determine whether the virtual package is in a prepared state or in a valid state by attempting to access a state signaling file stored on the other recording medium using a file path of the state signaling file on the virtual package, and
the file path on the virtual package does not correspond to any file recorded on the recording medium.

* * * * *